US010536478B2

(12) United States Patent
Kirti et al.

(10) Patent No.: US 10,536,478 B2
(45) Date of Patent: Jan. 14, 2020

(54) TECHNIQUES FOR DISCOVERING AND MANAGING SECURITY OF APPLICATIONS

(71) Applicant: Oracle International Corporation, Redwood Shores, CA (US)

(72) Inventors: Ganesh Kirti, San Jose, CA (US); Kamalendu Biswas, San Ramon, CA (US); Sumedha Nalin Perera, San Mateo, CA (US); Adina Florina Simu, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 179 days.

(21) Appl. No.: 15/441,154

(22) Filed: Feb. 23, 2017

(65) Prior Publication Data

US 2017/0251013 A1  Aug. 31, 2017

Related U.S. Application Data

(60) Provisional application No. 62/300,715, filed on Feb. 26, 2016, provisional application No. 62/460,716, filed on Feb. 17, 2017.

(51) Int. Cl.
*H04L 29/06* (2006.01)

(52) U.S. Cl.
CPC ...... *H04L 63/1441* (2013.01); *H04L 63/1408* (2013.01); *H04L 63/1416* (2013.01); *H04L 63/20* (2013.01)

(58) Field of Classification Search
CPC ....... H04L 63/3278; H04L 9/003; H04L 9/06; H04L 63/10; H04L 63/612007;
(Continued)

(56) References Cited

U.S. PATENT DOCUMENTS 7,603,452 B1  10/2009  Guo
7,647,622 B1   1/2010  Sobel et al.
(Continued)

FOREIGN PATENT DOCUMENTS

EP       3080741     6/2017
WO    2014052892     4/2014
(Continued)

OTHER PUBLICATIONS

NetIQ, Understanding Risk Levels and Risk Scoring, https://www.netiq.com/documentation/identity-governance-30/user-guide/data/b11robjw.html, Apr. 2018, pp. 1-348.*
U.S. Appl. No. 14/523,804, Non-Final Office Action dated Sep. 27, 2016, 37 pages.
U.S. Appl. No. 14/749,522, Final Office Action dated Sep. 25, 2017, 27 pages.
(Continued)

*Primary Examiner* — Lisa C Lewis
*Assistant Examiner* — Raied A Salman
(74) *Attorney, Agent, or Firm* — Kilpatrick Townsend & Stockton LLP

(57) ABSTRACT

Techniques for discovery and management of applications in a computing environment of an organization are disclosed. A security management system discovers use of applications within a computing environment to manage access to applications for minimizing security threats and risks in a computing environment of the organization. The security management system can obtain network data about network traffic to identify unique applications. The security management system can perform analysis and correlation, including use of one or more data sources, to determine information about an application. The system can compute a measure of security for an application ("an application risk score") and a user ("a user risk score"). The score may be analyzed to determine a threat of security posed by the application based on use of the application. The security system can perform one or more instructions to configure access permitted by an application, whether access is denied or restricted.

18 Claims, 31 Drawing Sheets

(58) Field of Classification Search
CPC . H04L 67/104; H04L 63/1441; H04L 63/408; H04L 63/1416; H04L 63/20; G06F 11/00; G06F 21/00; G06F 21/53
USPC .................................................. 726/23, 25, 1
See application file for complete search history.

(56) References Cited

U.S. PATENT DOCUMENTS

| | | | |
|---|---|---|---|
| 8,495,746 B2* | 7/2013 | Fissel | H04L 63/20 709/229 |
| 9,692,789 B2 | 6/2017 | Kirti et al. | |
| 10,063,654 B2 | 8/2018 | Kirti et al. | |
| 10,200,369 B1* | 2/2019 | Roundy | H04L 63/10 |
| 2003/0048174 A1 | 3/2003 | Stevens et al. | |
| 2004/0083178 A1 | 4/2004 | Tanaka et al. | |
| 2005/0188222 A1 | 8/2005 | Motsinger et al. | |
| 2008/0271143 A1 | 10/2008 | Stephens et al. | |
| 2010/0151816 A1 | 6/2010 | Besehanic et al. | |
| 2010/0180001 A1 | 7/2010 | Hardt | |
| 2010/0268570 A1 | 10/2010 | Rodriguez et al. | |
| 2011/0167469 A1 | 7/2011 | Letca et al. | |
| 2011/0185055 A1 | 7/2011 | Nappier et al. | |
| 2011/0219434 A1 | 9/2011 | Betz et al. | |
| 2012/0030767 A1 | 2/2012 | Rippert, Jr. et al. | |
| 2012/0240183 A1 | 9/2012 | Sinha | |
| 2012/0304249 A1* | 11/2012 | Luo | G06F 21/554 726/1 |
| 2013/0036459 A1 | 2/2013 | Liberman et al. | |
| 2013/0066945 A1 | 3/2013 | Das et al. | |
| 2013/0111547 A1 | 5/2013 | Kraemer | |
| 2013/0191921 A1* | 7/2013 | Mahaffey | G06F 21/554 726/25 |
| 2013/0254831 A1 | 9/2013 | Roach et al. | |
| 2013/0275574 A1 | 10/2013 | Hugard, IV et al. | |
| 2015/0033285 A1 | 1/2015 | Gao et al. | |
| 2015/0106935 A1 | 4/2015 | Burns et al. | |
| 2015/0172321 A1 | 6/2015 | Kirti et al. | |
| 2015/0319185 A1 | 11/2015 | Alomari et al. | |
| 2015/0347748 A1* | 12/2015 | Krstic | G06F 21/53 726/1 |
| 2016/0012081 A1 | 1/2016 | Zimmermann et al. | |
| 2017/0295191 A1* | 10/2017 | Choi | H04L 67/101 |
| 2017/0295199 A1 | 10/2017 | Kirti et al. | |
| 2018/0255010 A1* | 9/2018 | Goyal | H04L 51/12 |

FOREIGN PATENT DOCUMENTS

| | | |
|---|---|---|
| WO | 2014138120 | 9/2014 |
| WO | 2015088702 | 6/2015 |
| WO | 2017147525 | 8/2017 |

OTHER PUBLICATIONS

U.S. Appl. No. 14/749,522, Non-Final Office Action dated Jan. 12, 2017, 20 pages.
Gupta et al., "Identification of Effective Public Cloud on User Query", Available Online at: http://ijcttjournal.org/Volume4/issue-7/IJCTT-V4I7P103.pdf, Jul. 7, 2013, 5 pages.
International Application No. PCT/US2014/065523, International Preliminary Report on Patentability dated Jun. 23, 2016, 12 pages.
International Application No. PCT/US2014/065523, International Search Report and Written Opinion dated Feb. 23, 2015, 12 pages.
U.S. Appl. No. 14/523,804, "Notice of Allowance", dated Apr. 5, 2017, 11 pages.
U.S. Appl. No. 15/441,154, filed Feb. 23, 2017, 131 pages.
PCT Application No. PCT/US2017/19508, filed Feb. 24, 2017, 129 pages.
EP Application No. EP14868736.1, "Extended European Search Report", dated May 15, 2017, 4 pages.
PCT Application No. PCT/US2017/019508, "International Search Report and Written Opinion", dated May 2, 2017, 10 pages.
"Artificial Neural Network", Wikipedia, Available at: https://en.wikipedia.org/wiki/Artificial_neural_network, retrieved on May 29, 2017; 22 pages.
"Decision Tree Learning", Wikipedia, https://en.wikipedia.org/wiki/Decision_tree_learning, retrieved on May 29, 2017; 9 pages.
"Instantly Start Monitoring the Cybersecurity Health of Any Organization", Security Scorecard , Available at: https://securityscorecard.com/, retrieved on May 29, 2017; 15 pages.
"Linear Regression", Available at : https://en.wikipedia.org/wiki/Linear_regression., retrieved on May 29, 2017; 1 page.
"MCL—a cluster algorithm for graphs", Available at: https://micans.org/mcl/, retrieved on Jun. 1, 2017; 1 page.
"The new standard in business data", Clearbit, Available At: https://clearbit.com/; retrieved on May 29, 2017, 7 pages.
"Wikipedia-The Free Encyclopedia", Available at: https://www.wikipedia.org/, retrieved on May 29, 2017; 2 pages.
Banker, "Ransomware Tracker", The Swiss Security Blog, Available at: http://www.abuse.ch/, Jan. 28, 2015.
Girvan et al., "Newman algorithm", Available at : https://en.wikipedia.org/wiki/Girvan%E2%80%93Newman_algorithm, retrieved on May 29, 2017; 2 pages.
U.S. Appl. No. 14/749,522, Notice of Allowance dated Apr. 12, 2018, 13 pages.
U.S. Appl. No. 15/632,174 , Non-Final Office Action dated Feb. 22, 2018, 37 pages.
International Application No. PCT/US2017/019508, International Preliminary Report on Patentability dated Sep. 7, 2018, 7 pages.

* cited by examiner

| | | |Help ▼ | qatest2 | Test_automation_account@company.com ▼|

COMPANY Cloud Service

Dashboard: App Discovery

| Summary | App Discovery — 1502 | Key Security Indicators — 1504 |
| From registered apps | From logs — 1506 | |

Company Cloud Service discovers apps by two different methods: from registered apps or from logs Filter by December ▼

Discovered apps (73)

⇪ Export To CSV — 1508
Syslog Setup — 1510  ℹ️

| DISCOVERED APPS NAME ⇅ | TOP RISK(S) | ⇅ INCIDENT | ACTION |
|---|---|---|---|
| Provider1.com | IP reputation, Hacker chatter, Network security, Endpoint security, Leaked information | Create | Action > |
| Provider2.com | Social engineering, Patching cadence, Network security, Leaked information, IP reputation | 74997000003 | Action > |
| Provider3.com | Social engineering, Patching cadence, Network security, Leaked information, IP reputation | 74997000004 | Action > |
| Provider4.com | Patching cadence, Network security, IP reputation, Hacker chatter, Application security | Create | Action > |
| Provider5.cn | Social engineering, Patching cadence, Network security, Leaked information, IP reputation | 74997000002 | Action > |
| Provider6.net | Patching cadence, Network security, DNS health, Application security | Create | Action > |
| Provider7.com | Social engineering, Patching cadence, Network security, Leaked information, IP reputation | Create | Action > |
| Provider8.com | Social engineering, Patching cadence, Network security, Leaked information, IP reputation | Create | Action > |
| Provider9.com | Social engineering, Patching cadence, Network security, Leaked information, IP reputation | Create | Action > |

Sidebar: Dashboard, Applications, Risk Events, Reports, Users, Incidents, Jobs, Configuration

Provider1.com :: IP reputation

| Severity | Issue | Issue details |
|---|---|---|
| ⊖ | Malware Events, Last 30 Days | Description: A malware signature was found over the last 30 days. View more<br>Recommendation: Investigate the devices connected to the identified IP addresses; Check for evidence of malware infection. |
| ⬧ | Malware Events, Last Year | Description: A malware signature was found over the last 365 days. View more<br>Recommendation: Investigate the devices connected to the identified IP addresses; Check for evidence of malware infection. |
| ⊖ | Unsolicited Commercial Email | Description: Unsolicited commercial email has been either reported or detected originating from IPs on the organization's network. View more<br>Recommendation: Confirm with the reporting blacklist if emails are not UCE |
| ⊖ | Malware Events, Last Day | Description: A malware signature was found over the last 24 hours. View more<br>Recommendation: Investigate the devices connected to the identified IP addresses; Check for evidence of malware infection. |

New incident

Category  Anomalous activity — 1902
Discovered app name  Provider1.com — 1904
Vendor domain  Provider1, Inc. — 1906
Description ⬚ — 1908

Remediation action ⬚ — 1910

Assigned to  Select User... ⌄ — 1912
Priority  Select Priority... ⌄ — 1914
Approval — 1916  ☐ I understand and explicitly approve the action to create an incident in Service Now. The incident in Company Cloud Service will be marked resolved.

(New Incident) — 1918    (Cancel) — 1920

COMPANY Cloud Service | Help ▽ | qatest2 | Test_automation_account@company.com ▽

Dashboard: App Discovery

| Summary | App Discovery | Key Security Indicators |

From registered apps    From logs

Company Cloud Service discovers apps by two different methods: from registered apps or from logs Filter by app type ▽   Filter by instance ▽

Discovered apps (7)                                                                    ⬆ Export To CSV    🔍 ⓘ

| DISCOVERED APP NAME | TOP RISK(S) | INCIDENT | ACTION |
|---|---|---|---|
| Provider10 Help & Training — 2102 | Network security, Leaked information, Endpoint security, IP reputation, DNS health | | Action ▽ |
| Provider10 Developers | Network security, Leaked information, Endpoint security, IP reputation, DNS health | 53757004009 | Action ▽ |
| Company Platform - Dev | No risk found | 53757004012 | Action ▽ |
| Company Platform - New UI | No risk found | Create | Action ▽ |
| Company Platform - RC | No risk found | Create | Action ▽ |
| Company Platform | No risk found | Create | Action ▽ |
| Company Platform - POC Trail | No risk found | Create | Action ▽ |

|< < ① > >|   20 ▽ items per page                                                    1 - 7 of 7 items Dashboard | Applications | Risk Events | Reports | Users | Incidents | Jobs | Configuration

2100

COMPANY Cloud Service | qatest2 | Test_automation_account@company.com

Dashboard: App Discovery

| Summary | App Discovery | Key Security Indicators |

From registered apps   From logs

Company Cloud Service discovers apps by two different methods: from registered apps or from logs Filter by app type ▽   Filter by instance ▽

Discovered apps (7)

| DISCOVERED APP NAME | 2200 | ◊ | TOP RISK(S) | ◊ | INCIDENT | ACTION |
|---|---|---|---|---|---|---|
| Provider10 Help & Training | | | Network security, Leaked information, Endpoint security, IP reputation, DNS health | | | Action |

↗
Company information:
Name:     Provider10.com
Address:  Southern Pacific Building, San Francisco, CA 94105, USA
Domain:   Provider10.com
Website:  http://Provider10.com/
Vendor description
Build more meaningful and lasting relationships and connect with your customers across sales, customer service, marketing, communities, apps, analytics, and more using our Customer Success Platform. Try for Free.
Vendor website ranking/popularity:
Alexa global rank:  145
Alexa US rank:       59

ⓘ Endpoint security ⟋ 2202
    Measures security level of vendor's employee workstations and mobile devices.
ⓘ Network security ⟋ 2204
    Checks vendor's insecure network settings.
ⓘ Leaked information
    Sensitive application information exposed in public code repositories.
◊ DNS health
    Checks vendor's DNS insecure configurations and vulnerabilities.
◊ IP reputation ⟋ 2206
    Checks suspicious activity, such as malware or spam, in the vendor's network.
✓ Cubit score
    A proprietary algorithm that checks for vendor's implementation of common security best practices.

| Provider10 Developers | Network security, Leaked information, Endpoint security, IP reputation, DNS health | 53757004009 | Action |
| Company Platform - Dev | No risk found | 53757004012 | Action |

FIG. 22

Provider10 Help & Training: Network security

| Severity | Issue | Issue details |
|---|---|---|
| ⓘ | TLS Protocol Uses Weak Cipher | Description: TLS analysis reveals a weak cipher either through encryption protocol or public key length. View more <br> Recommendation: It is recommended to configure the server to only support strong symmetric ciphers and to use sufficiently large public key sizes. Specifically, avoid RC4 encryption as there have been multiple vulnerabilities discovered that render it insecure. Additionally, it is recommended to use a public key size of more than 2048 bits. |
| ⓘ | SSL Certificate is Self Signed | Description: SSL Certificate is signed by the entity which may be untrusted or unknown. View more <br> Recommendation: Based on your relationship, determine whether a self-signed certificate poses a risk. If necessary, request an SSL Certificate from a mutually trusted Certificate Authority. |

Provider10 Help & Training: IP reputation

| Severity | Issue | Issue details |
|---|---|---|
| ⚠ | Malware Events, Last Year | Description: A malware signature was found over the last 365 days. Malware signatures have been observed emanating from within the corporate network within the last 365 days.<br>View less<br>Recommendation: Investigate the devices connected to the identified IP addresses; Check for evidence of malware infection. |

TECHNIQUES FOR DISCOVERING AND MANAGING SECURITY OF APPLICATIONS

CROSS-REFERENCES TO RELATED APPLICATIONS

The present application claims priority and benefit from each of the following patent applications:
1) U.S. Provisional Application No. 62/300,715, filed Feb. 26, 2016, entitled "Systems and Methods for Discovering and Monitoring Unsanctioned Enterprise Assets"; and
2) U.S. Provisional Application No. 62/460,716, filed Feb. 17, 2017, entitled "Systems and Methods for Discovering and Monitoring Unsanctioned Enterprise Assets."

The entire contents of each of the above-identified patent applications are incorporated herein by reference for all intents and purposes.

BACKGROUND

Organizations may implement computing environments (e.g., enterprise computing environments), relying on many technology devices, software, hardware, and/or computing services. Increasingly, these computing environments are implemented as or using a "cloud" environment. A "cloud" environment can represent a conglomerate of local and remotely hosted computing resources and systems. The term "cloud computing" to refer to various aspects of distributed computing over a network. Cloud computing environments may implement various service models include infrastructure as a service (IaaS), platform as a service (PaaS), software as a service (SaaS), and network as a service (NaaS). A "cloud" can also refer to the data store and client application of a single service provider. Many applications may implement a cloud computing environment to enable a device to obtain an additional functionality or capability beyond what is available solely on the device itself. Such applications may be implemented using one or more service providers (also referred to herein as "providers"), each having one or more service provider systems (also referred to herein as a "provider system") using one or more computer systems. Examples of such service providers may include corporations such as Box, Dropbox, Microsoft, Docusign, Salesforce, Oracle, Amazon, and others. Each of the service providers may provide many different applications or functionality enabling access to applications and/or data as a cloud-based service.

The reliance on computing environments has led to widespread use of applications that are either authorized or unauthorized by an organization. Authorized applications may be applications that are either registered with the organization or known by an organization. In some instances, an application may be authorized by being distributed by the organization. Unauthorized applications may be applications that are not known, and/or not associated or registered with an organization. Unsanctioned applications can include applications that operate independently of others and third-party integrated applications that integrate into a sanctioned (IT managed) application as a plug-in or add-on. Whether authorized or unauthorized, many applications pose a great security risk to a computing environment of an organization. The security risks include exposure to a private network of an organization in an unsecure manner or access to private, confidential data, which should be restricted through security controls.

Applications that pose a security risk may or may not be under the management of the organization. As such, these applications may be operated under a "shadow" or a hidden manner, unknown and/or not regulated by an organization for security control. Further, unknown usage of applications can contribute to inefficient and over usage of computing resources, such as bandwidth and data storage. Undiscovered usage may affect performance and access to critical resources in a computing environment of an organization.

Applications that are operated in an unregulated manner, may be accessed from a service provider in an unauthorized manner. For example, a salesperson of an organization may use an unsanctioned file sharing application in his mobile device to share a spreadsheet to his team members for collaboration instead of emailing it. Although, use of such application can contribute to increased productivity, it may also pose security risks as well as compliance issues in the organization. For example, confidential files with business sensitive information may be susceptible to an information leak if the application is not secure enough. Since such applications are not evaluated by the organizations, they are not prepared to act upon a security breach. Moreover, some apparently useful applications may knowingly or unknowingly distribute adware or even malware. Many organizations try to block such applications or websites but that makes employees unhappy due to impact on productivity. Moreover, employees try to bypass such barrier e.g., using external VPN service, mobile data service etc. However, administrations of computing environments in organizations need visibility to all applications being used so that they can proactively monitor and control questionable or malicious applications.

BRIEF SUMMARY

The present disclosure relates generally to managing security in computing environments and more specifically to techniques for discovery and management of applications in a computing environment of an organization. Such techniques may enable an organization to monitor and manage access to applications for minimizing security threats and risks in a computing environment of the organization. Discovering usage of applications may enable an organization to effectively monitor and manage efficiency and consumption of resources, thereby enhancing the performance of a computing environment for an organization.

A security monitoring and control system (also referred to as a "security system" and "security management system") may discover use of applications within a network or an organization. Various sources including, but not limited to, third party data sources, network traffic, and service provider systems may be utilized to identify unique applications being accessed in a network of an organization. The security monitoring and control system may be implemented in a distributed fashion including agents on a network to discover applications usage. The security monitoring and control system may communicate with distributed computing systems, such as multiple service provider systems (e.g., cloud service provider systems) to access data about applications used on devices used for an organization. The security monitoring and control system can obtain network data about network traffic to identify unique applications. Such techniques can provide a deep visibility into the activities of applications used in an organization, which can helps to detect anomalies or emerging threats with regard to application usage and user behavior in the organization's computing environment.

The security monitoring and control system can perform analysis and correlation, including use of one or more data sources, to determine information about an application. Information may include organizational information about a provider of the application. Information may include security information about a security risk indicator about the application. The information may include one or more indicators (e.g., a value) of a feature related to use of the application, such as a security aspect. The information about an application may be used to compute a measure of security for an application ("an application risk score") and a user ("a user risk score"). The measure of security may be computed using one or more pieces of information (e.g., indicators) combined with a weight value attribute to each piece of information. The score may be analyzed with respect to a security policy to determine a threat of security posed by the application or user based on use of an application.

In some embodiments, a graphical interface may be provided to a user (e.g., a security administrator) to view information about usage of applications. The information may provide details about a service provider of an application and/or a visualization of different types of security risk and may indicate a measure of severity for each security risk. The graphical interface may be interactive to configure remediation actions to be performed based on a security policy with respect to each security risk. For organizations having difficulty in identifying and managing security risks by unknown usage of applications, the graphical interface can enable an organization to efficiently and reliably discover all if not most application usage to minimize security risks and maximize resource consumption of computing-related resources in a computing environment. In at least one embodiment, the security monitoring and control system may be configured to assess a risk related to application usage to automatically determine the severity of the risk. Based on the severity of the risk, the security monitoring and control system can perform one or more instructions to configure access permitted by an application, whether access is denied or restricted.

In some embodiments, a security monitoring and control system (also referred to as a security system or a security management system) may include a computer system and may be configured to implement methods and operations disclosed herein. A computer system may include one or more processors and one or more memory accessible to the one or more processors and storing one or more instructions that, upon execution by the one or more processors, causes the one or more processors to implement methods and/or operations disclosed herein. Yet other embodiments relate to systems and non-transitory machine-readable tangible storage media which employ or store instructions for methods and operations disclosed herein. In some embodiments, a non-transitory computer-readable medium, including instructions stored thereon may be implemented such that when executed on a processor, it may perform methods disclosed herein. In some embodiments, a system is disclosed herein including one or more processors; and a memory accessible to the one or more processors, wherein the memory stores one or more instructions which, upon execution by the one or more processors, causes the one or more processors to perform the methods disclosed herein. In some embodiments, a system is disclosed which comprises means for performing any of the methods disclosed herein.

In at least one embodiment, a computer-implemented method is disclosed at a computer system of a security management system. All of the steps may be performed by the security management system. The method may include obtaining data about network activity by a user on a network of an organization. The method may include identifying, using the data about the network activity, an application that has been accessed by the user on the network. The method may include determining, using the data about the network activity, access information about the network activity corresponding to the application that has been accessed by the user. The method may include searching using the access information, for domain information about the application. The method may include determining security information about the application. The method may include computing, using the security information, a measure of security for the application that has been accessed. The method may include performing, by applying a security policy based on the measure of security, a remediation action for the application.

In some embodiments, security information includes a first value that is a first indicator of a first security threat by the application and includes a second value that is a second indicator of a second security threat by the application. The first indicator may be obtained from a first data source. The second indicator may be obtained from a second data source.

Computing the measure of security may include computing a first weighted value that is based on multiplying the first value by a first weight value; computing a second weighted value that is based on multiplying the second value by a second weight value; computing a weighted summation that is based on a summation of the first weighted value and the second weighted value; and computing a weight summation that is based on a summation of the first weight value and the second weight value. The measure of security may be a value that is computed based on dividing the weighted summation by the weight summation. In some embodiments, the first weight value is different from the second weight value. In some embodiments, the first value is different from the second value.

In some embodiments, obtaining the data about the network activity includes obtaining network data from one or more network devices on the network. The network may be protected in a computing environment of the organization. The computing environment may be secure from a public network.

In some embodiments, the method may include determining organization information for the application and generating a graphical interface that displays information about the application, wherein the information about the application is displayed based on the organization information and the measure of security computed for the application. The graphical interface may indicate the remediation action performed for the application. In some embodiments, the organization information is about an entity that provides the application and the organization information may indicate one or more attributes about the application.

In some embodiments, the data obtained is for communications on the network. Identifying the application may include processing the data to identify a portion of the data corresponding to a request for the application accessed by the user. The portion of the data may indicate application information about the request for the application. The application information may be used to identify the application as being accessed by the user. In some embodiments, access information about the network activity corresponding to the application may be determined using the portion of the data. The access information may indicate a timestamp of the network activity for the application, an IP address of a system that provides the application, a media access control (MAC) address of a device used to access the application, and user information about the user. In some embodiments, access information indicates an IP address of a system that provides the application. Searching for domain information includes performing a query, based on the IP address of the first application, for the domain information corresponding to a domain that hosts the application. In some embodiments, access information indicates source information of the application, the source information indicating a location of the application provided by a host. Searching for the domain information may include sending, to the host, a request for a certificate of the application based on the source information of the application.

In some embodiments, applying the security policy based on the measure of security includes determining whether the measure of security satisfies a risk threshold for the application. A remediation action may be to configure the network to prevent the application from being accessed on the network by the user.

In some embodiments, data that is obtained is further about the network by a plurality of users as a tenant on the network of the organization. A plurality of users may include the user. A remediation action is to prevent access to the application by the plurality of users.

In some embodiments, a remediation action for the application includes causing the graphical interface to prompt the user to adjust a configuration operation of the application based on the security policy applied to the measure of security.

In some embodiments, a computer-implemented method is disclosed at a computer system of a security management system. All of the steps may be performed by the security management system. The method may include obtaining, from a first service provider system, first data about a first application accessed by a user from the first service provider system. The method may include obtaining, from a second service provider system, second data about a second application accessed by the user from the second service provider system. The method may include determining, using the first data and the second data, access information for a third application that has been accessed by the user. The method may include searching, using the access information, for domain information about a provider system that provides the third application. The method may include determining security information about the third application. The method may include computing, using the security information, a measure of security for the third application that has been accessed. The method may include performing, by applying a security policy based on the measure of security, a remediation action for the third application. In some embodiments, a first application is different from the second application. A first service provider system is different from second service provider system. A first service provider system may provide access to the first application as a first cloud service. A second service provider system may provide access to the second application as a second cloud service.

In some embodiments, the method may include determining organization information for the third application; and generating a graphical interface that displays information about the third application. The information about the application may be displayed based on the organization information and the measure of security computed for the third application. The graphical interface may indicate the remediation action performed for the third application.

In some embodiments, first data indicates that the first application has been accessed by the user through the third application. Second data may indicate that the second application has been accessed by the user through the third application. Determining the access information may include determining that the third application has been accessed to provide access to the first application and the second application.

In some embodiments, security information includes a first value that is a first indicator of a first security threat by the application and includes a second value that is a second indicator of a second security threat by the application. The first indicator may be obtained from a first data source. A first value is different from the second value. A second indicator is obtained from a second data source. The security measure may be computed by: computing a first weighted value that is based on multiplying the first value by a first weight value; computing a second weighted value that is based on multiplying the second value by a second weight value, wherein the first weight value is different from the second weight value; computing a weighted summation that is based on a summation of the first weighted value and the second weighted value; and computing a weight summation that is based on a summation of the first weight value and the second weight value. The measure of security may be a value that is computed based on dividing the weighted summation by the weight summation.

The foregoing, together with other features and embodiments will become more apparent upon referring to the following specification, claims, and accompanying drawings.

BRIEF DESCRIPTION OF THE DRAWINGS

FIGS. 15-26 illustrate interfaces for implementing a storage device as a security device for managing access to resources, in accordance with an embodiment.

DETAILED DESCRIPTION

Figure 1A:
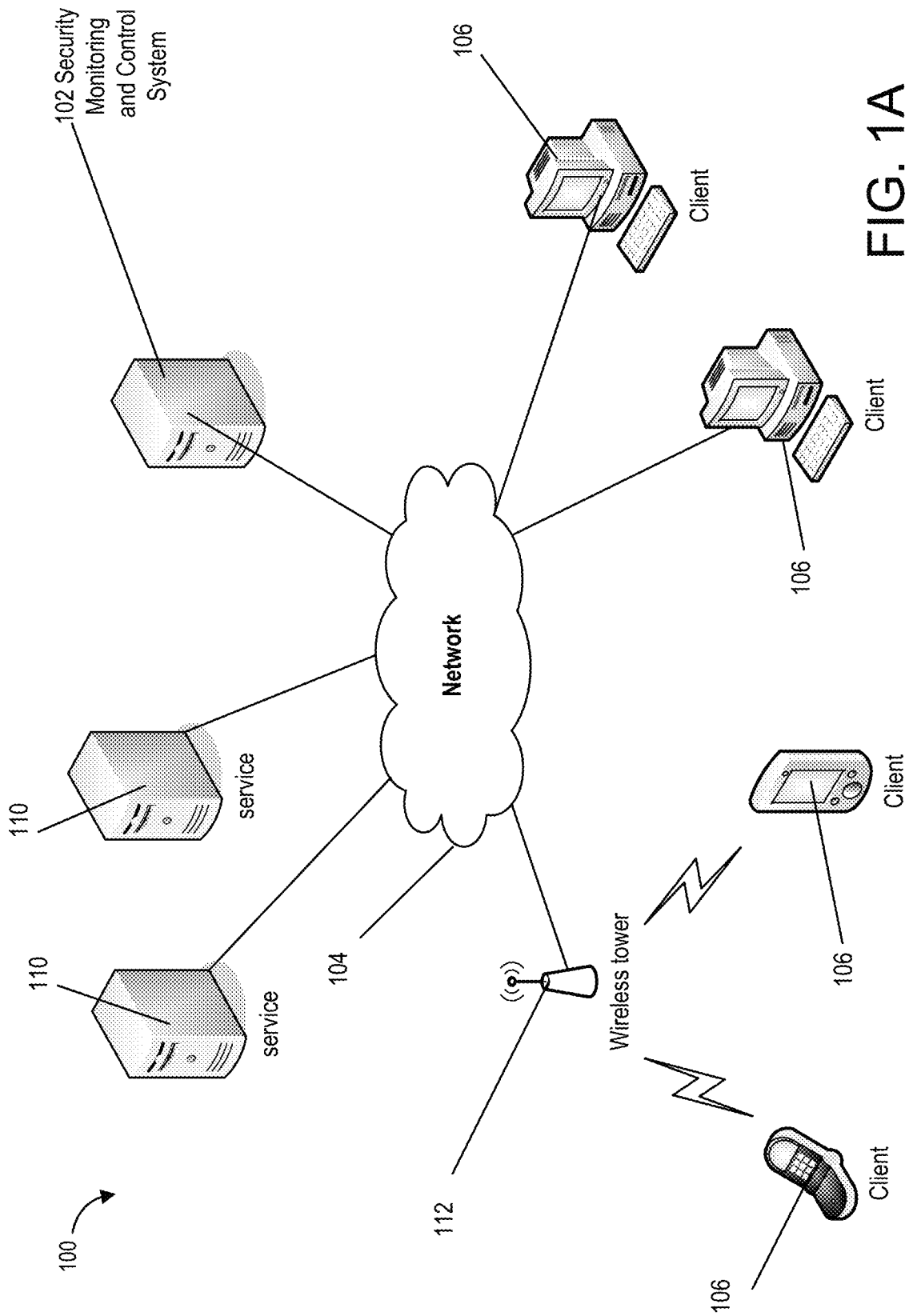
FIGS. 1A, 1B, and 1C illustrate a security monitoring and control system in accordance with an embodiment.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Although use of applications can contribute to increased productivity, applications may also pose security risks as well as compliance issues in an organization. For example, confidential files containing business sensitive information may be susceptible to information leakage if the application is not secure enough. Since such applications are often not evaluated by the organizations, they are not prepared to act upon a security breach. Moreover, some apparently useful applications may knowingly or unknowingly distribute adware or even malware.

Many organizations try to block such applications or websites but that makes employees unhappy due to impact on productivity. Moreover, employees often try to bypass such barrier, e.g., by using an external VPN service, mobile data service, etc. A recent industry trend is not to block such services to ensure that employees are productive. However, IT departments need visibility to the applications or websites used so that they can proactively monitor and block questionable or malicious applications.

The detection of applications, analysis of any security threat that they pose, and corrective action can be difficult with traditional tools. Processes for discovering and monitoring applications in accordance with several embodiments of this disclosure involves analyzing information from various data sources and correlating the data to discover application usage that may cause unauthorized disclosure of sensitive data and/or negatively affect a computing environment of an organization.

The some embodiments, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in sequence diagrams and flowcharts herein can be implemented by any of the systems disclosed herein. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in this figures of this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

I. Computing Environments for Discovery and Analysis of Applications

Turning now to the drawings, techniques are disclosed of a system 100 including a security monitoring and control system 102 (also referred to herein as "security management system" and "security system"). Security monitoring and control system 102 may be implemented within a computing environment having a communication network 104 of an organization. Network 104 may be a private network that can communicate with a public network (e.g., the Internet) to access application services 110. Examples of communication networks may include a mobile network, a wireless network, a cellular network, a local area network (LAN), a wide area network (WAN), other wireless communication networks, or combinations thereof. Security monitoring and control system 102 may be administered by a service provider, such as a security service provider (sometimes referred to as cloud access security brokers (CASB)) that configures and manages security of the organization using security monitoring and control system 102.

Tenants can be organizations or groups whose members include users of services offered by service providers (e.g., cloud service providers). Users may have individual accounts with providers and tenants may have enterprise accounts with cloud providers that encompass or aggregate a number of individual user accounts. In many embodiments of this disclosure, security monitoring and control system 102 can enables tenants to view information about security accounts including controls and activity for those accounts for various services that they use, review analytics reports, and configure security controls by a pre-set classification level of security.

In several embodiments, security monitoring and control system 102 analyzes information about user activity in one or more clouds using machine learning and other algorithms to perform threat detection and to provide recommendations concerning appropriate responses to different categories of threat. The analytics can include determining models of normal and/or abnormal behavior in user activity and detecting patterns of suspicious activity in one cloud or across multiple clouds. Some patterns may involve detecting the same action or different actions in multiple clouds that are associated with the same user account or IP address. Analytics may also include providing an alert and recommending remedial measures in the cloud(s) in which suspicious activity is detected and/or remedial measures to be taken in clouds other than those showing suspicious activity. In many embodiments of this disclosure, processes for detecting and analyzing applications on devices within a network of an organization involve collecting and combining information from various data sources.

A system for security monitoring and control in accordance with embodiments of this disclosure includes multiple components that may be located on a single hardware platform or on multiple hardware platforms that are in communication with each other. Components can include software applications and/or modules that configure a server or other computing device to perform processes for discovery and management as will be discussed further below.

A system 100 including security monitoring and control system 102, client devices 106 that can be used to access the security monitoring and control system 102, and application services 110 to be monitored in accordance with embodiments of this disclosure is illustrated in FIG. 1A. A disclosed herein, a "client" (also disclosed herein as a "client system" or a "client device") may be a device or an application executing on a device. The system 100 includes a number of different types of client devices 106 that each has the capability to communicate over a network 104. The client devices 106 communicate with the security monitoring and control system 102 and present a graphical interface for interacting with the service. The security monitoring and control system 102 can communicate with application services 110 to retrieve security configurations, application data, and other information and set security controls as will be discussed further below.

Figure 1B:
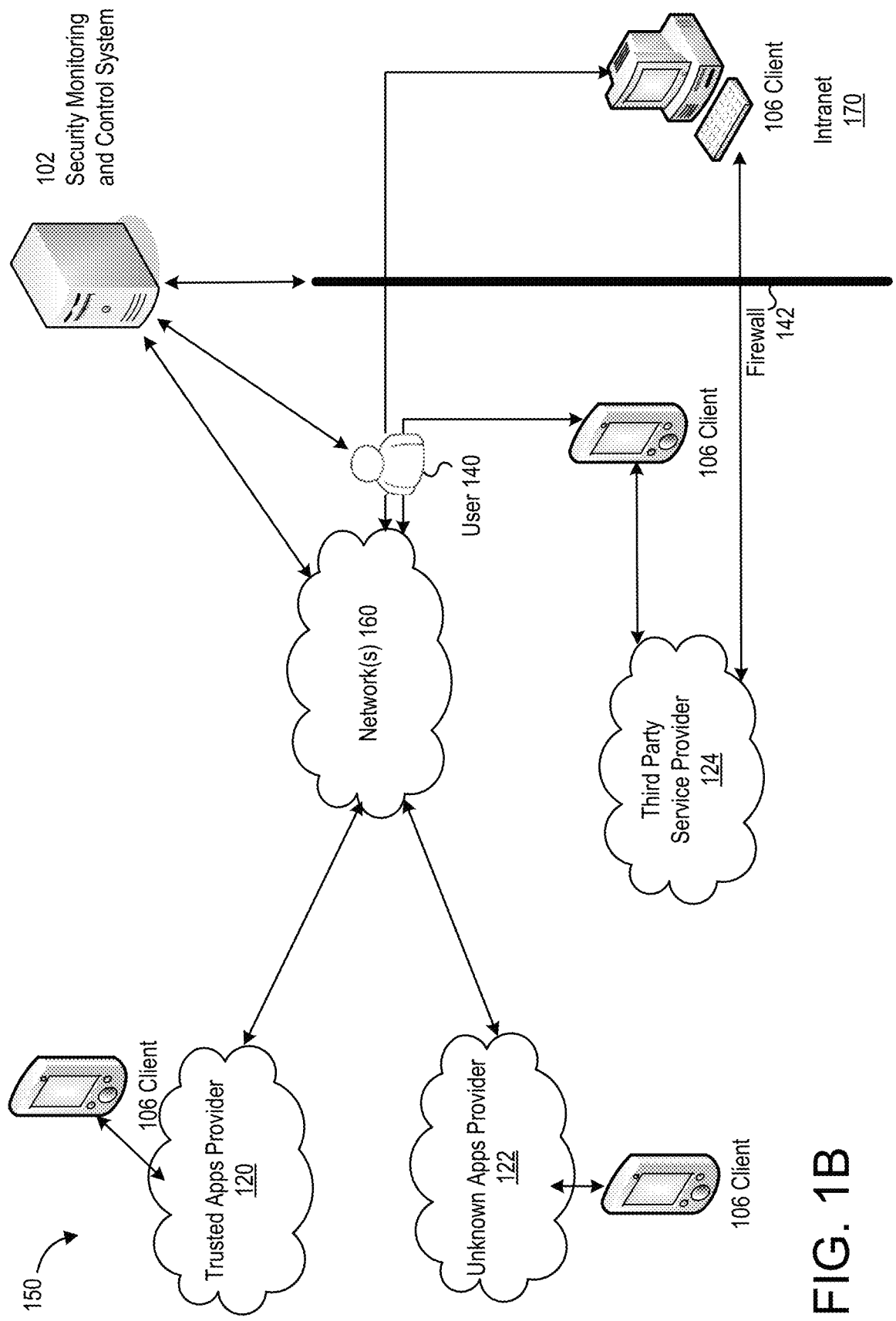

FIG. 1B illustrates system 150 with an implementation of security monitoring and control system 102 implemented for an organization. Specifically, system 150 illustrates how security monitoring and control system 102 can be implemented to detect application usage by users of an organization on client devices 106 on a communication network, such as a private network (e.g., Intranet 170) and a non-private network (e.g., the Internet 160). Examples of communication networks may include a mobile network, a wireless network, a cellular network, a local area network (LAN), a wide area network (WAN), other wireless communication networks, or combinations thereof. Client devices 106 operated in the Intranet 170 may be in an isolated computing environment protected by firewall 142. A user (e.g., a security administrator) may manage operation of security monitoring and control system 102. Security monitoring and control system 102 may be implemented in a computing environment of an organization, external to the computing environment or both. Security monitoring and control system 102 may be provided as a cloud-based service through network 160.

Each of client devices 106 may be used to access applications that are authorized or unauthorized for use on a device of an organization. Applications may be accessed by different service providers, such as a trusted apps provider 120 and an unknown apps provider 122. Client devices 106, internal and external to Intranet 170, may be used to access a service by a third party service provider 124 that enables access to an application and/or data managed by a different service provider.

Security monitoring and control system 102 can monitor application activity based on network activity by client devices of an organization through network data from one or more agents operating on network devices. Security monitoring and control system 102 can analyze and correlate data from applications to provides a deep visibility into the activities in an organization and helps to detect anomalies or emerging threats and security risks based on application usage.

Figure 1C:
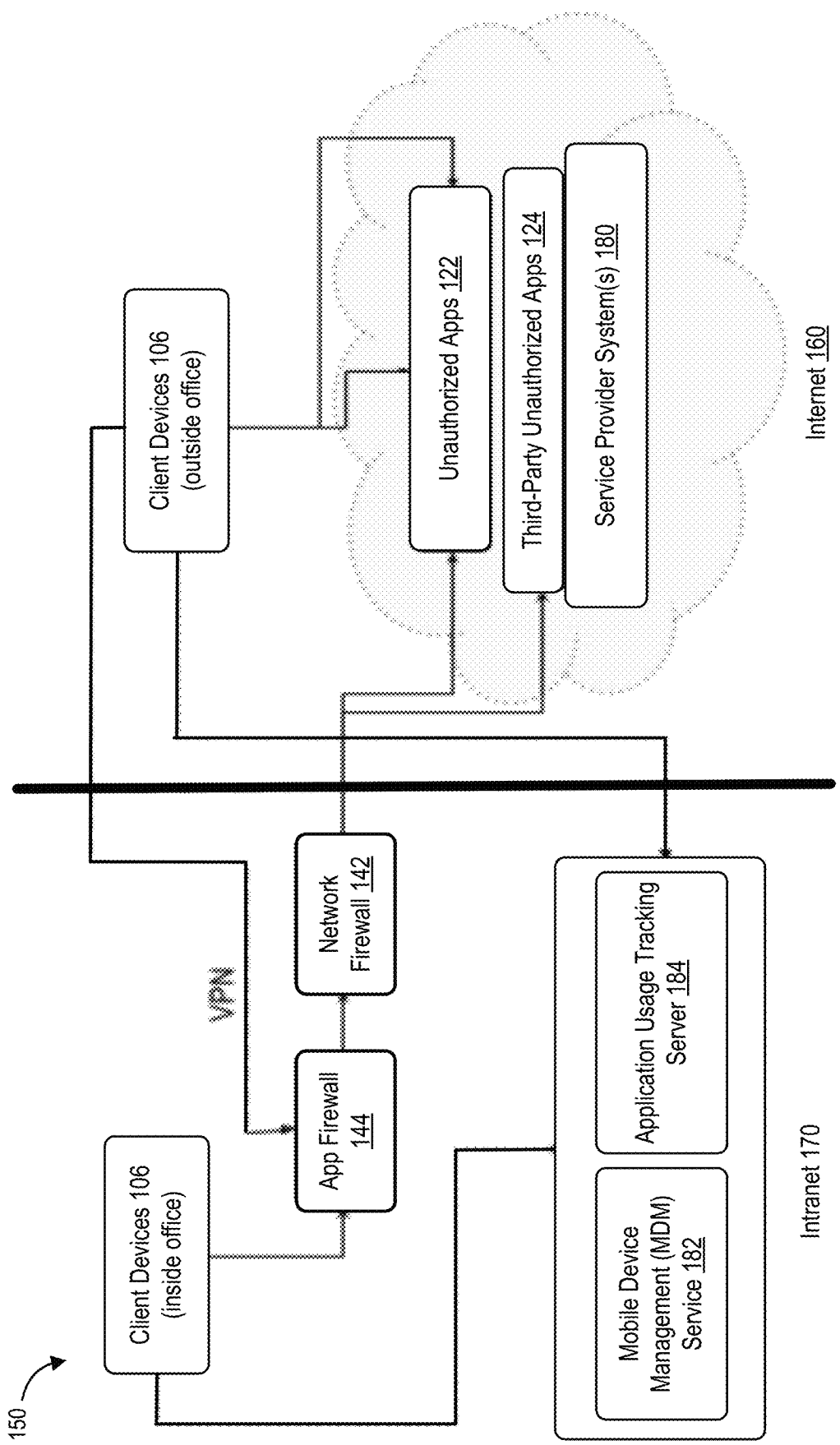

Now turning to FIG. 1C, system 150 is shown as another example of how client devices 106 such as personal BYOD ("bring your own devices") and company owned desktop/laptops may be used to access different types of applications within and outside an organization. Applications may be provided by a service provider system 180. A service provider system may also be referred to herein as a "provider system"). Each service provider system disclosed herein may be operated and managed by a service provider. Applications may include unauthorized apps 122 and third party unauthorized apps 124. An organizational user may use many sanctioned applications for daily jobs such as Salesforce for tracking customer activities, Google Apps/Office 365 for collaboration, Box for sharing files etc. These applications allow installing third-party apps inside these applications, which internally allows these third-party apps to access sanctioned applications data on behalf of the user. These unapproved third-party applications can elevate organization risks from security and compliance perspectives, since they can access business sensitive data that might be vulnerable due to poor security data security or potentially unauthorized data leaks. Therefore, such third-party apps discovery can help the IT team to have greater visibility.

Security monitoring and control system 102 can discover application usage, including shadow applications, by collecting data from multiple sources, correlating, and analyzing them with threat intelligence information. This provides a greater depth of visibility and better compliance coverage compared to simply discovering shadow IT information from network devices. When users of an organization accesses unsanctioned applications from an office network, then such connectivity related information, such as a destination network address, a requestor's network address, or a timestamp, are recorded by the network devices such as routers and firewalls (e.g., app firewall 144 and network firewall 142). Some of the application firewalls also record a requestor identity, which allows finding the actual user who is using the app. When an organizational user installs an app in the mobile devices, such as smartphones and tablets, then details of the installed app can be discovered by the MDM (Mobile device management) services 182 as long as an MDM app is installed in the devices. Similarly, when unsanctioned apps are installed by a user on company owned devices then such installation details can be discovered centrally by company owned license management using a centrally managed security management tool (e.g., application usage tracking server 184). Logs from these data sources can provide visibility to the unauthorized or shadow apps installed in the desktop/laptop devices.

II. Architecture for Security Monitoring and Control System

Figure 2:
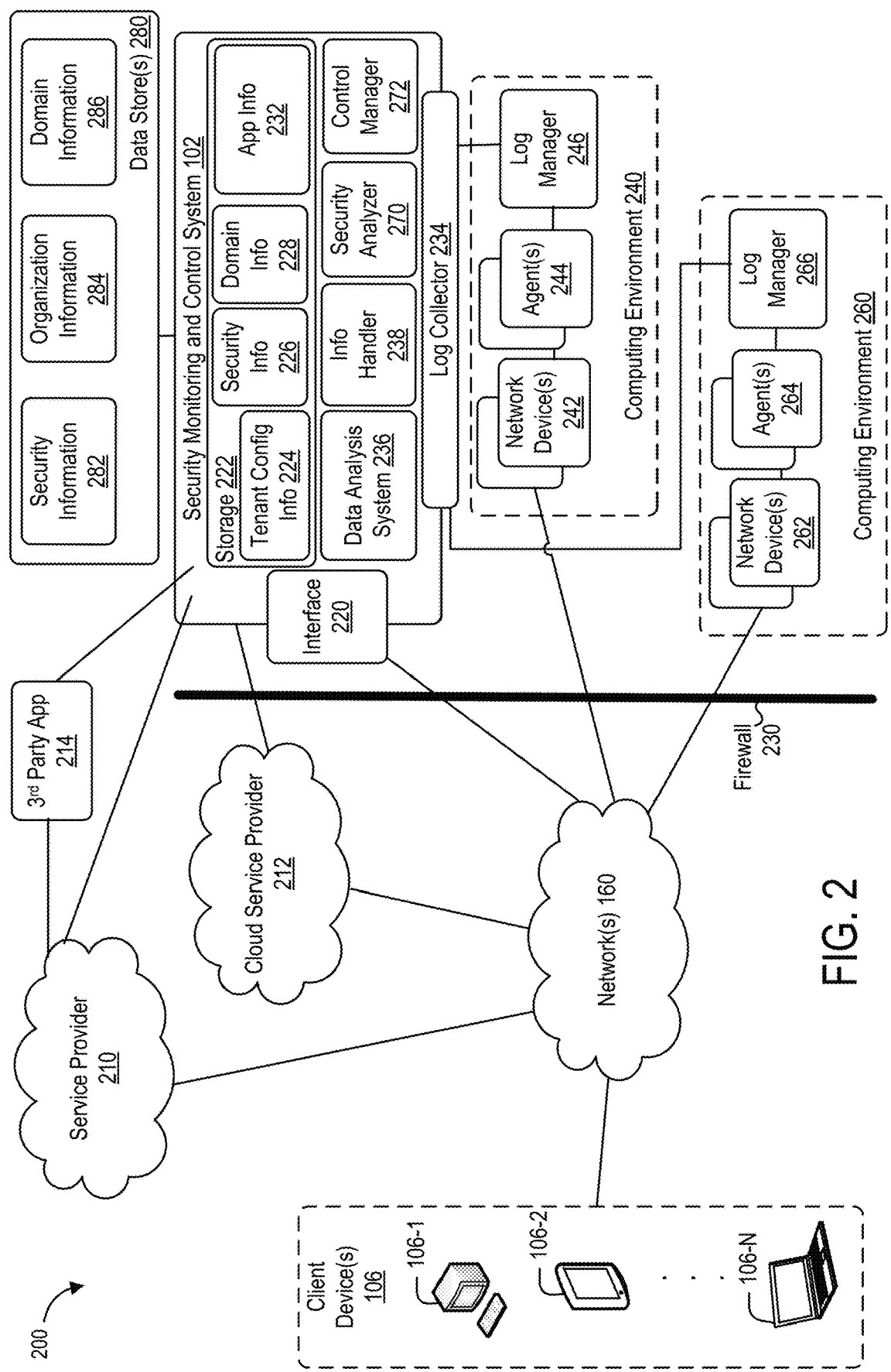
FIGS. 2 and 3 show block diagrams illustrating a security monitoring and control system in accordance with an embodiment.

Some embodiments, such as systems, methods, and machine-readable media, are disclosed for discovery and management of security for applications in a computing environment. FIG. 2 illustrates a system 200 in which a user can operate a client device, such as a client device 106-1, 106-2, ... 106-N (collectively client devices 106), to access one or more applications (also referred to herein as "apps")

from one or more service providers. For example, system 200 may include one or more service providers, such as service provider 210 and service provider 212. Each service provider may provide one or more services via a network 160 (e.g., the Internet). Services may include cloud or network-based services. For example, service provider 212 may be a "cloud" service provider. A service may include providing an application as a service. Each service provider may have a service provider system including one or more computer systems. One service provider system may be different from another.

Client device 106 may be a personal device (e.g., BYOD) of a user or a device under the management of an organization. As shown in FIG. 1C, client devices 106 may access an application of a service provider on a network of a computing environment of an organization, a network 160 external to the computing environment, or a combination thereof. An application may be operated to access data and/or resources of a computing environment of an organization. Some client devices may access an application and/or data for an application using a third party application 214, which is provided by a service provider. Applications may be registered with an organization for use as a user in that organization. Some applications may not be registered, and therefore, may be unauthorized, or unknown to an organization. Each application may utilize and/or access resources in a computing environment of an organization. Security monitoring and control system 102 may discover applications and their usage with respect to a computing environment of an organization. A client device 106 may be operated by a user of an organization, such as an administrator, to utilize a service provided by security monitoring and control system 102. Users of client devices 106 may be part of one or more tenants or groups of an organization. As such, security monitoring and control system 102 may provide services to discover and manage applications based on a per user basis and/or tenant basis.

Resources may include, without restriction, a file, a web page, a document, web content, a computing resource, or an application. For example, system 200 may include resources such as applications and/or content accessible through those applications. A resource may be requested and accessed using an application. For example, an application may request access to a web page from a resource server based on a URL identifying a requested resource. Resources may be provided by one or more computing systems, e.g., a resource server that provides access to one or more resources.

An organization may have one or more computing environments, such as a computing environment 240 and a computing environment 260. Each of the computing environments may be a cloud computing environment or an enterprise computing environment. Each of the computing environments may provide a client device of a user of an organization with access to computing resources of an organization. Each computing environment may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. A computing environment may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. A computing environment may be implemented using hardware, firmware, software, or combinations thereof.

Each of the computing environments may be implemented as a secure environment for an organization. For example, computing environment 240 and computing environment 260 of an organization may be implemented as a secure environment (e.g., an Intranet) behind a computing firewall 230. One or more firewalls may be implemented to protect the computing environment. Each of the computing environments may be implemented with one or more network devices. For example, computing environment 240 may be implemented with one or more network devices 242 and computing environment 260 may be implemented with one or more network devices 262. Each of the network devices may facilitate communication in the computing environment and with an external network (e.g., network 160) beyond firewall 230. Network devices may include, without restriction, a routers, a gateways, access points, bridges, or the like. Network data may be gathered at each of the network devices in a computing environment. The data may be gathered in log files.

Security monitoring and control system 102 may provide web-based client interfaces, dedicated application programs, application program interfaces (APIs), graphical interfaces, communication interfaces, and/or other tools for facilitating communication between client devices 106 and security monitoring and control system 102. For example, security monitoring and control system 102 may include an interface 220 for exposing services of security monitoring and control system 102. Interface 220 may generate and/or provide an interface to enable client devices 106 to access security monitoring and control system 102. Security monitoring and control system 102 may be implemented to perform operations disclosed herein including the processes disclosed with reference to FIGS. 1A-1C, and 7-14.

Security monitoring and control system 102 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Security monitoring and control system 102 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Security monitoring and control system 102 may be implemented using hardware, firmware, software, or combinations thereof.

Security monitoring and control system 102 may include at least one memory, one or more processing units (or processor(s)), and storage. The processing unit(s) may be implemented as appropriate in hardware, computer-executable instructions, firmware, or combinations thereof. In some embodiments, security monitoring and control system 102 may include several subsystems and/or modules. Each of these subsystems and/or modules in Security monitoring and control system 102 may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Security monitoring and control system 102 may also provide services or software applications that can include non-virtual and virtual environments. In some embodiments, these services may be offered as web-based or cloud services or under Software as a Service (SaaS) model to the users of clients. The services offered by security monitoring and control system 102 may include application services. Application services may be provided by security monitoring and control system 102 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in security monitoring and control system 102, which may be implemented as a cloud infrastructure system. Users can acquire the application services without the need for customers to purchase separate licenses and support. Various different SaaS services may be provided. Users operating clients may in turn utilize one or more applications to interact with security monitoring and control system 102 to utilize the services provided by subsystems and/or modules of security monitoring and control system 102.

Security monitoring and control system 102 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, security monitoring and control system 102 is coupled to or includes one or more data stores for storing data such storage 222. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In the example shown in FIG. 2, storage 222 may include tenant configuration information ("tenant config info") 224, which may include configuration information for tenants and their accounts, as well as user accounts associated with each tenant account. A user belonging to a tenant organization may have user accounts with various cloud applications. The tenant config information may also have a tenant account with the cloud applications that exercises management authority over the user accounts of users belonging to the organization. The user accounts of a user are typically associated with the tenant account of the tenant to which the user belongs. The association of user accounts to tenant accounts may be used in various ways in accordance with embodiments of the invention including retrieving information about the user activity of users associated with a tenant. As will be discussed further below, a tenant account's credentials may be used to log into service provider systems to retrieve data concerning user accounts and activity with respect to services that are associated with the tenant account. Such configuration information may include security settings for access, log settings, and access settings (e.g., whitelists and blacklists). Storage 222 may include user information about each user registered with an organization and/or tenancy of an organization. Storage 222 may include app information 232 based on events about app usage and log information gathered for network activity in a computing environment. App info 232 may include organization information obtained for an application from a data source. The information in storage 222 may be maintained and curated by security monitoring and control system 102 based on user activity and/or user input. For example, storage 222 may include registries such as those disclosed herein. Storage 222 may include security information 226 about security analysis performed by security monitoring and control system 102. Security information 226 may include security information obtained from one or more data sources. Storage 222 may include domain info 228 for domain information about service providers for applications.

Security monitoring and control system 102 may be coupled to or in communication with one or more data sources 280, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, data source 280 may include a security information data source 282, an organization information data source 284, and a domain information data source 286. Each of the data sources may be implemented by and/or accessible as a service provided by a service provider system. Each data source may include an interface for requesting data with respect to an application and/or a provider of an application. For example, security information data source 282 may be provided by a corporation that provides Security Score Card® as a service. In another example, organization information data source 284 may be provided by ClearBit® service. Domain information source 286 may be provided by provider system that provides a domain name system (DNS) lookup service.

In some embodiments, security monitoring and control system 102 may include a log collector system 234 that performs operations for collecting network data about activity in a computing environment. Network data may be collected from log files obtained from one or more computing environments being monitored. Log collector system 234 may be configured to communicate with one or more modules and/or subsystems implemented in each computing environment to collect network data. For example, each of computing environment 240 and computing environment 260 may include a log manager 246 and a log manager 266, respectively. Each log manager can collect and/or aggregate data from one or more agents (e.g., agents 244 in computing environment 240 and agents 264 in computing environment 260) implemented to collect data about network activity. The data may be collected in the form of log files. Each log manager and/or agents may be implemented on a network device or in communication with a network device. Log collector system 234 may communicate with log managers 246, 266 and/or agents 244, 264 to gather data about network activity within a computing environment.

Each of the log managers and agents may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Log collector system 234 may be configured to communicate with each service provider through an interface provided by each service provider. Log collector system 234 can obtain log files and/or event data from a service provider about usage of services by one or more users. Log collector system 234 may be configured to communicate with a module (e.g., an agent) on a client device and/or a mobile device management service to obtain event information about application usage.

Data about network activity and application usage may be processed by data analysis system 236 in security monitoring and control system 102. Data analysis system 236 may implement techniques disclosed herein to analyze network data including log files to determine unique applications that are accessed. Data analysis system 236 may perform operations to identify domain information about a domain of a service provider that provides an application. Domain information may be obtained from one or more data sources, such as domain information 286. Domain information may be obtained by performing a query of a data source and/or requesting a certificate from a service provider of the application.

Security monitoring and control system 102 may include an info handler system 238 that is configured to obtain information about and/or related to usage of an application. Info handler 238 may communicate with one or more data sources 280 to obtain information. Info handler 238 may manage and curate information stored in storage 222. All or some of the information is stored in storage 222 may be based on user input and/or curation by a user.

Security analyzer 270 in security monitoring and control system 102 can implement techniques disclosed herein to determine a measure of security with respect to applications, users, or combinations thereof.

Control manager 272 in security monitoring and control system 102 may handle management and control of access to applications in a computing environment. Security monitoring and control system 102 may use one or more policies (e.g., security policies) to control access permitted to applications by a device with respect to a computing environment of an organization. A policy may be configured by a user with respect to one or more users, or collectively a tenancy. A policy may indicate remediation actions to be performed based on security analysis of application usage by users. Remediation may include sending a notification, displaying information (e.g., a report), and/or limiting or preventing access to an application. Control manager 272 may communicate with a computing environment to configure a network device and/or a firewall to prevent or limit access to an application. Such control may prevent if not reduce security risks and/or minimize inefficient or undesirable consumption of computing resources (e.g., bandwidth and memory usage). Control manager 272 may send one or more instructions to a computing environment and/or a network device to control access to an application. In some embodiments, security monitoring and control system 102 may implement a module (e.g., an agent) on each client device 106, which is configured to communicate with security monitoring and control system 102. Control manager 272 may send one or more instructions to the agent on a client device 106 to alter functioning of the device to prevent or reduce access to an application.

Figure 3:
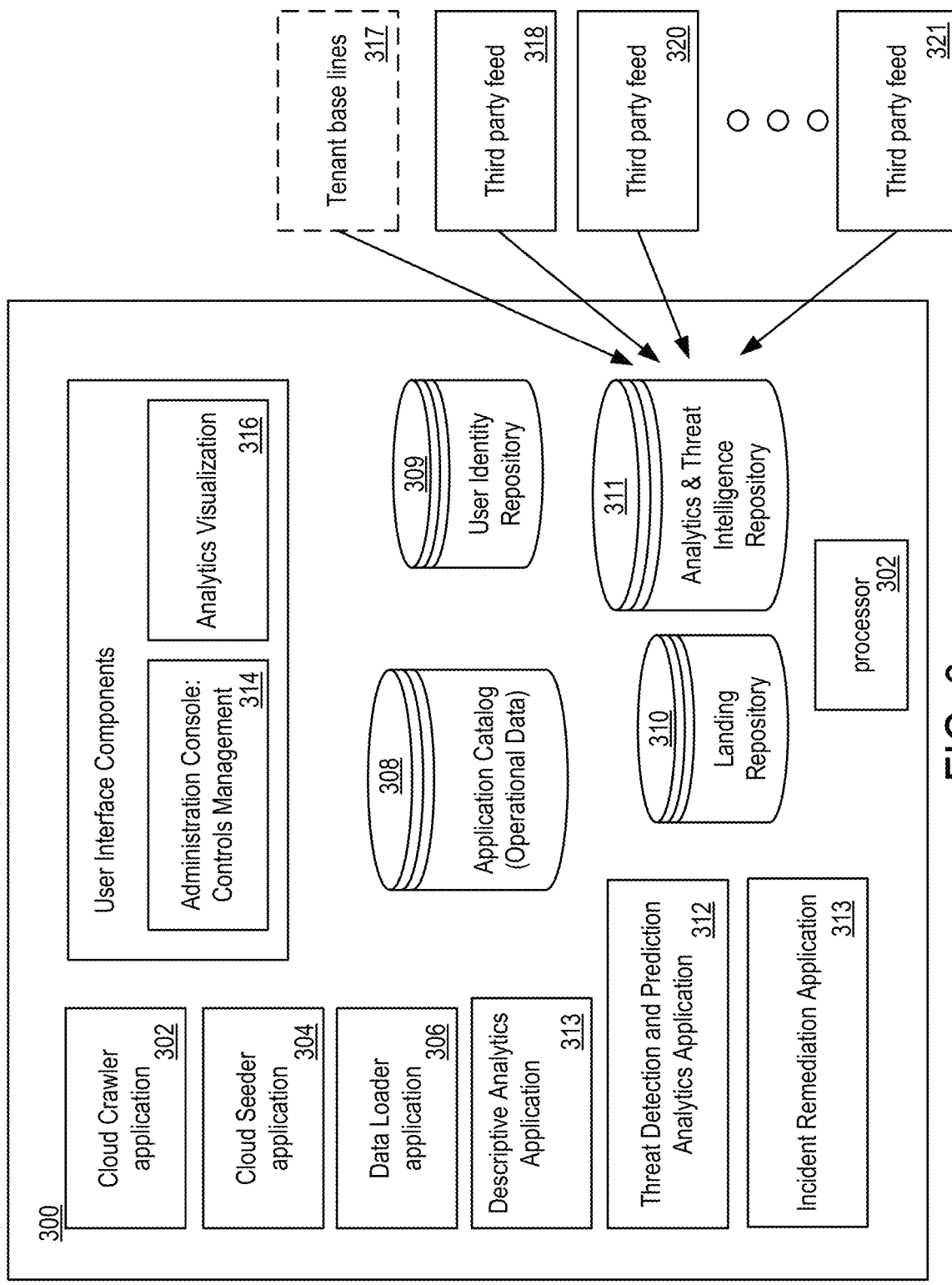

In many embodiments of this disclosure, a system for security includes management applications executing on a hardware platform, user interface components, and data warehouses stored on a hardware platform. A system 300 for security in accordance with embodiments of this disclosure is illustrated in FIG. 3. System 300 may be implemented in a security monitoring and control system as disclosed herein, such as security monitoring and control system 102. Cloud management applications in the system 300 can include a cloud crawler 302, a cloud seeder 304, and a data loader 306. As will be discussed in greater detail further below, a cloud crawler application 302 can retrieve information about security controls from cloud providers, a cloud seeder application 304 can modify the security controls of a tenant account with a cloud provider to reflect a desired security posture, and a data loader application 306 can retrieve activity information on a tenant's account with a cloud provider and generates analytics.

In several embodiments, data retrieved by the cloud crawler application 302 is entered into an application catalog database 308 and data retrieved by the data loader application 306 is entered into a landing repository 310 and/or analytics and threat intelligence repository database 311. The data entered into a landing repository 310 may be in different formats and/or have different ranges of values—this data may be reformatted and/or structured before being moved to the analytics repository 311. The data concerning activity information in the analytics repository 311 can be utilized to generate reports that may be presented visually to a system administrator via a user interface and to generate analytics for determining threat level, detecting specific threats, and predicting potential threats.

The aggregation of activity information in the analytics repository 311 concerning access patterns and other event statistics enables the system to establish baselines of user behavior. Machine learning techniques can then be applied to detect threats and provide recommendations concerning how to respond to threats. Threat models can be developed to detect threats that are known or unknown or emerging. Threats can also be identified by comparing activity data with external threat intelligence information, such as information provided by third-party providers, as will be discussed further below.

The accounts of a particular user in different cloud applications (e.g., different user identities) can be associated together in a user identity repository 309. The user identity repository 309 and/or other memory in the cloud security system can store information concerning tenant accounts and user accounts associated with each tenant account. A user belonging to a tenant organization may have user accounts with various cloud applications. The tenant organization may also have a tenant account with the cloud applications that exercises management authority over the user accounts of users belonging to the organization. The user accounts of a user are typically associated with the tenant account of the tenant to which the user belongs. The association of user accounts to tenant accounts may be used in various ways in accordance with embodiments of this disclosure including retrieving information about the user activity of users associated with a tenant. As will be discussed further below, a tenant account's credentials may be used to log into cloud application services to retrieve activity data concerning user accounts that are associated with the tenant account.

As will be discussed in greater detail below, the user identity repository 309 can also be utilized to facilitate user tracking and profile across multiple cloud applications. In addition, collecting information about user behavior across multiple cloud services enables the system to, when a threat is detected based upon behavior on one or more cloud services, preemptively alert a system administrator with respect to threats on other cloud services and/or proactively secure other services on which a user maintains data by applying remedial measures, such as adding additional steps to authentication, changing passwords, blocking a particular IP address or addresses, blocking email messages or senders, or locking accounts.

In several embodiments of this disclosure, the system 300 includes applications or software modules to perform analytics on collected data as will be discussed in greater detail further below. The applications or software modules may be stored in volatile or non-volatile memory and, when executed, configure the processor 301 to perform certain functions or processes. These applications can include a threat detection and prediction analytics application 312 and/or descriptive analytics application 313. The threat detection and prediction analytics application 312 can generate analytics using machine learning and other algorithms to identify and predict security threats from patterns of activity and behavioral models. The descriptive analytics application 313 can generate analytics such as, but not limited to, statistics on users, user activity, and resources. Analytics may be performed using data stored in the analytics and threat intelligence repository 311.

As will be discussed further below, embodiments of this disclosure may include remediation functions that provide manual and/or automated processes in response to threats. In some embodiments, analytics can utilize information received from tenant systems that describes threat intelligence provided by the tenant. These sources, that can be referred to as customer base lines 317, can include information such as, but not limited to, specific IP addresses to watch or block, email addresses to watch or block, vulnerable browsers or versions thereof, and vulnerable mobile devices or versions of mobile hardware or software. In additional embodiments, analytics can utilize information received from external third party feeds 318, 320, and 321 to augment the threat intelligence by providing external information of security threats such as, but not limited to, identification of infected node points, malicious activity from a particular source IP address, malware infected email messages, vulnerable web browser versions, and known attacks on clouds.

The incident remediation application 313 can be utilized to coordinate and/or perform remediation actions in response to detected threats. It may be called when a recommended remediation action is presented and selected in an alert. The incident remediation application 313 may perform the selected remediation action or instruct another application, such as a cloud seeder application 304 to perform the selected remediation action. When the selected remediation action is to be manually performed or is external to the cloud security system, the incident remediation application 313 may track the status of the remediation action and whether it is complete. The incident remediation application can be used to save the results of a manual or automated remediation action into memory. In several embodiments, a selected remediation action is to be performed by a system external to the cloud security system, such as by a third-party's or a tenant's incident remediation system. In such cases, the incident remediation application 313 may instruct or invoke the third-party's or tenant's incident remediation system to perform the action using an automated integration process.

The cloud seeder application 304 can be utilized to implement security policies by setting security controls within a tenant's accounts in various cloud applications. As will be discussed in greater detail further below, a cloud seeder may set security controls in various conditions such as, but not limited to, part of remediation of a threat or on call by a system user. Examples of security controls and techniques to adjust security control may be implemented using techniques disclosed in U.S. patent application Ser. No. 14/523,804, filed on Oct. 24, 2014 and entitled "SYSTEMS AND METHODS FOR CLOUD SECURITY MONITORING AND THREAT INTELLIGENCE," now U.S. Pat. No. 9,692,789.

In further embodiments of this disclosure, user interface components include an administration console 314 that provides controls management for a user to set the security controls for one or more clouds and an analytics visualization console 316 for viewing analytics generated by the system. As will be discussed in greater detail further below, the data in the data warehouses can be used to generate the information and reports shown in the user interface. The use of cloud management applications to retrieve security configuration data from cloud applications is discussed below.

Figure 4:
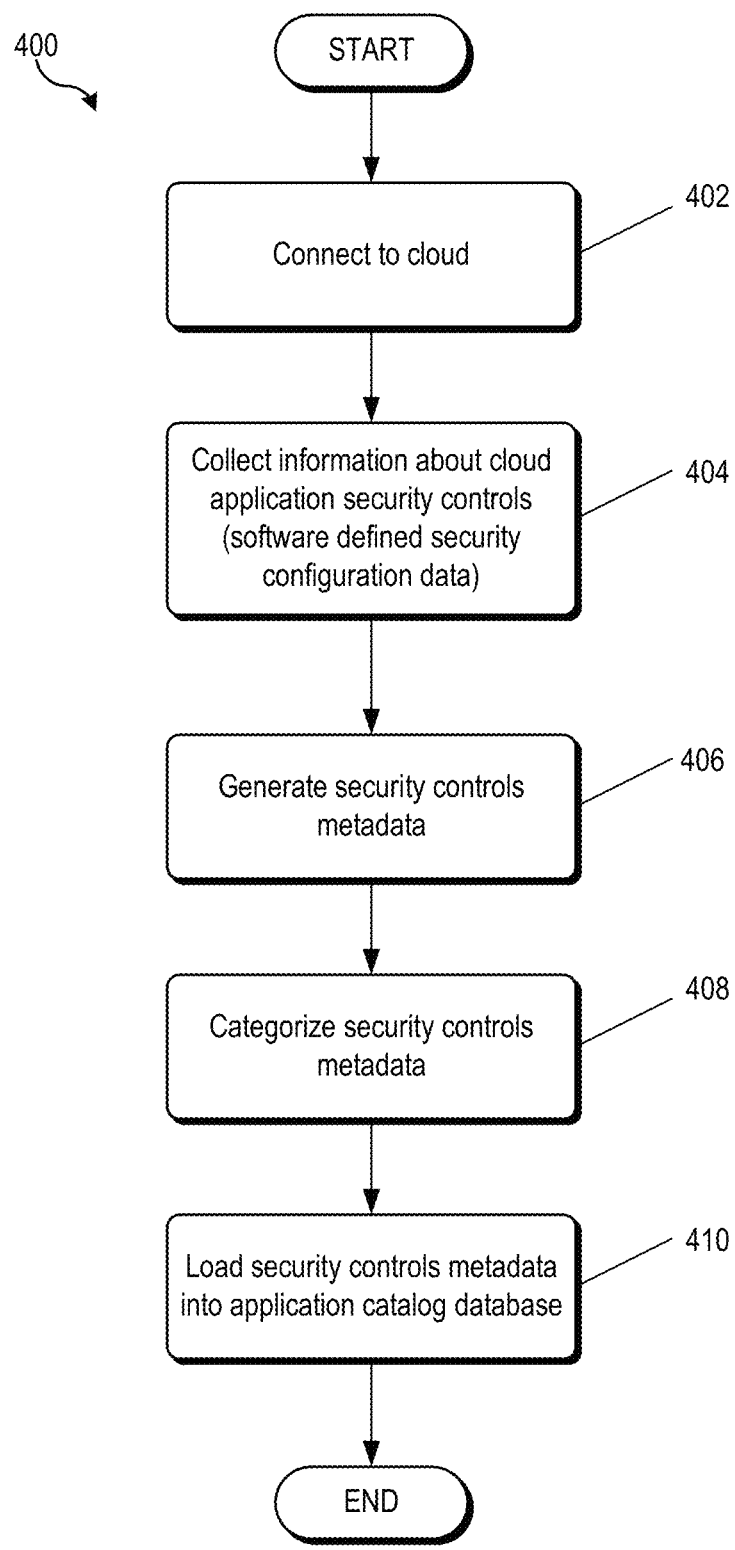
FIG. 4 is a flowchart illustrating a process for retrieving software defined security configuration data from a cloud service in accordance with an embodiment.

III. Process for Retrieving Software-Defined Security Configuration Data from Cloud Services In many embodiments of this disclosure, a cloud crawler application retrieves software defined security configuration data from cloud services. Software defined security configuration data describes the configuration of security controls in a particular cloud service. Security controls are mechanisms that restrict access to the application and data housed by the cloud. Software defined security configuration data can include data describing: roles that are defined for users, groups and grouping of users, encryption keys, tokens, access controls, permissions, configurations, type of authentication policy, mobile access policy, and many other types of security controls. A process for retrieving software defined security configuration data from cloud services is illustrated in FIG. 4.

The process includes step 402 for connecting to the cloud. The cloud may require authorization or some other manifestation of consent for access to the system and internal data. Authorization may be provided by a token (such as using the OAuth open standard for authorization) or by credentials (such as a user name and password). One skilled in the art will recognize that there are various other techniques that can be utilized in authorizing access to a cloud provider's system and data. The connection may also include providing a service URL (universal resource locator).

The process further include step 404 for collecting software defined security configuration data about the cloud application's security controls. The software defined security configuration data can be collected by utilizing an API (application programming interface) made available by the cloud application. API's and classes of API's that may be utilized in accordance with embodiments may include REST (Representational State Transfer), J2EE (Java 2 Platform, Enterprise Edition), SOAP (Simple Object Access Protocol), and native programmatic methods (such as native application API's for Java). The information could also be requested using other techniques including scripting languages (such as Python and PHP), deployment descriptors, log files, database connectivity through JDBC (Java Database Connectivity) or REST, and resident applications (cloud beacons) as will be discussed further below. The information that is sent or received can be represented in a variety of formats including, but not limited to, JSON (JavaScript Object Notation), XML (Extensible Markup Language), and CSV (Comma Separated Values). One skilled in the art will recognize that any of a variety of formats may be utilized in accordance with embodiments of this disclosure as suitable to a specific application.

The software defined security configuration data received about a cloud application's security controls can be used at step 406 to generate security controls metadata, that is, normalized descriptors for entering the information into a common database. The security controls metadata is categorized at step 408 (mapped into categories) and indexed. The categorization may comply with a standard specified by a security organization and/or may be certified and/or audited by a third party. In addition, security controls metadata and/or the categorization of metadata may be formulated around the requirements of a particular regulation or standard. For example, regulations and standards such as the Health Insurance Portability and Accountability Act (HIPAA), Sarbanes-Oxley Act, FedRAMP, and Payment Card Industry Data Security Standard (PCI DSS) may require reporting and audit trails. Security controls metadata can be formatted in a way to display the types of information required by the regulations and standards and facilitate the generation of reports needed.

The security controls metadata is entered at step 410 into an application catalog database. In many embodiments of this disclosure, the application catalog database is a Cassandra database. In other embodiments, the application catalog database is implemented in other types of databases appropriate to the application. One of ordinary skill in the art will recognize that any of a variety of databases can be used to store an application catalog in accordance with embodiments of this disclosure for later retrieval, report generation, and analytics generation as will be discussed further below.

A specific process for discovering and storing security controls metadata in accordance with an embodiment of this disclosure is discussed above. Any of a variety of processes for retrieving software defined security configuration data and generating security controls metadata can be utilized in accordance with embodiments of this disclosure. One skilled in the art will recognize that the number and types of controls and the mechanisms for retrieving software defined security configuration data may vary in different embodiments of this disclosure as supported by different cloud applications. For example, other cloud applications such as Office 365, GitHub, Workday, and various Google apps may be supported using retrieval mechanisms specific to the application. Furthermore, processes for retrieving software defined security configuration data can be automated or manual based on target cloud provider support.

IV. Controls Management Platform

In many embodiments of this disclosure, a controls management platform provides a user with a normalized view of controls for multiple clouds. The platform can include a user interface that displays a simplified view of controls for different clouds on the same screen. Information provided to the controls management platform can be retrieved from an application catalog database using metadata based schema mapping. The platform can be used to assign consistent access policies across clouds. Controls can be displayed and/or set according to specified classifiers, such as, but not limited to: standard, stringent, custom. A higher level classification corresponds to more stringent controls. In several embodiments, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In several embodiments of this disclosure, the controls management platform can also provide for plug-in interfaces to integrate with SaaS, PaaS, and native applications.

A controls management platform user interface may display key security indicators in a library format with risk factors that are color coded (such as red, green, yellow). Other statistics or metrics may be displayed such as, but not limited to, user logins attempts, groups with most added users, most deleted files, users with the most deleted files, and users downloading the most files. Some types of information may be specific to a particular cloud application provider, such as Salesforce.com showing who is downloading opportunity/budget data, contracts, or contacts. In several embodiments of this disclosure, a user interface provides a unified view of security controls for a tenant's registered cloud applications. The user interface may display values set for any or all security controls set for different cloud applications, as well as deviations of the current values from values associated with predetermined policies or configurations. The collection of activity data from cloud application providers is described next.

V. Process for Collecting Activity Data from a Cloud Service

Figure 5:
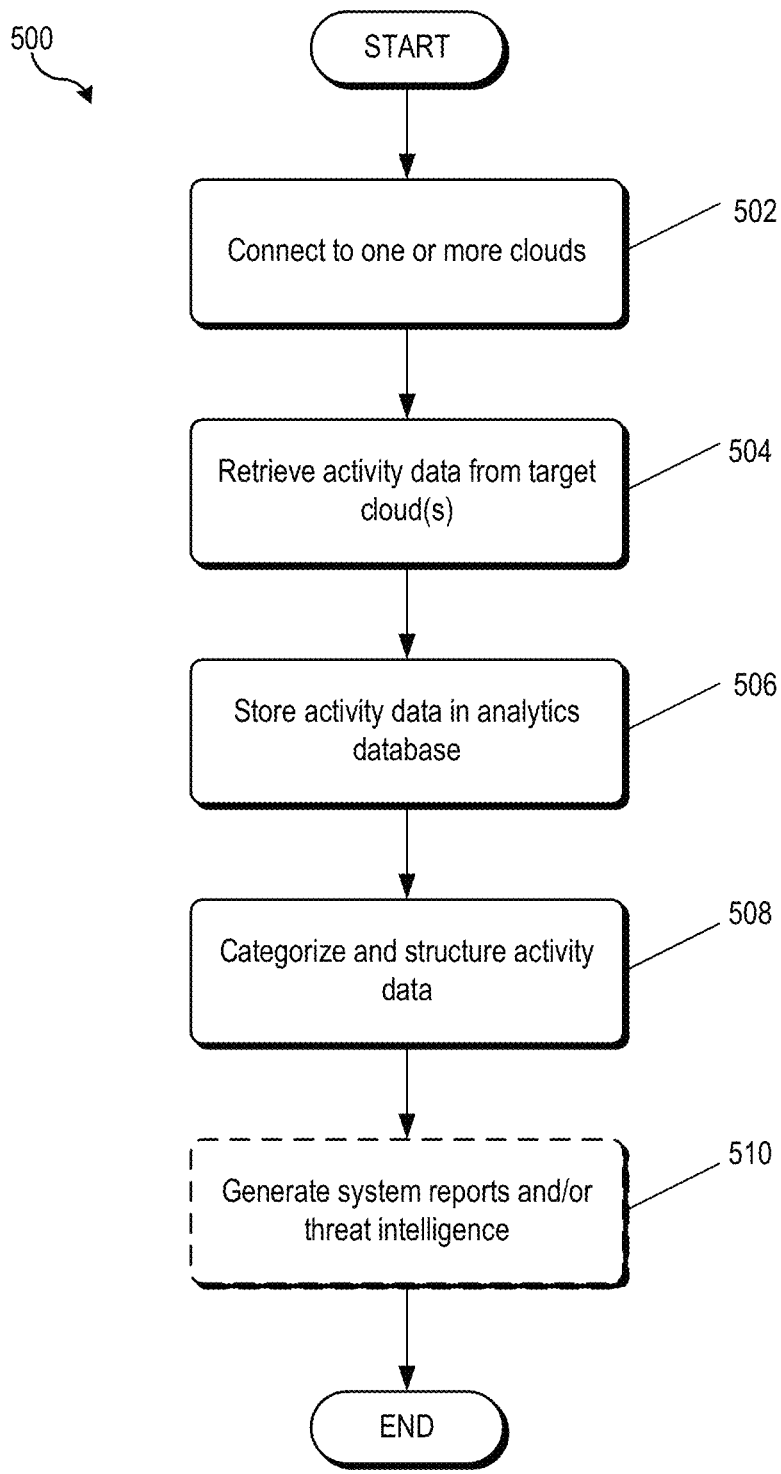
FIG. 5 is a flowchart illustrating a process for collecting activity data from a cloud service in accordance with an embodiment.

In many embodiments of this disclosure, a cloud data loader application configures a computing device to collect activity data from a cloud service about a tenant's user activity, security configuration, and other related pieces of information. A process for collecting activity data from a cloud service in accordance with embodiments of this disclosure is illustrated in FIG. 5.

The process includes step 502 for connecting to one or more clouds and step 504 for collecting activity data from the clouds. In many embodiments, the connection is made over an encrypted communication channel. In further embodiments, the connection must be authenticated by a token or using login credentials as in the connection made with a cloud crawler application discussed further above. In several embodiments of this disclosure, the collection is scheduled to occur periodically (e.g., every 4 hours or every 6 hours). In many embodiments, the schedule for collection is configurable by the tenant. In further embodiments, data is collected and retrieved in real time as events occur utilizing a real-time computation system such as, for example, Storm. The system may be configured to designate certain events or activity as high risk events for retrieval near real-time outside scheduled retrieval.

Activity data can include various types of information made accessible by a remotely hosted cloud application system to a system external to the cloud application system when the external system holds the proper credentials, which may be issued by the cloud application system or another authorizing entity. Activity data associated with user accounts can include information relating to the use of and/or actions taken with a user account at a cloud application. Activity data can include sources of information such as a user log(s) or audit trail(s). More specific types of activity data can include, but are not limited to, login and logout statistics (including attempts and successes), IP addresses used to access the application, devices used to access the application, and cloud resources that were accessed (including, but not limited to, files and folders in a file management cloud application [such as Box], employees and contractors in a human resource cloud application [such as Workday], and contacts and accounts in a customer relationship management cloud application [such as Salesforce]). Activity data can include the user account or other user identifier for the user associated with the events or statistics. Activity data can include information about system status or activity of a cloud application system such as, but not limited to, server activity, server reboots, security keys used by a server, and system credentials, where this information is visible or accessible to a system using authorized credentials.

Activity data may also include information about the security configuration of a tenant (and associated users) account. Security configuration can include the values to which security controls (discussed further above) for a tenant (and/or associated users) are set.

In some embodiments, certain events are considered high risk and activity data related to such events are retrieved near real-time outside of a scheduled interval.

The retrieved activity data is stored at step 506 in an analytics and threat intelligence repository database 311. The analytics and threat intelligence repository database 311 may be any database or data repository with query capability. In several embodiments of this disclosure, the analytics and threat intelligence repository database 311 is built in a NoSQL based infrastructure such as Cassandra or other distributed data processing system, although any data warehouse infrastructure may be utilized as appropriate for the application. In some embodiments, the data is first entered into a landing repository 310 and reformatted and/or structured before being moved to an analytics repository 311.

In some embodiments of this disclosure, the data may be received in different formats that are utilized by different cloud applications. For example, the data may be formatted in JSON (JavaScript Object Notation) or other data interchange formats, or may be available as log files or database entries. In further embodiments, the process includes step 508 for normalizing the data and reformatting the data into a common format for storage in and retrieval from the analytics and threat intelligence repository database 311. Reformatting the data may include categorizing and structuring the data into the common format. In several embodiments of this disclosure, the database is adaptive to structural changes and new values by running automated processes to check for changed data. In some embodiments, a cloud crawler application (as discussed further above) recognizes differences in the structure or values of the data retrieved and the changes are implemented in the application catalog database 308 and/or analytics and threat intelligence repository database 311. System reports may be pre-generated at step 510 by jobs that are scheduled to run on the data set. Specific processes for utilizing a cloud loader application to collect activity data are discussed above. Any of a variety of processes can be used for collecting activity data in accordance with embodiments of this disclosure. Reports that can be pre-generated or generated on demand by a system user or administrator in accordance with embodiments of this disclosure are discussed below.

VI. Reports

Data stored in an application catalog database and/or analytics and threat intelligence repository database 311 can be used to generate a variety of reports. Categories of reports can include: authentication and authorization, network and device, systems and change data, resource access and availability, malware activity, and failures and critical errors. Reports can be based on various attributes such as, but not limited to, per application, per user, per secured resource, and per device used for access. Reports may highlight recent changes such as updated features in a cloud application or newly modified policies. Reports may be pre-generated by scheduled jobs (e.g., for performance reasons) or may be requested by a user or administrator.

In various embodiments of this disclosure, reports include analytics generated on the data. Analytics may utilize Apache Software Foundation technologies such as Hadoop, Hive, Spark, and Mahout or other features as available in the data storage framework used. Several embodiments utilize the R programming language to generate analytics. In further embodiments, the generation of analytics includes the use of machine learning algorithms, proprietary algorithms, and/or external threat intelligence from external commercial sources such as FireEye and Norse or public threat intelligence communities such as Zeus and Tor. Techniques for generating analytics in accordance with embodiments of this disclosure are discussed below.

VII. Analytics and Security Intelligence

Figure 6:
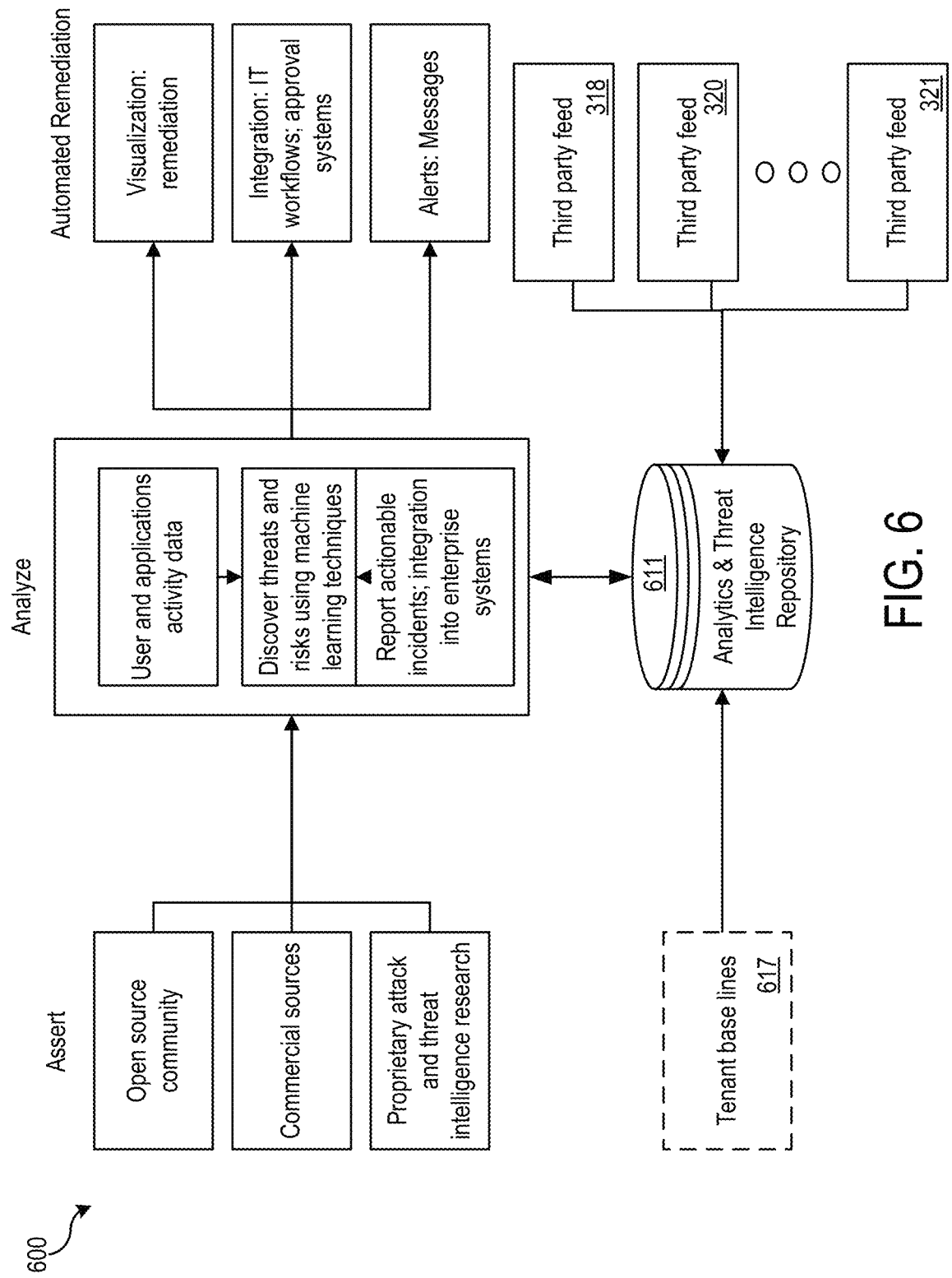
FIG. 6 illustrates components of a security monitoring and control system for analyzing application usage in accordance with an embodiment.

A security monitoring and control system in accordance with embodiments of this disclosure can generate analytics using collected data. Analytics may be generated by an analytics process and/or an analytics module referred to as an analytics engine. An overview of generating analytics using components of a threat intelligence platform 600 in accordance with embodiments of this disclosure is illustrated in FIG. 6. Platform 600 may be implemented in system 200. All or part of platform 600 may be implemented in security monitoring and control system 102.

One class of analytics that may be generated is descriptive or statistical analytics. Statistical data can be generated using a pre-defined set of system queries, such as, but not limited to, MapReduce jobs and Spark and Apache Hive queries. Descriptive analytics can be generated either for a single application or across multiple applications using correlation techniques. Examples of reports that can be generated include, but are not limited to, login statistics (e.g., users with the most failed logins, IP address based login history including consideration of IP reputation, geo-location, and other factors), user statistics (e.g., users with the most resources [files, EC2 machines, etc.], entitlements across clouds, number of changed passwords), activity statistics (e.g., activity of a user across clouds), statistics on key rotation (e.g., whether SSH keys have been rotated within the last 30 days), and resource statistics (e.g., number of folders, files downloaded by users, files downloaded by roaming or mobile users). Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, but not limited to, deviations from base line expectations, rare and infrequent events, and behavior analytics to derive suspicious behavior of a user. Algorithms and profiles can be trained to intelligently predict whether an unusual behavior is a security risk. Third party feeds from providers such as, but not limited to, MaxMind, FireEye, Qualys, Mandiant, AlienVault, and Norse STIX can be integrated to augment the threat intelligence by providing external information of and relating to potential security threats such as, but not limited to, IP (Internet Protocol) address reputation, malware, identification of infected node points, vulnerable web browser versions, use of proxy or VPN server by a user, and known attacks on clouds. In several embodiments, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file access, sales transactions, or instances of virtual machines.

In many embodiments of this disclosure, various types of algorithms can be particularly useful for analyzing the data. Decision tree, time series, naive Bayes analysis, and techniques used to build user behavior profiles are examples of machine learning techniques that can be utilized to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity in one cloud or across multiple clouds over a series of time. As discussed further above, activity data from different clouds may be in different formats or with different possible values or ranges of values. Normalizing the data in the processes discussed above may include reformatting the data such that it is comparable, have the same meaning, and/or bear the same significance and relevance between different clouds. Thus, algorithms can aggregate and compare data from different clouds in meaningful ways. For example, a series of failed logins with a particular user account in one cloud may be deemed not to be a threat. However, a series of failed logins with user accounts associated with a user across multiple clouds may indicate a concerted effort to crack the user's password and therefore set off an alarm. Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In several embodiments of this disclosure, data collected over time is used to build models of normal behavior (e.g., patterns of events and activity) and flag behavior that deviates from normal as abnormal behavior. After one or more flagged event or activity is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over period of time can be used with machine learning algorithms to generate patterns referred to as user behavior profiles. The activity data can include contextual information such as IP address and geographic location.

Algorithms for association rule learning can be used to generate recommendations. In several embodiments of this disclosure, profile linking algorithms are used to link activities across multiple cloud applications by finding cross application correlation. A single user can be identified across multiple clouds using one or more attributes or identification factors, such as a primary user identifier (ID) that is commonly used across the clouds or a single sign-on (SSO) authentication mechanism (e.g., Active Directory, Okta). Correlation of activities across applications can include finding users with a first entitlement in a first cloud application that have a second entitlement in a second cloud application, users logged into two cloud applications simultaneously from different IP addresses, users who have several failed login attempts and then change their password, and common users with numerous failed logins in two cloud applications.

In many embodiments of this disclosure, a user identity repository 109 can be utilized to facilitate user tracking and profile across multiple cloud applications. A particular user's accounts in different cloud applications may be linked by associating together the user identifier associated with the accounts (e.g., jdoe, john.doe, etc.), by a primary (universal) user identifier or SSO mechanism as mentioned above, or other method. A user identity repository 109 can contain information relating together the accounts of each user associated with a tenant. A user who utilizes multiple cloud application accounts that under the control or ownership of a tenant may be referred to as an "enterprise user."

In several embodiments of this disclosure, a recommendation engine tracks user activity for anomalous behavior to detect attacks and unknown threats. The recommendation engine can track user activity across multiple clouds for suspicious events. Events can include pre-defined at-risk operations (e.g., downloading a file containing credit card numbers, copying encryption keys, elevating privileges of a normal user). An alarm can be sounded with details of the event and recommendations for remediation.

Dynamic policy based alerts can be generated for events pertaining to a specific user/employee. A process can monitor activity data associated with the specific user and generate a customized alert for specific actions taken by the user.

In many embodiments of this disclosure, an algorithm is designed to simulate normal user activities using user activity data in the analytics and threat intelligence repository database 311. The simulation can be used to train other machine learning algorithms to learn normal behavior of a user in the system. In general, a particular security issue may not always repeat, and hence may not be detected by a purely supervised algorithm. However, techniques such as outlier detection establish a baseline that is useful for detecting anomalous activities. Such anomalous activities along with contextual threat intelligence can provide more accurate prediction of threats with low prediction errors.

In further embodiments of this disclosure, analytics can be used to detect security controls drift, which can refer to the changing of one or more security controls in a seemingly arbitrary manner that can increase security risks. A risk event can be generated in response to the change of one or more security controls in one or more cloud applications and actionable intelligence associated with the risk event (also referred to herein as "a security risk," "a risk," "a threat," and "a security threat"). Threats can include activity, events, or security controls that are abnormal or noncompliant with respect to use of an application. As with other types of events, an alert may be sent to a tenant, tenant system, or other monitoring entity. For example, a tenant's password policy in a cloud application may have been changed to impose fewer requirements (e.g., type and/or number of characters). This may generate a risk event and alert to recommend that the password policy be changed back to the original password policy.

Alerts concerning any of the events discussed above can be shown on a user interface such as a controls management platform discussed further above. An alert can include information about the detected event such as, but not limited to, an event identifier, date, time, risk level, event category, user account and/or security controls associated with the event, cloud application associated with the event, description of the event, remediation type (e.g., manual or automatic), and/or event status (e.g., open, closed). Information in an alert about each risk event can include an identifier (ID), affected cloud application and instance, category, priority, date and time, description, recommended remediation type, and status. Each risk event may also have a user-selectable action, such as editing, deleting, marking status complete, and/or performing a remediation action. Selection of a remediation action may invoke an application such as the incident remediation application 313 and/or cloud seeder application 304 to perform the selected remediation. An alert and/or other information concerning an identified threat can be sent to an entity external to security monitoring and control system 102.

In many embodiments of the invention, an alert may be visual and may appear in a user console such as a controls management platform discussed further above. In several embodiments, an alert is communicated over a network such as by email, short message service (SMS) or text messaging, or web-based user console. Alerts may be communicated as secure messages (e.g., over a secure communication channel or requiring a key or login credentials to view). An alert may contain information concerning recommended or available remediation action(s), such as implementing stronger security controls, and request a selection of which remediation action(s) to pursue.

Specific processes for retrieving and analyzing activity data in accordance with an embodiment of this disclosure are discussed above. Any of a variety of processes for retrieving and analyzing activity may be utilized in accordance with embodiments of this disclosure. Processes for the remediation of identified threats are discussed below.

VIII. System for Discovery and Analysis of Applications

Figure 7:
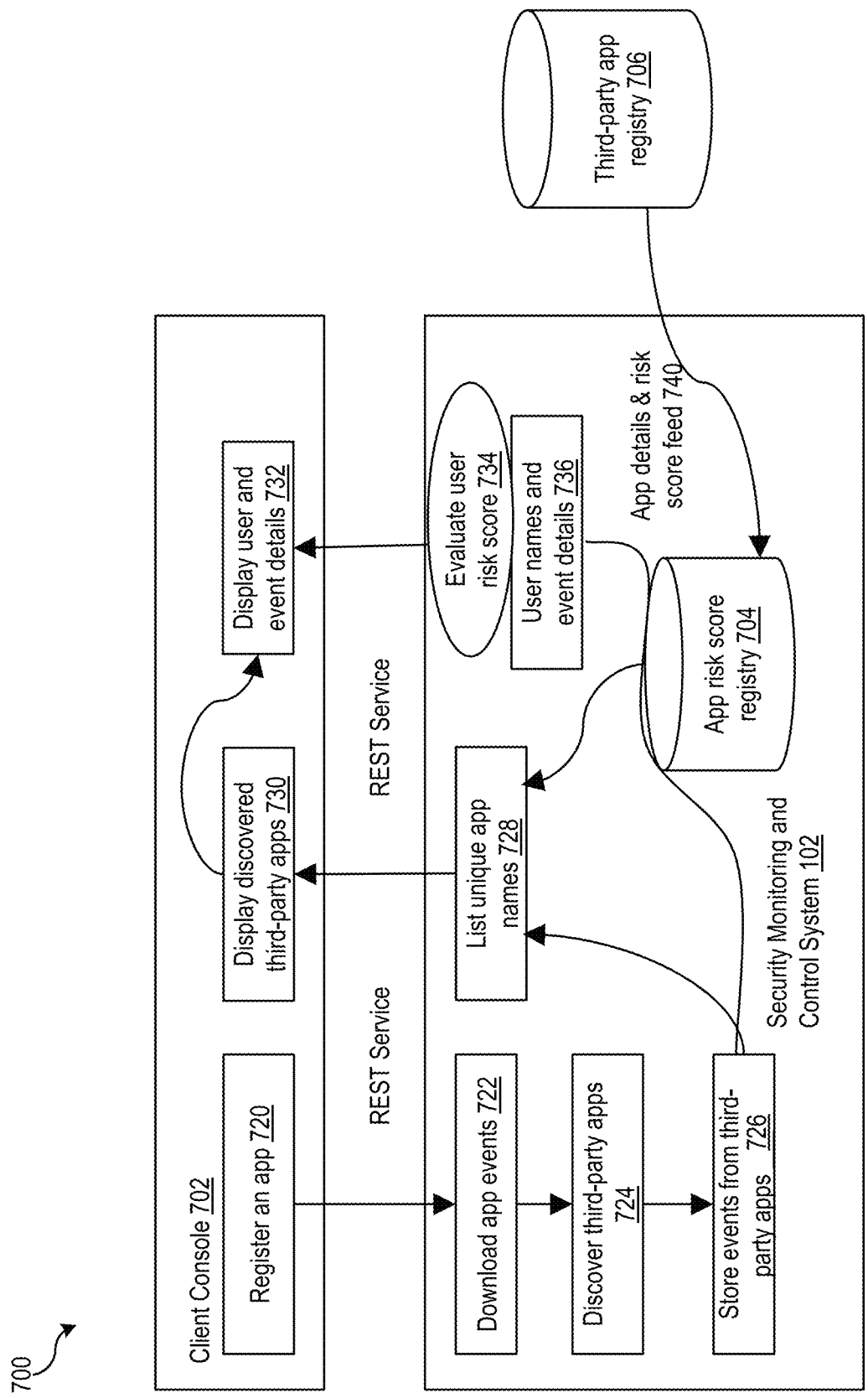
FIGS. 7 and 8 illustrate block diagrams of processes for discovering and managing security for applications according to some embodiments.
Figure 8:
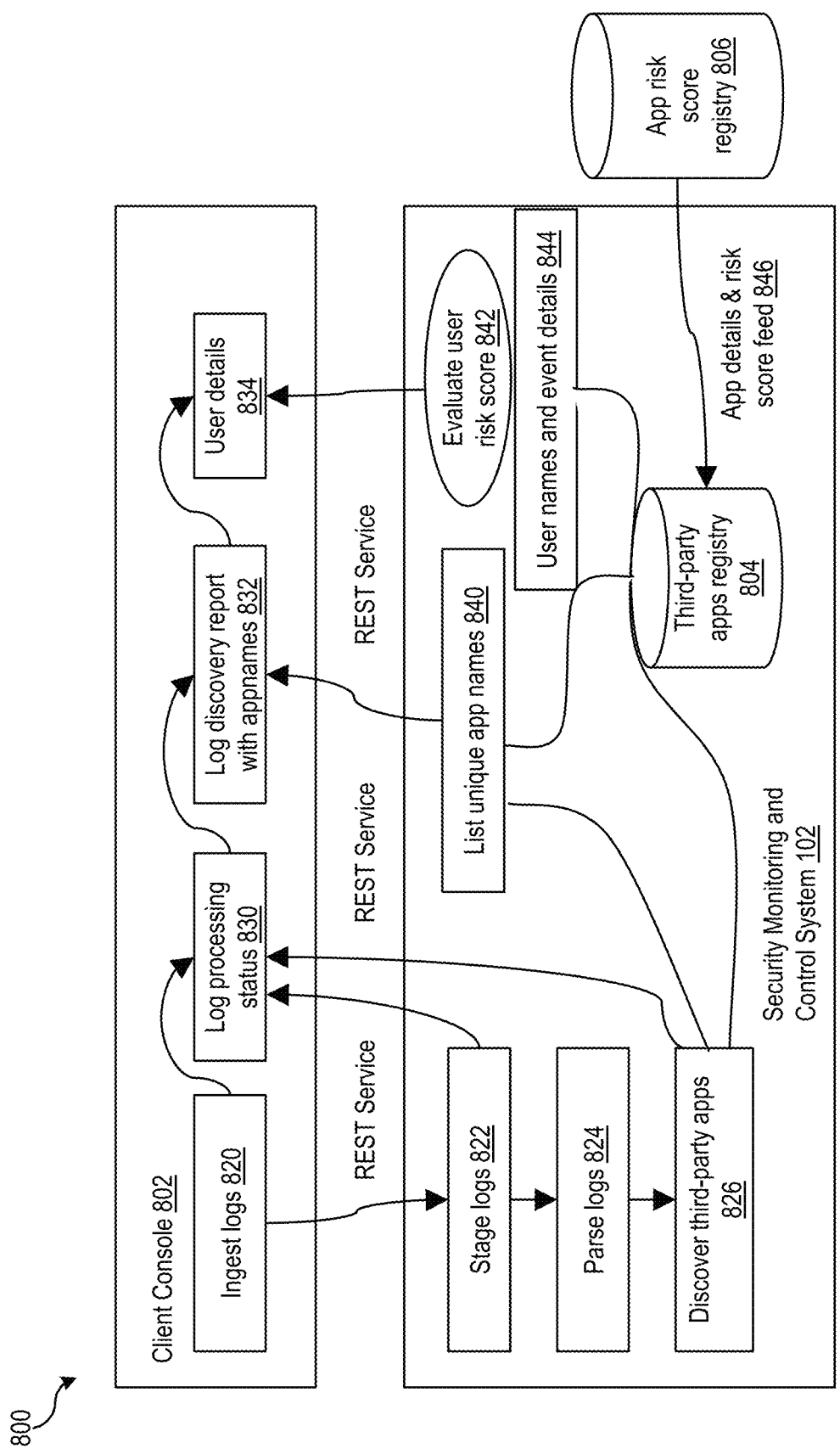

FIGS. 7 and 8 illustrate block diagrams of processes for discovering and managing security for applications according to some embodiments. FIG. 7 illustrates how security monitoring and control system 102 can discover third-party applications and display a graphical interface with information about those applications including a measure of security of the applications and the users of those applications.

A process 700 in FIG. 7 is shown for app discovery and analysis of app risk and user risk associated with app usage. Process 700 may be implemented for apps that have been authorized, such as by being registered with security monitoring and control system 102. Process 700 may begin at 720 by a user operating a client device (e.g., a client console 702) to provide information about an application (e.g., register an application). Client device 702 may communicate with security monitoring and control system 102 using an interface or a service (e.g., a representational state transfer (REST) service).

Security monitoring and control system 102 may perform processing to discover application usage and a measure of security for applications and users of those applications. At 722, app events may be downloaded from a service provider system that provides the apps that have been registered. The apps events may be provided in the form of data records about apps that have been accessed, At 724, the apps events may be used to discover apps that have been accessed and/or other third-party apps that have been used to access another application or data of an application that was registered. At 726, events about third-party apps may be stored in a repository. Event information may include a time stamp about the event, user information (e.g., a username or email ID), a third-party appname (link→app details), sanctioned appinstance name, IP address, and geolocation information.

At 728, processing may be performed to determine information about third-party apps that have been accessed. The apps events may be used to determine unique information identifying each application. Using the information about the application, security monitoring and control system 102 may compute an application risk score for the application using techniques disclosed herein. In some embodiments, an app risk score registry 704 may be maintained from which an application risk score may be obtained. The registry may be maintained and automatically updated based on new and/or updated information about application usage. An application risk score may be computed based on application details and risk score indicators from a risk score feed 740 obtained using a third party source, such as a third-party app registry 706. Application details may include vendor information about a service provider, or vendor that provides the third-party application. Vendor information may include vendor name, vendor logo, vendor domain, vendor description, vendor category (business), and/or a security indicator (e.g., a score or a link to access security score evaluation supporting data). The information about an application may be sent at 730 to client console 702 for display in a graphical interface such as one depicted in FIG. 15.

At 736, security monitoring and control system 102 can obtain user information about users for apps identified in app events. At 734, a user risk score may be computed based on the user information and the app event details. In some embodiments, the user risk score may be computed based on information obtained from a data source maintain information about application usage for a user. The information about a user including a user risk score and app event details may be sent to client console 702. At 732, client console 702 may display the information about a user including a user risk score and app event details in a graphical interface. The process may end at 730 and/or 732.

A process 800 in FIG. 8 is shown for app discovery and analysis of app risk and user risk associated with app usage. Process 800 may be implemented to discover apps based on analysis of log data. Log data may be obtained from one or more agents of security monitoring and control system 102 that can collect log information about different application and network activity.

Process 800 in FIG. 8 may begin at 820 by a user operating a client device (e.g., a client console 802) to specify information to identify log files. For example, a user may provide a source of log files and/or information access log files. Log files may be ingested at 820. Client device 802 may communicate with security monitoring and control system 102 using an interface or a service (e.g., a representational state transfer (REST) service).

Security monitoring and control system 102 may perform processing to discover application usage and a measure of security for applications and users of those applications. At 822, logs may be obtained through a staging process. At 824, logs may be processed for parsing to identify unique network activity. At 826, the network activity may be analyzed to discover third-party apps. Throughout the various stages of processing the logs, information may be communicated by security monitoring and control system 102 to client console 802 for display of log processing status at 830.

At 826, the logs may be used to determine unique information identifying each application. Event details about application usage may be determined based on the logs. Event details may include a timestamp, a third-party appname (link→app details), an IP address, a geolocation, user information (e.g., a username or email ID), and/or an address of a source device requesting the application (e.g., a MAC address). At 840, using the information about the application, security monitoring and control system 102 may determine information about each app that is discovered. The information may include details about the app and an application risk score using techniques disclosed herein.

In some embodiments, an app risk score registry 804 may be maintained from which an application risk score may be obtained. The registry may be maintained and automatically updated based on new and/or updated information about application usage. An application risk score may be computed based on application details and risk score indicators from a risk score feed 846 obtained using a third party source, such as a third-party app registry 806. Application details may include vendor information about a service provider, or vendor that provides the third-party application. Vendor information may include vendor name, vendor logo, vendor domain, vendor description, vendor category (business), and/or a security indicator (e.g., a score or a link to access security score evaluation supporting data). The information about an application may be sent at 832 to client console 802 for display (e.g., a log discovery report about application usage) in a graphical interface such as one depicted in FIG. 15.

At 844, security monitoring and control system 102 can obtain user information about users for apps identified in app events. At 842, a user risk score may be computed based on the user information and the app event details. In some embodiments, the user risk score may be computed based on information obtained from a data source that maintains information about application usage for a user. The information about a user including a user risk score and app event details may be sent to client console 802. At 834, client console 802 may display the information about a user including a user risk score and app event details in a graphical interface. The process may end at 832 and/or 834.

IX. Computing a Measure of Security for Applications

Figure 9:
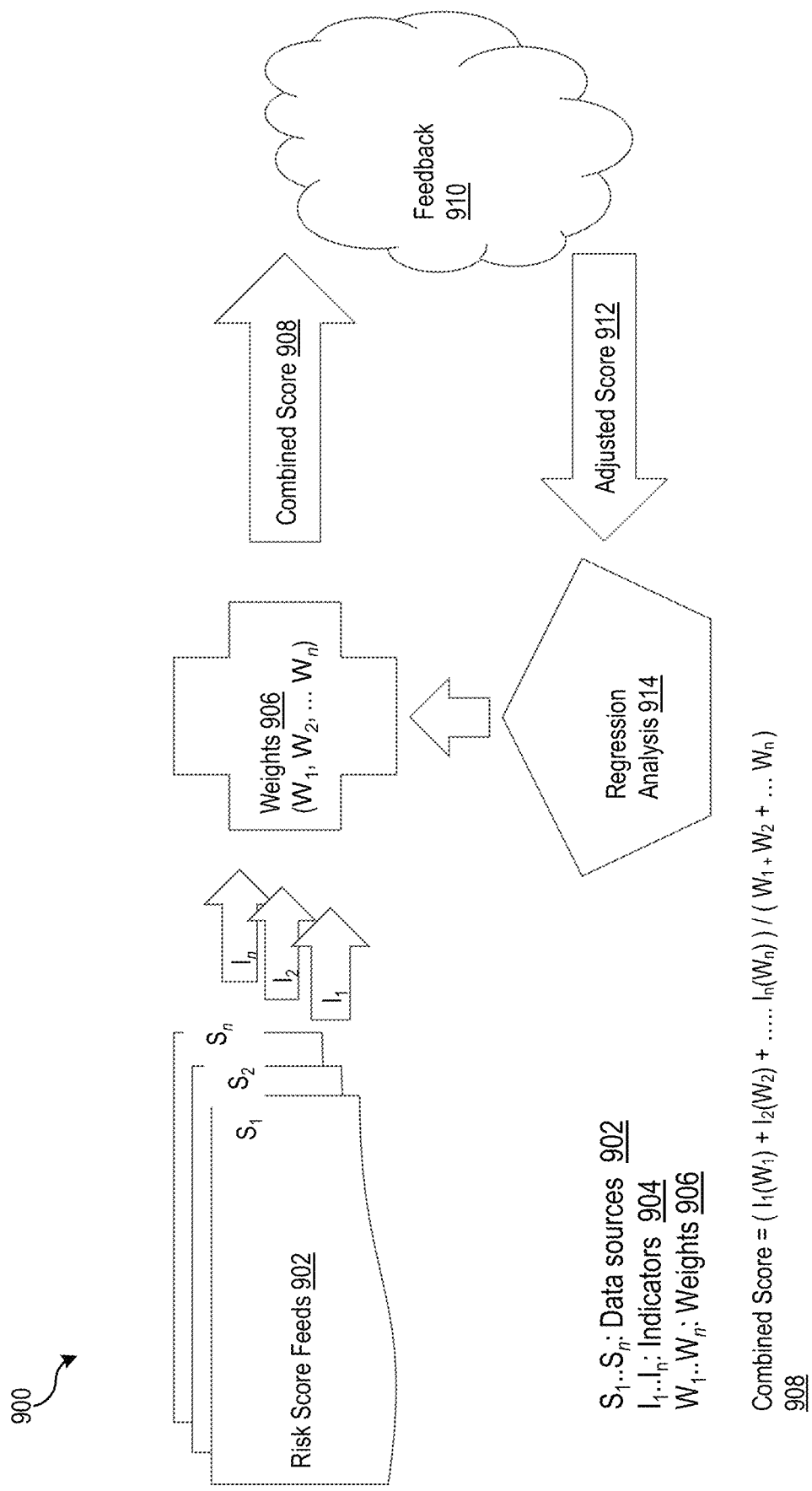
FIG. 9 illustrates a sequence flow diagram of a process for computing a measure of security for an application according to some embodiments.

FIG. 9 illustrates a sequence flow diagram 900 of a process for computing a measure of security for an application according to some embodiments. The process may be implemented by security monitoring and control system 102.

The measure of security may be computed based on information provided by one or more third party sources, one or more users, a source managed and curated by security controlling and management system 102, or combinations thereof. The measure of security may be based on information ("organization information") about the application and a provider of the application, and/or information about security of the application ("security information"). A measure of security may be a value (also referred to herein as "an application risk score") on a scale that defines a measure of security risk for an application. For example, a scale can be defined as between 1 to 5, where a higher value represents a greater risk. In other embodiments, any of a variety of ranges and values may be utilized as appropriate to the particular assessment. The score can be utilized by security monitoring and control system 102 to provide alerts, provide reports, and/or perform remedial measures. A measure of security is a value that serves as a prioritization indicator to aid users (e.g., security administrators) in mitigating security threats posed by an application. In some embodiments, a measure of security may be computed in several ways.

One technique for computing a measure of security may involve computing a risk score that indicates a measure of security with regard to a severity of security threats posed by a specific application to an organization. A risk score may be computed based on one or more indicators (also referred to herein as "threat indicators" or "security indicators"). Each indicator may be a value or information that indicates a security risk. For example, in FIG. 9, a unique security indicator may be obtained from one or more data sources 902 (also referred to herein as "risk score feeds"), where each of the data sources ("S") (collectively referred to herein as data sources "$S_1, S_2, \ldots S_n$," 902) provides a "feed" of one or more indicators of applications. Each unique indicator ("I") (collectively referred to herein as indicators "$I_1, I_2, \ldots, I_n$" 904) may be provided by each of data sources 902, respectively. An indicator may be a particular type of indicator based on security information, organization information, or both. An indicator may be a value that provides an indication of a security threat posed by an application. For example, a first indicator may be a first value indicating a first security threat by an application. A second indicator may be a second value indicating a second security threat by the application. The first indicator may be obtained from a first data source and the second indicator may be obtained from a second data source. A first data source may be one of data sources 280 in FIG. 2. A second data source may be the same as the first data source or a different one of data sources 280.

One type of security indicator is a security threat indicator, which may provided by one or more third party sources, such as an open source (e.g., abuse.ch) or a commercial source (e.g., www.SecurityScoreCard.com). A security threat indicator may be based on security information such as, without limitation, security posture of an application such as insecure network settings with weak encrypting algorithm, endpoint security such as obsolete devices used in the vendor's organization, IP reputation such as malwares in a vendor's network, hacker chatter such as discussion about the apps in the hacker networks, leaked information such as publicity exposed sensitive information from the vendor, application security such as website vulnerability, and DNS settings such as incorrect settings that may lead to spoofing apps website.

Another type of security indicator may be a organization-based indicator provided by one or more third party sources, such as an open source (e.g. Wikipedia.com), or a commercial source (e.g. Clearbit.com). The organization-based indicator may be based on organization information such as, without limitation, a business category, vendor's physical address, which includes geolocation information such as country, how long the business has been operating, the app internet domain registration age, popularity of the app according to the website ranking list such as Alexa domain ranking, or combinations thereof.

Each threat indicator may represent a security risk score that is a value indicating a measure of security risk, or threat, according to a scale defined by the source for that indicator. In some embodiments, threat indicator may be compared to a scale to determine a security risk score. The scale may be defined by or based on information provided by a source.

Security monitoring and control system 102 may compute a measure of security as value or score based on one or more threat indicators. In other words, the measure of security may be computed as a combined measure of security risk. Each indicator may be processed to adjust (e.g., normalize) a value of the indicator to an adjusted value according to a scale (e.g., a scale of values from 0 to 100) to be used for all indicators. Once normalized, a value for each indicator may be combined to determine a combined score.

A combined security score 908, which indicates a measure of risk, may be based on all or some of the indicators. The number and/or type of indicators considered for determining the combined security score may be configurable. As such, security monitoring and control system 102 may be configured to add or remove sources 902 from which indicators are obtained and may be configured to add or remove indicators 904 that are obtained from sources 902. In some embodiments, a graphical interface may be presented that enables a user to configure the number and type of indicators considered for a score. In some embodiments, the combined score may be based on a security policy that defines the criteria by which the score is to be computed. The criteria may be based on one or more attributes of security. The attributes may be used to selected the indicators to consider for the score.

In some embodiments, a combined score 908 may be based on a combination of indicators using a weight value for each indicator. For example, a weight ("W") (collectively referred to herein as weights "$W_1, W_2, \ldots, W_n$" 904) may be selected to be applied to one or more specific indicators for computing combined score 908. A weight may be a value that is a whole integer 1 or a fraction of 1. Different weights may be selected for different indicators. In the example above, a first weight may be a first weight value for a first indicator and a second weight may be a second weight value for a second indicator. The weight values may be different.

A weight may be configured by a user through a graphical interface. In some embodiments, a weight may be selected based on a security policy that defined based on particular indicators being given a particular weight. A greater value for a weight may be considered when an indicator has more importance or suggestion about a security risk. A lesser value for a weight may be considered when an indicator has less importance or suggestion about a security risk. In some embodiments, a weight may be chosen for all indicators from a particular source. For example, a weight may be applied to all indicators from a source based on reliability or trust of that source. In some embodiments, security monitoring and control system 102 may store data about threat research analysis of applications. Such data may be used to selectively choose a weight for each indicator.

A combined score may be computed based on consideration of indicators and weights for those indicators. In at least one embodiment, a combined score may be computed using an equation 908 to provide a combined score=$(I_1(W_1)+I_2(W_2)+ \ldots I_n(W_n))/(W_1+W_2+ \ldots W_n)$. In this equation, a value is computed for each indicator ("I") 904, by multiplying each indicator by a respective weight ("W") 906. A first value is computed that is a summation of the value computed for each indicator $(I_1(W_1)+I_2(W_2)+ \ldots I_n(W_n))$. A second value is computed that is a summation of each weight value that is applied to obtain the first value. The combined score 908 may be computed based on dividing the first value by the second value.

In the example continued from above, a first weighted value may be computed based on multiplying a first value of a first indicator by a first weight value. A second weighted value may be computed based on multiplying a second value of a second indicator by a second weight value. A weighted summation value may be computed based on a summation of the first weighted value and the second weighted value. A weight summation value may be computed based on a summation of the first weight value and the second weight value. A measure of security may be computed as a value based on dividing the weighted summation by the weight summation.

In some embodiments, security monitoring and control system 102 may obtain feedback 910 from one or more users on the validity and accuracy of the combined score 908. Feedback 910 may be obtained through a network, facilitated through a graphical interface or manual feedback. Any of the sources, indicators, and/or weights may be adjusted based on feedback 910. Based on feedback 910, the combined score 908 may be adjusted. A new combined score 912 ("adjusted score") may be computed in the same manner as combined score 908 was computed, except adjusted score 912 may be computed based on indicators and/or weights selected based on feedback 910. The sources, indicators, and/or weights may be added or removed from what was used to compute combined score 908. The weight value for indicators can be revised periodically to improve the risk score based on our security analysts as well as customer feedback. The revision process for the indicator weight can be performed through automated machine learning algorithms such as decision tree and neural networks.

Regression analysis 914 may be performed based on each indicator and/or a combined score with respect to a particular security threat. Regression analysis may include building and updating a linear regression model. A linear regression model may provide output such as $S = c_1(I_1) + c_2(I_2) + \ldots + c_n(I_n)$. The coefficients $c_i$ computed by the regression model could be new or modified weights that would replace the initial weights for computing combined score 908. The model will provide greater accuracy as more feedback and more data is collected.

The following describes an example scenario in which security monitoring and control system 102 can use threat intelligence from an open source service like abuse.ch ($S_1$) and commercial service like securityscorecard.io ($S_2$) to determine a measure of security. In this example, two sources, $S_1$ and $S_2$ are being used. The source $S_1$ provides domain reputation service that provides information if a domain is used for hosting malware, spam bot etc. The domain reputation will be the indicator $I_{11}$ for $S_1$. The source $S_2$ provides information on application security ($I_{21}$) e.g. if the app hosted in the domain has security vulnerability, network security ($I_{22}$) e.g. weak encryption algorithm used. The application security will be the indicator $I_{21}$ and network security will be indicator $I_{22}$ for $S_2$.

In this scenario, depending on the data quality and reliability of the data sources, an initial weight value may be assigned for each source. For example, issues reported by $S_1$ can have 40% weight, $w_{11}$. Since there is one indicator $I_{11}$ for $S_1$, hence this indicator will receive the entire 40% weight. The source $S_2$ has two indicators, which can share a weight value assigned to the source. For simplicity let's assume $I_{21}$ and $I_{22}$ shared the same weight—$w_{21}$ and $w_{22}$ will be 30% each. Using techniques disclosed herein, a combined score 908 may be computed as follows: $((I_{11} * w_{11}) + (I_{21} * w_{21}) + (I_{22} * w_{22}))/(w_{11} + w_{21} + w_{22})$. By inserting the weights, the combined score may be reflected as $= ((I_{11} * 0.4) + (I_{21} * 0.3) + (I_{22} * 0.3))/(0.4 + 0.3 + 0.3)$. In this example, where threat intelligence sources indicators are rated as $I_{11} = 65$, $I_{21} = 91$, and $I_{22} = 90$, the risk score for the domain will be 80 (rounded). In another scenario, if the customer confirms that the domain is legitimate and there are no issues with the domain reputation, then $I_{11}$ becomes 0. Therefore, the domain risk score for this customer is lowered to 54 (rounded). In yet another scenario, if the customer confirms that they want to whitelist the application because a vendor have address reported issues, then $I_{11}$, $I_{21}$, and will be 0. Therefore, the domain risk score for the customer will be 0 indicating there is no risk for the customer from this app. As a customer continues to adjust combined scores, the regression model can periodically learns relations between weights and risk score, and adjust the weight values accordingly.

X. Processes for Detecting and Analyzing Security of Applications

Figure 10:
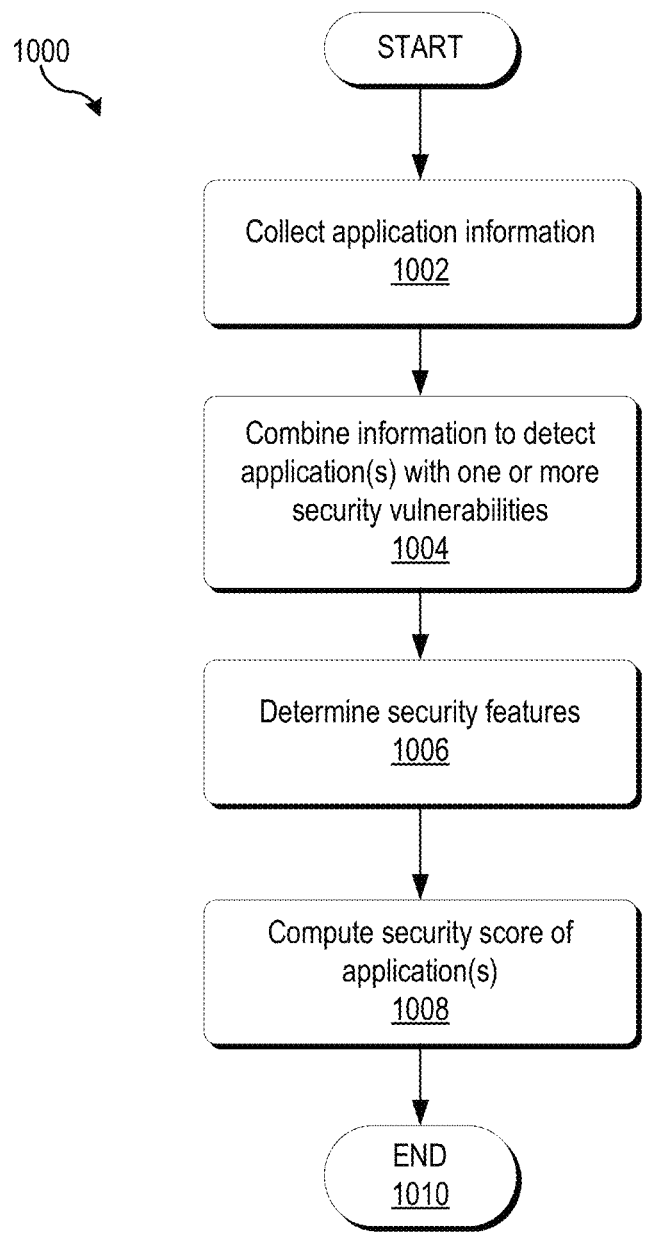
FIGS. 10-12 show flowcharts illustrating processes for detecting and managing security of applications in accordance with an embodiment.

FIG. 10 illustrates a flowchart 1000 of a process for discovering and managing the risk of applications in accordance with embodiments. In many embodiments, one or more features of the process discussed below can be performed by a security monitoring and control system 102 of FIG. 1.

Flowchart 1000 may begin at 1002 by collecting information about applications accessed by one or more users of an organization. The information may be collected from one or more data sources using techniques disclosed herein. Data sources can include, but are not limited to, routers, network firewalls, application firewalls, cloud applications, cloud application mobile device management (MDM) servers, and cloud app usage tracking servers. In some embodiments, the information may be retrieved from a data source by requesting the information using a "pull" type mechanism. In other embodiments, the information may be provided by a data source without request by a "push" type mechanism. The information may be monitored from data in network traffic within an environment of an organization. The environment may be a secure network environment, such as one configured with one or more network security features, such as a firewall.

In various embodiments, the information transferred from the data source may in any of a variety of formats. Some data sources may be interacted with via a specified application programming interface (API). Other data sources may store the information in a database table or log file.

Information retrieved from routers and network firewalls can include information about websites visited or other connections made by a user's device. This information can include, but is not limited to, source and destination IP, protocol, service (e.g., 443 for HTTP), query string within HTTP requests, and/or product (e.g., instance name of what platform the user is using to connect to network). The IP addresses can be used to perform a reverse lookup for geographic location and/or assessing reputation of the IP address. In some embodiments, deep packet inspection (DPI) is utilized to access additional information within network traffic such as user name and other embedded data. Often, a user device utilizes a virtual private network (VPN) to connect to the enterprise network and the traffic thus traverses through the enterprise network and can be captured by a router or firewall within the network.

In certain embodiments, information concerning an application may be obtained from a third-party and/or log information from the application or another application providing the application of interest. For example, information concerning a plug-in application to an authorized application may be retrieved from data logs provided by the authorized application. In another example, a lead-generation application (e.g., a third-party application not known to an organization) may be utilized with an application, such as one provided by a cloud service provider that is known to the organization. Third-party application information can include, but is not limited to, time of access, username, login URL, application name, application source IP, and/or login time. In addition, supplemental information can be generated using techniques disclosed herein, such as reverse lookup of the URL or IP address. In some embodiments, the information may be obtained through an interface (e.g., an application programming interface) of a service provider that provided the application.

In some embodiments, a server can manage and store information related to the usage of apps. Such information can be retrieved from the server. In one example, a tracking server can stores information related to the usage of cloud apps by users in an organization. Servers for mobile device management (MDM) can manage the administration of apps and other software on mobile devices (such as smart phones or tablets). For example, the Google Apps suite of software can be provided to customers on a subscription basis. A Microsoft Server may manage Microsoft products that are installed on devices throughout the enterprise. Windows 10 apps may be managed by a Windows system administrator. Still other cross-platform software management systems may be utilized in the enterprise.

At step 1004, the information obtained at step 1002 may be used to determine whether an application is associated with a security risk. The security risk may be used to determine whether the application may be unauthorized or unsanctioned for use by a user in an organization. For example, information about an application may be used to determine whether use of the application was sanctioned by an organization. Information may be processed using correlation techniques such as those disclosed in FIGS. 9 and 11. Information about an application may be obtained from one or more sources, including security monitoring and control system 102, third party data sources, and processing of information obtained at step 1002. The information may include organization information about an organization that provides an application. The information may include security information about security related to the application. The security information may include a measure or a score related to an indicator or aspect of security for the application. In some embodiments, the information may be obtained directly from a provider of the application.

At step 1006, one or more features (e.g., security indicators) may be determined for an application being assessed. Features can include, but are not limited to, whether the application is standalone or an extension or plug-in to a sanctioned application; what data set an extension or plug-in application accesses from the sanctioned application (e.g., sales data vs. product codes); the type or category of application (e.g., business content vs. social networking); the age or registration location of the domain name associated with the application; the domain reputation and/or internet site ranking of the internet domain associated with the application as provided by a third-party reputation or ranking service (e.g., Alexa, Google rank or ranking factor, market capitalization, publicly listed vs. private company, etc.), and/or IP address reputation of the website associated with the application indicative of issues such as spam emails or any malware related issue history (e.g., as provided by a third-party service).

Features can be determined using information retrieved from other sources. The determination involves quantization by assigning a numerical value (e.g., a weight) to each of the features determined for assessing the security risk that an application may pose to an organization.

In some embodiments, additional features may pertain to applications that integrate with an authorized or secure application. For instance, when a third-party application integrates with popular sanctioned applications such as Salesforce, Google Apps etc., the sanctioned application vendor provides guidelines on how to access data. Because of this access, the sanctioned application may be perceived as having increased risk and its overall risk score increases. For example, a third-party application may not manage and purge accessed data securely or potential security vulnerability in the third-party application may be the source of an unauthorized data leak which is beyond the control of the sanctioned application. Features may be determined for factors related to security for the access granted to a third-party application and the interface of the third-party application to the sanctioned or authorized application.

At step 1008, a security score or measure of security may be determined for each of the one or more applications based on the determined features. The score and features may be stored in a database, such as an app registry. The score may be determined using the techniques disclosed herein, such as those with reference to FIG. 9.

A security score may be a value on a scale defining a measure of security risk. For example, a scale can be defined as between 1 to 5, where a higher value represents a greater risk. In other embodiments, any of a variety of ranges and values may be utilized as appropriate to the particular assessment. The score can be utilized by security monitoring and control system 102 to provide alerts, provide reports, and/or perform remedial measures. Additionally, the security monitoring and control system 102 may utilize the score and other information about the security of applications in combination with information concerning more secure (e.g., approved, authorized, or sanctioned) applications to make security assessments and determine threat levels.

Flowchart 1000 may end at step 1010.

Figure 11:
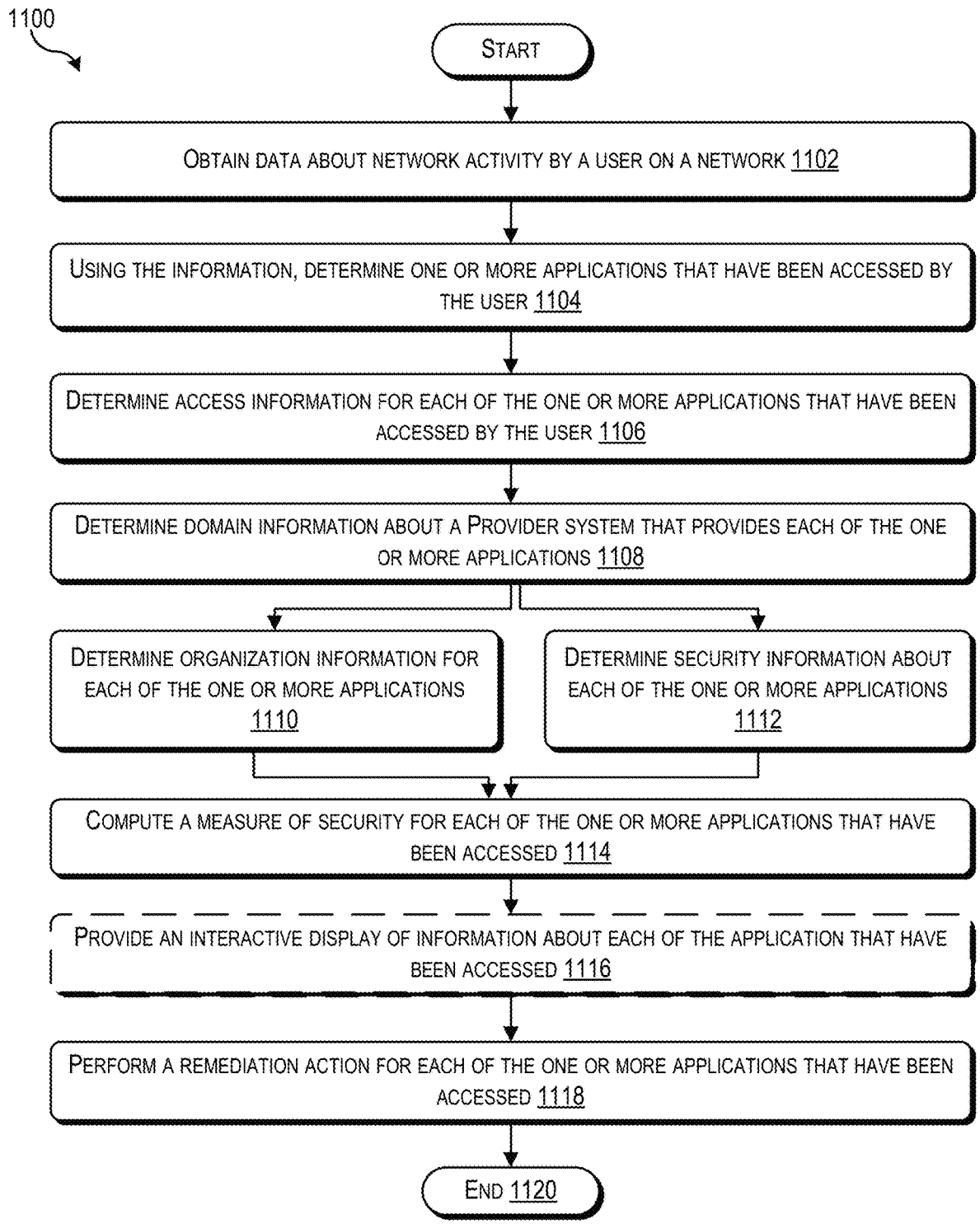

FIG. 11 illustrates a flowchart 1100 of a process for discovering and managing the risk of applications in accordance with embodiments. In many embodiments, one or more features of the process discussed below can be performed by a security monitoring and control system 102 of FIG. 1. Flowchart 1100 illustrates certain embodiments of the process depicted in FIG. 10.

Flowchart 1100 may begin at step 1102 by obtaining information about network activity of a user. The information may be obtained from data obtained using techniques for monitoring network activity, including those disclosed with reference to FIG. 8. Data about network activity may be obtained by monitoring and/or obtaining data (e.g., log data or record data) from network devices. For an organization to monitor application usage, an organization may monitor its internal, or protected network (e.g., Intranet) for network activity. Network activity may be monitored by obtaining information from network resources (e.g., a network device) of network traffic within and external to the network of the organization.

In some embodiments, data about network activity may be collected from multiple data sources. Log files may be obtained by security monitoring and control system 102 to ingest and process to identify information about network activity, such as application usage. Log files may be obtained using techniques disclosed in FIG. 8. Data about application events may be obtained from one or more sources using techniques disclosed in FIG. 7. In some embodiments, information about network activity, such as specific service and application usage may be obtained from one or more third party sources, such as a service provider of an application. Security monitoring and control system 102 may utilize an interface of a service provider to obtain log information about activity for one or more users.

The information may be obtained from multiple sources in multiple different formats. The data containing the information may be processed to prepare (e.g., normalize) the information to a format for processing to determine application usage. The data may be processed for deduplication to identify unique instances of network activity.

At step 1104, the information obtained about the network activity is used to determine one or more applications that have been accessed. The information obtained about network activity may be obtained from data about network activity. The data may be for communications on the network. The data is further about a plurality of users as a tenant on the network of the organization. Obtaining data about network activity may include obtaining network data from one or more network devices on the network. The network data may be obtained from one or more agents and/or a log manager implemented in a computing environment by techniques disclosed herein. The network data may be obtained by a log collector of a security monitoring and control system. The network may be protected in a computing environment of the organization, such that the computing environment is secure from a public network.

Accessing an application may include permitting data for an application to be accessed by a different application. For example, data for an application may be accessed by a third party application to which consent was given by a user to access the user's data from a service provider of the application. The applications may be authorized (e.g., sanctioned) or unauthorized (e.g., unsanctioned) by an organization for which a user accessed the applications. The information may include data about an application that is used. The data may be an application name or a link to an application being accessed. The information about the application may be used to retrieve information from a third party source (e.g., a provider of the application). The information may be included in activity data obtained from the service provider system of the provider. Each unique application may be identified to determine the applications that have been accessed by a user. In some embodiments, some applications may be of the same type or kind, but may correspond to a different instance and/or a different account for access. Because each unique application may pose a security vulnerability for one or more features that are assessed, each application may be determined for analysis. The data corresponding to each unique application may be stored in association for the application for further processing.

At step 1106, access information is determined for each of the one or more applications that have been accessed. The access information may be determined using the information obtained at step 1102. An application may be identified by processing the data to identify a portion of the data corresponding to a request for the application accessed by the user. The portion of the data may indicate application information about the request for the application, where the application information can be used to identify the application as being accessed by the user. The data may include information about the request such as an IP address, a source identifier, a link to the application, or other information related to a source of a request or a destination where the application is located. The access information may be determined from the data corresponding to each application. The access information about the network activity corresponding to the application may be determined using the portion of the data. Access information may include information used to access or related to access of an application. The access information may be obtained from the data corresponding to each unique application. Using the information about each application, access information about each application can be identified for the user. The access information may include network information about a request to access the application, including information about a source (e.g., a source device) requesting the application and a destination to which the request is sent. The access information may include, without restriction, a timestamp of the network activity, application information (e.g., application name, a source location to access the application, and/or details about the application), an IP address of a source, an IP address of a destination, geolocation information about the source, user information (e.g., user identification or email identification), and a media access control (MAC) address. A source location of an application can be a link, such as a URL, or an URI. The information obtained at step 1102 can be processed to identify network activity with regard to each unique application identified at step 1104.

At step 1108, domain information about a domain of a provider system that provides each of the applications is determined based on the access information. Domain information may be determined using techniques disclosed with reference to FIGS. 7 and 8. The domain of the application may include information (e.g., host system information) about a provider and the provider's system that provides the application. For example, domain information may include a domain name, an IP address, system information, or other information about a host system of domain in the provider's system.

The domain information may be determined by a query of one or more data sources using all or some of the access information. Security monitoring and control system 102 may maintain a data store of information about applications and providers of applications. In some embodiments, third party data sources may be used to lookup or query information about a domain of an application. One third party data source may be a database managed by a third party, such that the database stores information about domain and system information about one or more providers of applications. Another third party data source may be a domain name system (DNS) source or some other source which stores information about a domain or an entity (e.g., a provider) of a domain. A third party data source may be queried for information about a domain based on the access information. For example, a NSlookup command may be issued to determine a domain of an IP address in the access information.

In some embodiments, a request may be sent to a system of a provider of an application to obtain domain information. Based on the access information, a request may be generated and set to system providing the application. A request may be sent based on a source location of the application indicated by the access information. Often times, domain information obtained by a query of a data source may not provide specific information about a domain of the provider's system. The request may be a network call to an endpoint (e.g., a SQL connection endpoint) to get a certificate for an application. The request may include a URI of the application. The URI may be obtained from the access information for an application. In at least one example, a network call may be a browser call (e.g., HTTPS) to obtain a certificate of information about a hosted site the domain of a provider of the application. By sending a call in this manner, the site may not prevent the request from being blocked. The certificate may include domain information about the hosted site of a provider of the application. The request to a system of a provider may be implemented in addition to, or as an alternative to querying a data source.

Steps 1110 and 1112 may be performed concurrently, or in any order based on applications that have been identified. At step 1110, organization information may be determined for each of the one or more applications. The organization information may include information about each organization of a service provider that is distinctly associated with a provider system that provides each of the one or more applications that have been accessed. Organization information may include information identifying an organization associated with the provider system that provides an application. The organization information may include business entity information such as registration information of the organization. The organization information may include information about the application, including details about the application, such as a source of the application and a type of the application. The organization information may include location information about a location of the provider system, such as where the provider system is hosted. In some embodiments, the organization information can include statistical information about each application that is accessed. The statistical information may include data usage for network activity related to the application, network traffic (e.g., upload and download traffic) for the applications, and other statistical information about use or operation of the application. The organization information may be determined using the domain information to identify an organization that provides the application.

The organization information may be obtained from one or more sources. One source may include a third party source that aggregates information about applications including the organization(s) that provide the applications. Security monitoring and control system 102 may maintain its own data store of application information based on monitoring network activity. In some embodiments, users may provide information about an application. The information may be stored by security monitoring and control system 102.

At step 1112, security information may be determined about each of the one or more applications that have been accessed. The security information may include information about one or more security-related incidences about an application. The security information may provide a measure (e.g., a security score) of security with regard to one or more features of the applications concerning security. In at least one embodiment, security information may be obtained via one or more feeds 902 as disclosed with reference to FIG. 9. The measure of security provided by a feed may correspond to a feature of security for an application. The measure of security may be based on one or more indicators or features. The security information may be determined using the domain information, organization information, or a combination thereof. In some embodiments, the security information may be obtained based on the information identifying an application.

The security information may be obtained from one or more sources. One source may include a third party source that aggregates security-related information about applications including the organization(s) that provide the applications. Security monitoring and control system 102 may maintain its own data store of application security information based on monitoring network activity. In some embodiments, users may provide security information about an application. The information may be stored by security monitoring and control system 102. A measure of security may be indicated in security information provided by any of these sources. In some embodiments, the security information may be obtained from one or more sources in different formats. Each data source may provide a specific type of security information. The security information may be normalized or processed to provide a measure of security in a particular format or scale.

Step 1114 may be performed based on performing one or more of steps 1110 and/or 1112. At step 1114, a measure of security (e.g., an application risk score) is computed as a separate measure for each of the one or more applications that have been accessed. The measure of security can be a value or indication of security for an application. For example, a measure of security may be a value on a scale of 1 (e.g., low security risk) to 5 (e.g., high security risk). A scale for a measure of security may be based on one or more features of security, or may be based collectively on a set of features.

In some embodiments, the measure of security may be computed for multiple applications on the basis of one or more features, such as a type of application or security risk. The measure of security may be computed using techniques disclosed with reference to FIGS. 8 and 9. The measure of security may be computed using any of the information determined in the previous steps of flowchart 1100. For example, the measure of security may be computed using the organization information, security information, or a combination thereof. The measure of security may be computed for one or more indicators or features of security. A weight value may be determined for each feature. Based on the indicator and weight, a measure of security can be computed for each feature individually or collectively. In some embodiments, the measure of security may be computed for an application based on use by multiple users, such as a group of users as a tenant with an account for access. The steps in flowchart 1100 may be implemented for applications accessed by multiple users. The measure of security may be computed for multiple instances of a type of application across one or more providers and/or one or more accounts.

In some embodiments, at step 1116, a display may be provided to display information about each of the one or more applications that have been accessed. The display may be a graphical interface that is provided in an application or a web browser. The display may be interactive to monitor and manage security of the applications. The display may be generated by security monitoring and control system 102. Providing the display may include causing the display to be rendered at a client. Upon generation, the display may be sent to a client to be rendered. Examples of various interactive displays are disclosed with reference to FIGS. 15-26. In some embodiments, a display may be provided as a report in a message sent to a client. The report may be a notification about security related to an application.

At step 1118, one or more remediation actions may be performed for each of the one or more accessed applications. A remediation action is an action performed on a remedial or corrective basis to address a security (e.g., a security risk or a threat) posed by an application. Examples of remediation action, include without limitation, sending a notification message about security of an application, displaying information about security of an application, adjusting operation and/or access of an application (e.g., restrictive adjustment of access).

For example, controlling access for an application may include blocking or preventing a user or group of users from accessing the application. Limiting, blocking or preventing access to an application may be achieved in many ways. One or more instructions can be sent or configured to adjust access for an application. For example, one or more instructions can be configured on a network in an organization such that any request for an application can be denied or the request can be prevented from being communicated outside the organization so as to effectively deny or block access. One or more instructions can be configured to deny certain types of requests for an application. A user can be prompted at an interface to provide information to configure access to an application so that it is limited according to a policy.

In another example, an action may be either placing information about the application on a whitelist or blacklist to permit or deny, respectively, access to the application. In some embodiments, a remediation action may not be performed for each application based on assessing the application according to a policy.

A remediation action for an application may be performed based on the measure of security of the application. Remediation actions may be automatic, manual, soliciting user or administrator involvement, or a combination thereof. Actions may be configured based on input from a user (e.g., an analyst). A remediation action may be performed based on one or more policies. A policy may be configurable by a user and/or adapted based on feedback for security, such as techniques disclosed with reference to FIG. 9. For example, a remediation action may be performed based on a measure of security of an application satisfying a threshold for risk (e.g., a high risk). In some embodiments, a remediation action may be performed based on security information for one or more features of an application. The measure of security may be computed based on those features. As such, a remediation action may be based on the measure of security for those features for which a measure of security is computed. Examples of measures of security and remediation actions are shown with reference to FIGS. 15-26.

In some embodiments, a remediation action may be performed based on a security policy. The security policy may define one or more remediation actions to perform based on a measure of security and/or security information. A security policy may be applied based on a measure of security and/or any information (e.g., organization information or security information) as disclosed herein. Operations may be performed to assess a security risk or threat. The security risk or threat can be based on a measure of security and/or security information (e.g., one or more security indicators). A policy may define one or more criteria, such as a threshold (e.g., a security threshold or risk threshold) that defines when a remediation action is to be taken. The criteria may be defined by one or more values according to a scale of a measure of security or a scale set by a provider of a security indicator. For example, applying a security policy may include determining whether the measure of security satisfies a risk threshold for the application. The measure of security may be compared to one or more values in a policy to assess the severity of a security risk. The values may be defined based on one or more security indicators. The values may be defined based on one or more security indicators such that the measure of security is compared to a threshold that is defined based on the security indicators used to compute the measure of security. Security indicators obtained in security information may also be compared to further assess a security risk.

In some embodiments, a remediation action may be to configure one or more aspects of a computing environment to prevent an application from being accessed within the computing environment. One or more instructions may be sent to a computer system and/or a network device of the computing environment of an organization to specify what application is to be blocked and for whom the application is to be blocked or limited. Access to an application may be configured by a policy or other configurable information that can control access in a computing environment. In some embodiments, an instruction can be sent to an agent on a client device operated by a user. The agent may be instructed to change operation to prevent access to particular applications and/or change operation of an application in particular environments where the client device is used. Remediation action may be to prevent access to an application by a plurality of users. In some embodiments, a remediation action may include sending one or more instructions to a service provider system. For example, an instruction can be sent to a service provider system to adjust one or more security controls and/or settings for accessing an application. A servicer provider system may provider an interface to access security controls and/or settings. A remediation action may include using the interface (e.g., by making a call) to adjust a security control and/or setting for an application.

Remediation actions may include alerting uses. An alert may be sent to a device of an administrator or other user about a security risk and/or a change in access to an application. In some embodiments, a remediation action for an application includes causing a graphical interface to prompt the user to adjust a configuration operation of the application.

Flowchart 1100 may end at step 1120.

Figure 12:
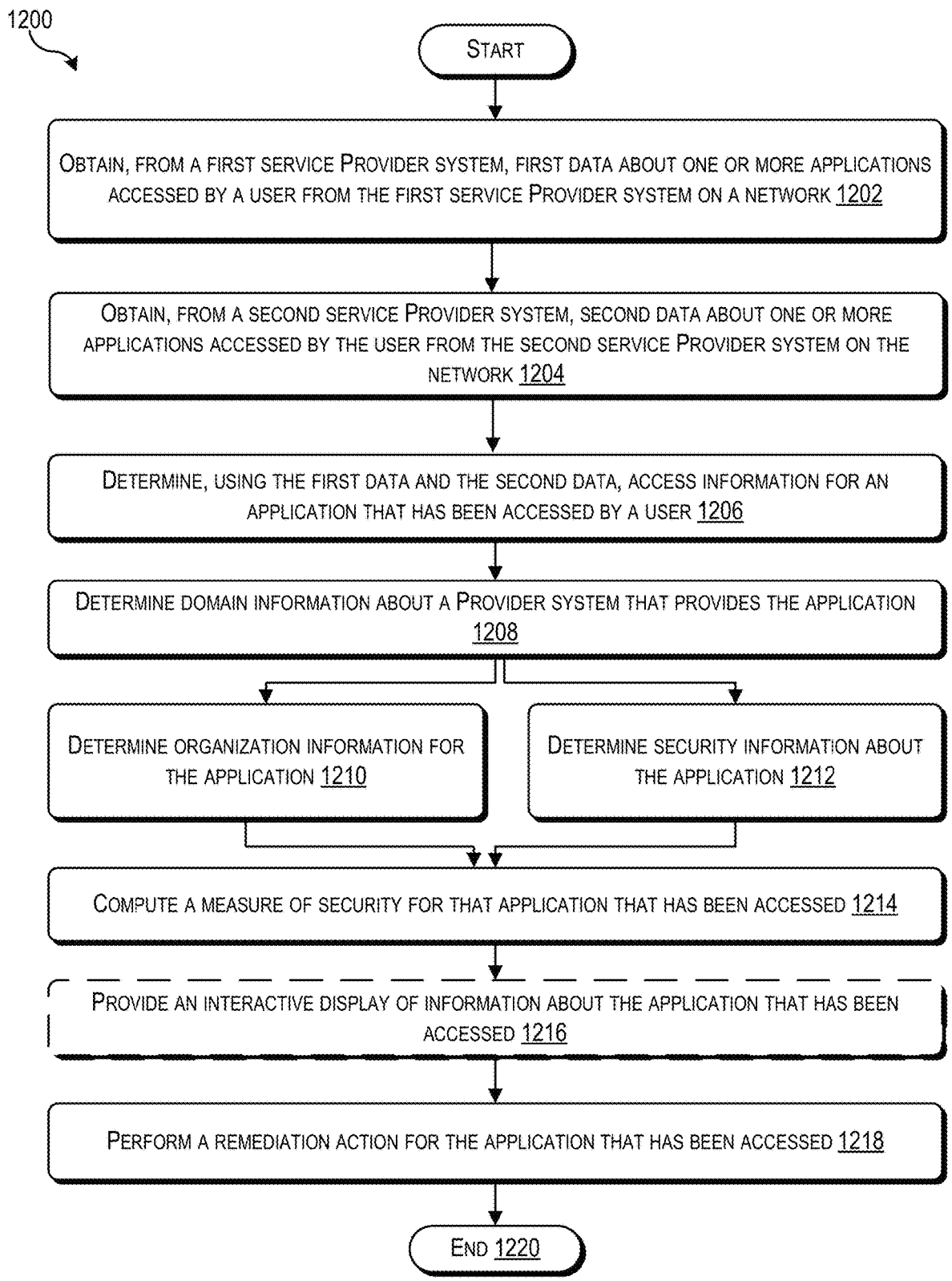

FIG. 12 illustrates a flowchart 1200 of a process for discovering and managing the risk of applications in accordance with embodiments. In many embodiments, one or more features of the process discussed below can be performed by a security monitoring and control system 102 of FIG. 1. Flowchart 1200 may be implemented as part of or using techniques disclosed with reference to FIGS. 10 and 11. The process disclosed with reference to flowchart 1200 may be implemented to assess and manage security for an application that has been used across multiple service providers (e.g., cloud service providers). The application may be a first application that enables or facilitates access to a second application and/or data for the second application provided by a different or the same service provider as the service provider of the application first application.

Flowchart 1200 may being at step 1202 by obtaining data (e.g., "first data") about one or more applications that are accessed from a service provider system (e.g., a first service provider system) on a network of an organization. The first data may be obtained through a programming interface provided by the first service provider system of a service provider. The data may provide access information, such as the application and/or data accessed and information about how the application and/or data was accessed. The access information may provide information about a third party application that accessed an application or its data from the first service provider system.

At step 1204, data (e.g., "second data") may be obtained about one or more applications that are accessed from a service provider system (e.g., a second service provider system) on a network of an organization. The second data may be obtained through a programming interface provided by the second service provider system of a service provider. The data may provide access information, such as the application and/or data accessed and information about how the application and/or data was accessed. The access information may provide information about a third party application that accessed an application or its data from the second service provider system.

Access information may be aggregated from several service provider systems to assess the security of applications accessed by a user on a network of an organization. The access information from each service provider system may be processed to determine one or more applications accessed by a user on a network of an organization. The applications may be distinct, but have one or more common attributes. The applications may be distinct, but may be related based on a user permitting a third party application to access the applications and/or their data. The access permitted to a third party application may be risky and/or not permitted by an organization.

At step 1206, access information may be determined for an application (e.g., a third application) accessed by a user. In at least one embodiment, the application may be type of application that is accessed through the first service provider system and the second provider system. The access information from each of the service provider systems may be processed to identify a type of application for applications that are accessed through the first service provider system and the second provider system. The application may be identified as a type of application based on application information obtained from each provider system. One or more data sources may be used to retrieve application information for each of the applications that are accessed. In the steps following step 1206, where the application(s) accessed by a user have a common type, the information determined in the following steps may be determined for each of the applications. The measure of security may be computed for each application, or a combination of the applications. The measure of security may be based on an average or measure combined based on the measure of security for each of the applications.

In at least one embodiment, the access information from each of the service provider systems may be used to determine that the same, third party application is being used to access different applications and/or their data provided by each of the service provider systems. Each of the service provider systems may provide information that may indicate access to an application through the third party application.

At step 1208, domain information may be determined about a provider system of the application(s). Steps 1210 and 1212 may be performed concurrently, or in any order based on applications that have been identified. At step 1210, organization information may be determined for the application. At step 1212, security information may be determined about the application. The information determined for flowchart 1200 may be determined using techniques disclosed herein, such as those disclosed with reference to FIG. 11.

At step 1214, a measure of security may be computed for the application that has been accessed. The measure of security may be computed for each application, or a combination of the applications that are identified as being accessed by the user. The measure of security may be based on an average or measure combined based on the measure of security for each of the applications.

At step 1216, an interactive display is provided of the information about the application(s) that have been accessed. The interactive display may be included as part of or generated as a graphical interface. The graphical interface may display the measure of security for the application.

At step 1218, a remediation action may be performed for the application(s) that have been accessed. Remediation actions may be performed as disclosed herein, such as techniques disclosed with reference to FIG. 11. In the event that the application is a third party application provided with access to an application or its data at a service provider system, the third party application may be prevented from accessing the application. In some embodiments, a request may be sent to the service provider system to limit or deny access to the application(s) and/or its data accessed by the third party application. In some embodiments, the interactive display may be modified to prompt the user to adjust a setting for the third party application to limit or revoke access to the application and/or its data from a service provider system.

Flowchart 1200 may end at step 1220.

XI. Computing a Measure of Security of a User Based on Application Usage

Figure 13:
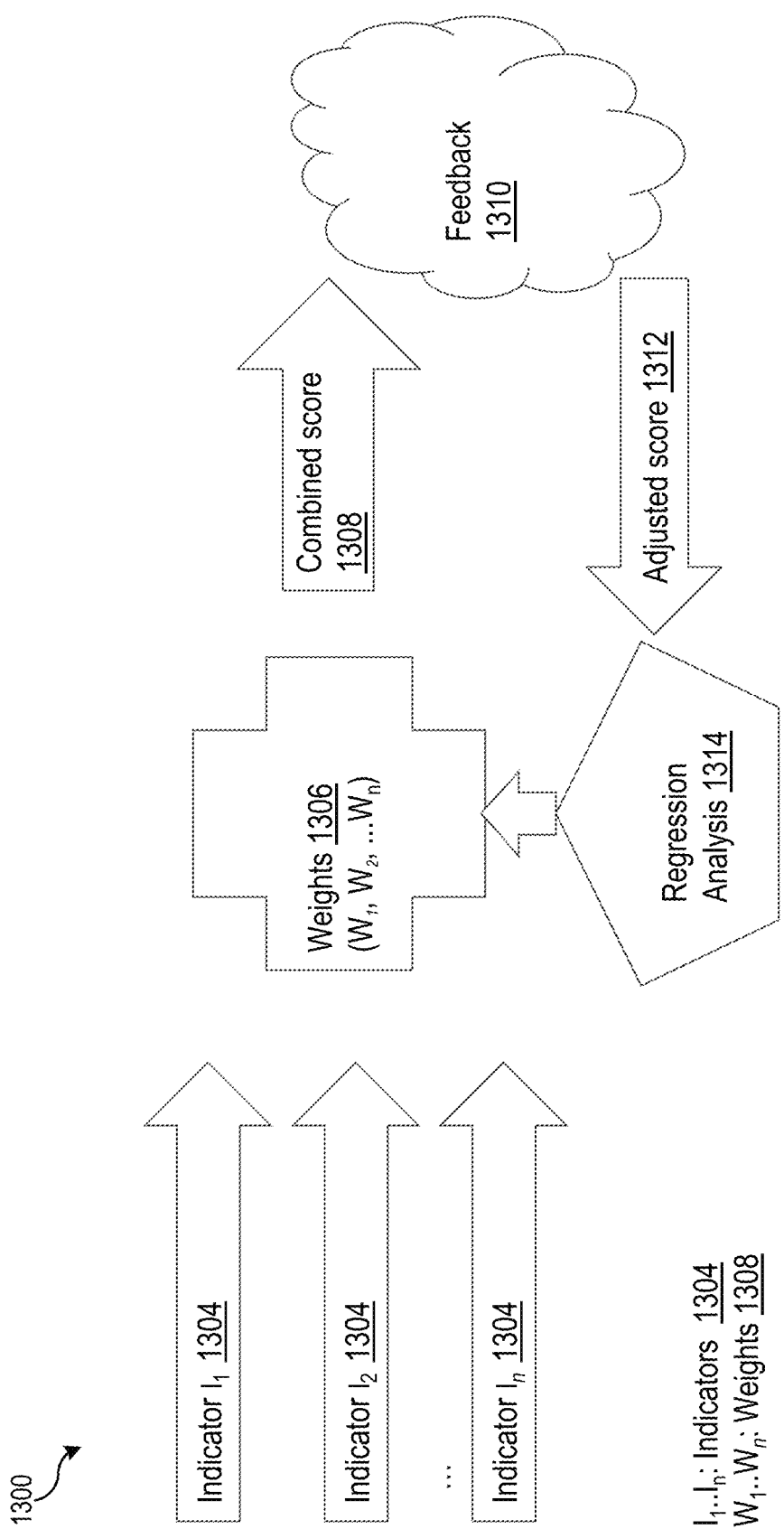
FIG. 13 illustrates a sequence flow diagram of a process for computing a measure of security for a user based on application usage according to some embodiments.
Figure 14:
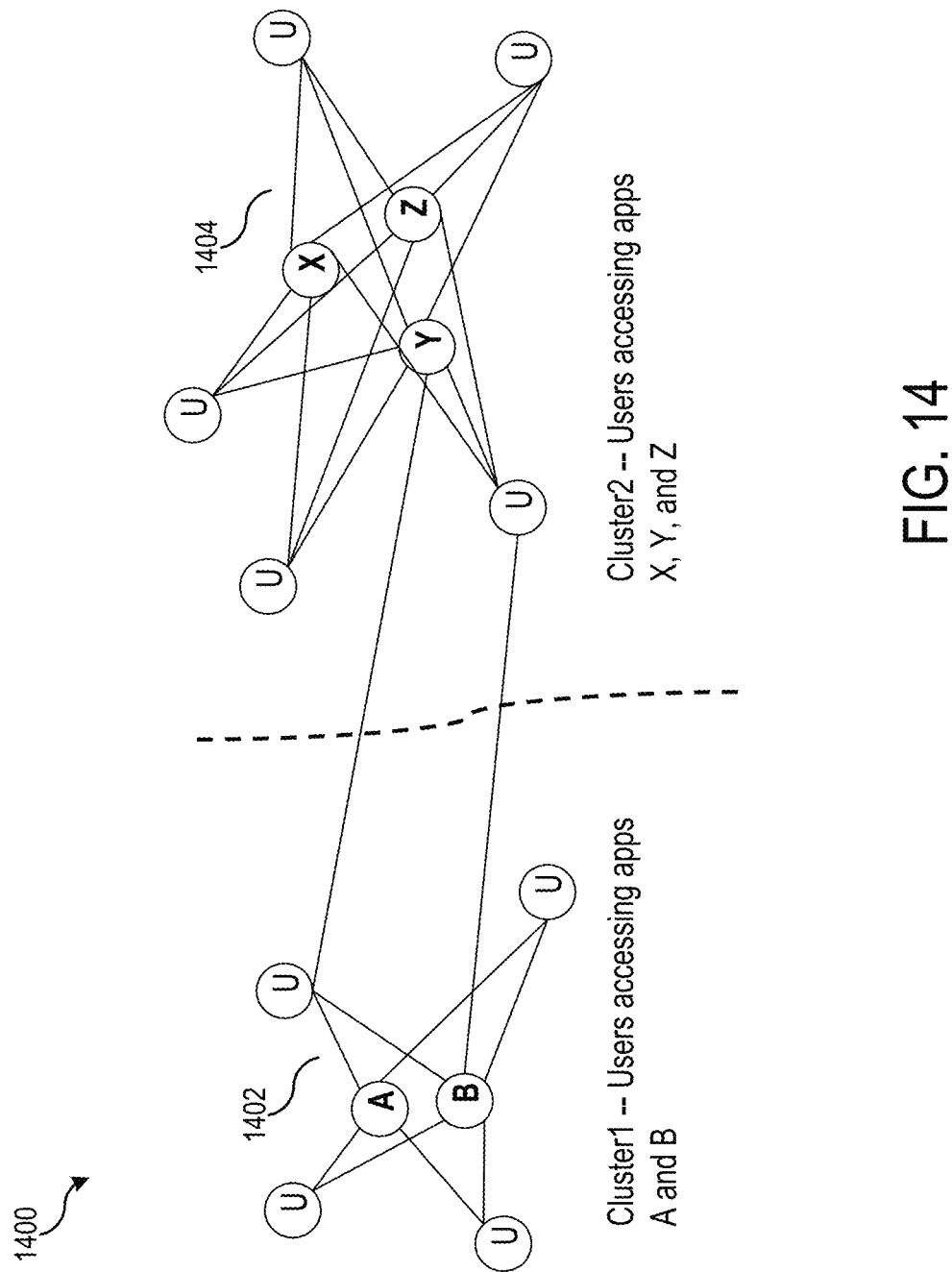
FIG. 14 illustrates graphs for assessing a measure of security for a user based on application usage according to some embodiments.
Figure 20:
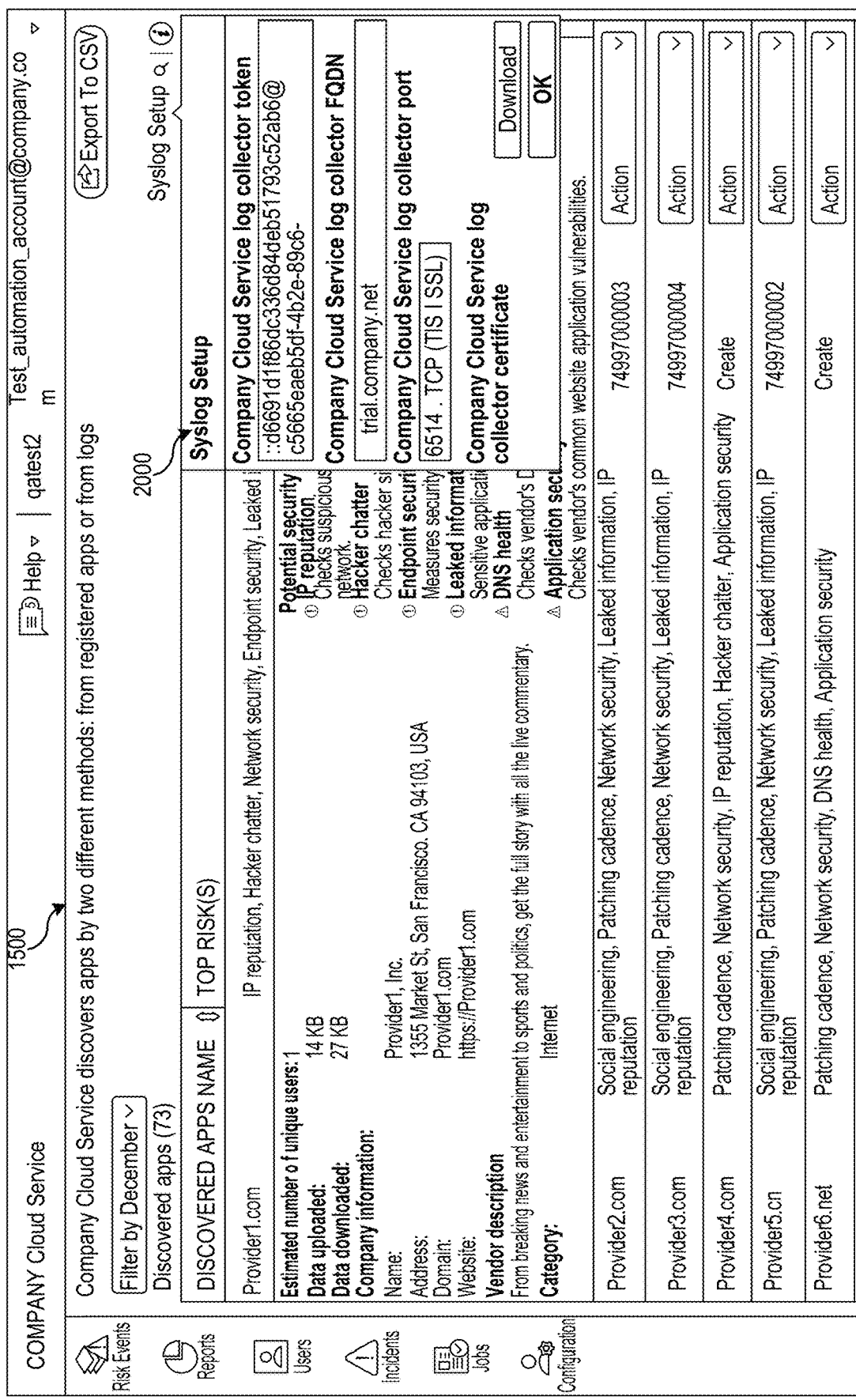
Figure 23:
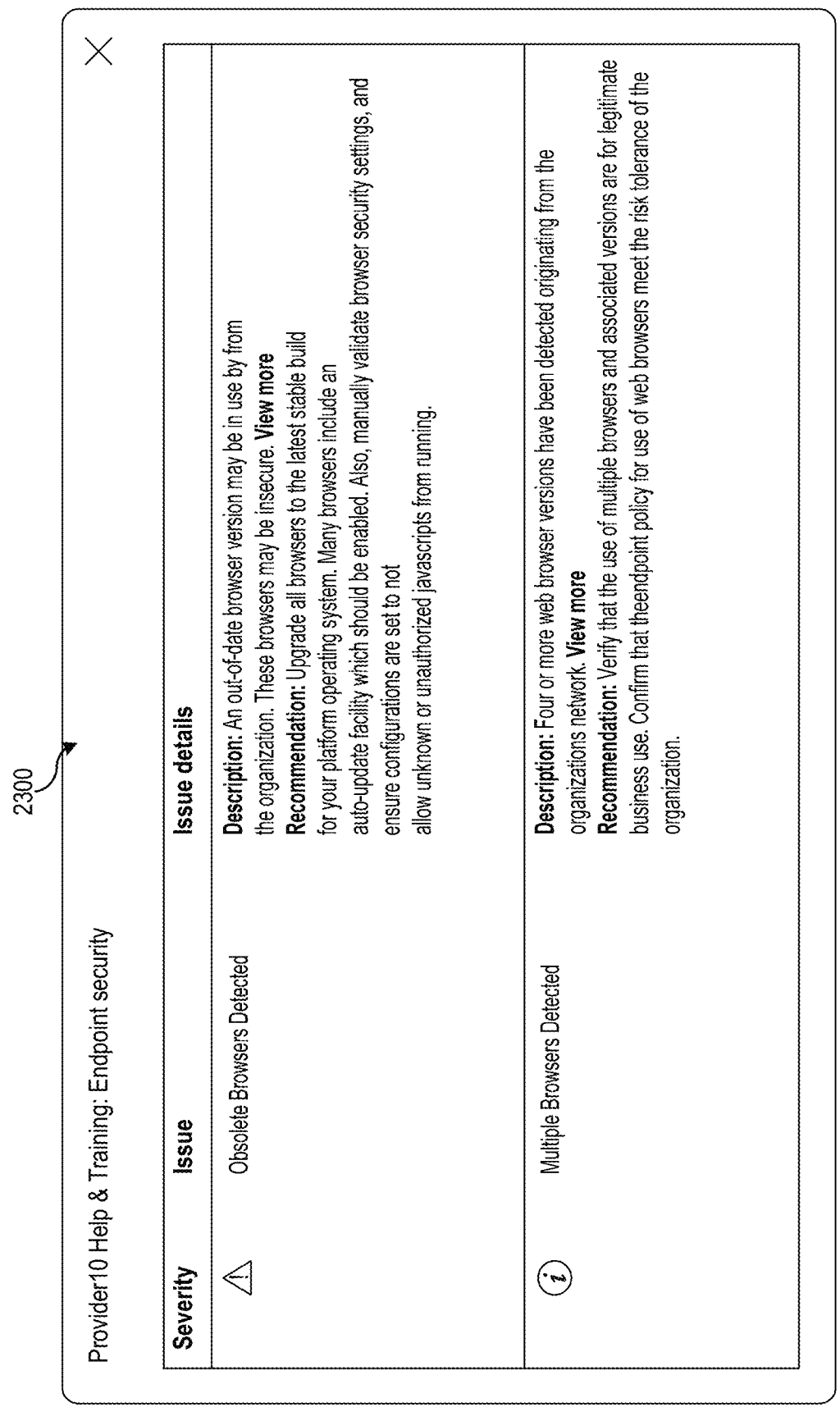

FIGS. 13 and 14 illustrate a technique for computing a measure of security for a user based on application usage according to some embodiments. Specifically, FIG. 13 illustrates an example of a sequence flow diagram 1300 of a process. The techniques may be implemented by security monitoring and control system 102. A measure of security of a user may be computed using techniques disclosed with reference to FIG. 9.

A measure of security of a user (also referred to herein as a "user risk score") may provide an indication as the risk or threats to security a user may pose to an organization. As discussed above, a user may pose a security threat to an organization's network based on use of an application in an unauthorized or unsecure manner. Such use may expose an organization to vulnerabilities of its private network and data. In some instances, an application may pose a threat to an organization based on inefficient or improper use of an organization's resources, such as a corporate network and/or computing resources. A user risk score may provide a measure that indicates the severity of security threats related to a user in the organization. A user risk score may be generated continuously by profiling the user actions for applications.

In some embodiments, security monitoring and control system 102 may provide graphical interfaces may be presented to display information about and/or related to risk scores. Examples of graphical interfaces are displayed in priority application U.S. Provisional Application No. 62/460,716, filed Feb. 17, 2017, entitled "Systems and Methods for Discovering and Monitoring Unsanctioned Enterprise Assets." A graphical interface may presented in a console as a user report with risk score and related visualizations (KSI). The graphical interface may serve as a single pane of glass that combines risk elements from various sources and present in a uniform manner for both sanctioned and unapproved apps. The graphical interfaces enable users (e.g., a security administrator) to see associated risk indicators to understand why risk scores for some users are high, which includes unusual actions performed in the apps, risky unapproved apps accessed etc. This helps a user to take or configure remediation actions such as blocking apps in the firewall, to educate the user to avoid the app, or to suspend the user account. The graphical interfaces may enable a user to configure customized alerts based on creating policies that matches certain conditions such as risk app score, app category, user risk score etc.

The measure of security of a user may be computed based on information provided by one or more third party sources, one or more users, a source managed and curated by security controlling and management system 102, or combinations thereof. The measure of security of a user may be based on information including, but not limited to, information ("organization information") about the application and a provider of the application, information about security of the application ("security information"), and/or usage related to an application ("application usage information"). Organization information and security information may include information disclosed herein, such as with respect to determining a measure of risk of an application. Application usage information may indicate information about usage of an application, such as type of operations/actions performed (e.g., mass export of data from or contacts download for the application or excessive number of file access), a category of applications accessed (e.g., apps associated with a malware website, an information leakage website, or apps/tools used by hackers will increase the user risk score), or an abnormal deviation from usage of an application. For example, application usage information may provide an indication of malware activity based on a user who rarely accessed files using one provider system suddenly starts downloading a large number documents.

A measure of security of a user may be a value (e.g., a user risk score) on a scale that defines a measure of security risk for a user. For example, a scale can be defined as between 1 to 5, where a higher value represents a greater risk of a user. In other embodiments, any of a variety of ranges and values may be utilized as appropriate to the particular assessment. The score can be utilized by security monitoring and control system 102 to provide alerts, provide reports, and/or perform remedial measures. A measure of security of a user is a value that serves as a prioritization indicator to aid users (e.g., security administrators) in mitigating security threats posed by users. In some embodiments, a measure of security may be computed in several ways.

A user risk score may indicate a measure of security with regard to a severity of security threats posed by a specific application to an organization. A user risk score may be computed based on one or more indicators (also referred to herein as "threat indicators" or "security indicators"). Each indicator may be a value or information that indicates a security risk. For example, in FIG. 13, a unique security indicator may be obtained from one or more data sources (also referred to herein as "risk score feeds"), which provides a "feed" of one or more indicators of applications. Each unique indicator ("I") (collectively referred to herein as indicators "$I_1, I_2, \ldots, I_n$," 1304) may be provided by each of the data sources, respectively. An indicator may be a particular type of indicator based on information related to or about an application, such as the types of information indicated above. An indicator may be a value that provides an indication of a security threat posed by a user. For example, a first indicator may be a first value indicating a first security threat by a user. A second indicator may be a second value indicating a second security threat by the user. The first indicator may be obtained from a first source and the second indicator may be obtained from a second source.

Indicators 1302 may include, for example, a user risk score for an authorized app, a risk score for an unknown/unauthorized app, or actions associated with an app. The following example illustrates how user risk scores are evaluated. Note that limited number of indicators have been used in this example but system can be configured to use additional indicators. In one example, a first indicator $I_1$ may be a user risk score obtained from a data source for an application that is authorized (e.g., sanctioned) for use by an organization. A user risk score can be calculated from user actions in the the sanctioned app. This risk score combines various user activities in the sanctioned app such as upload/download of documents. A second indicator 12 may be a measure in deviation of upload volumes for unsanctioned apps. For example, the second indicator may be computed as (1 day upload volume-30 day average upload volume)/(30 day upload vol. standard deviation). A third indicator $I_3$ may be a measure indicating a deviation of risk scores of sites visited. For example, the third indicator may be computed as (1 day sum of app risk scores-30 day daily average app risk scores)/(30 day daily app risk score standard deviation). In this example, a user risk score may be computed using all three indicators. In some embodiments, a user risk score may be computed using additional indicators such as those described with reference to FIG. 14.

In some embodiments, security monitoring and control system 102 may produce a graphs using risk scores for apps and users. One or more graphs may be used to derive additional indicators. Now turning to FIG. 14 is a graph 1402 of a first cluster of users accessing applications A and B. FIG. 14 illustrates a graph 1404 of a second cluster of users accessing applications X, Y, and Z. Each of the graphs may be generated using information about users and application usage obtained from one or more data sources, such as those disclosed herein. The graphs may be generated using one or more clustering algorithms known by those skilled in the art. Examples of a clustering algorithm may include the Markov Cluster (MCL) algorithm. Using one or more graphs, a set of users may be identified based on one or more attributes, such as users that access similar sites. Such an analysis may be performed using graph analytics, including one or more known techniques of graph analytics, such as Girvan-Newman edge clustering algorithm.

Continuing with the example of the indicators 11-3 above, a fourth indicator 14 may be derived using the graph analysis. For example, 14 may be computed as (1 day sum of app risk scores-30 day daily average app risk scores of cluster)/(30 day daily app risk score standard deviation of cluster). A fifth indicator 15 may be computed as (1 day upload volume-30 day average upload volume of cluster)/(30 day upload vol. standard deviation of cluster).

Each threat indicator may represent a user risk score that is a value indicating a measure of security risk, or threat, of a user according to a scale defined by the source for that indicator. In some embodiments, threat indicator may be compared to a scale to determine a user risk score. The scale may be defined by or based on information provided by a source.

Security monitoring and control system 102 may compute a user risk score based on one or more threat indicators. In other words, the measure of security may be computed as a combined measure of security risk of a user. Each indicator may be processed to adjust (e.g., normalize) a value of the indicator to an adjusted value according to a scale (e.g., a scale of values from 0 to 100) to be used for all indicators. Once normalized, a value for each indicator may be combined to determine a combined score.

A combined security score 1308, which indicates a measure of risk of a user, may be based on all or some of the indicators. The number and/or type of indicators considered for determining the combined security score may be configurable. As such, security monitoring and control system 102 may be configured to add or remove sources from which indicators are obtained and may be configured to add or remove indicators 1304 that are obtained from sources. In some embodiments, a graphical interface may be presented that enables a user to configure the number and type of indicators considered for a score. In some embodiments, the combined score may be based on a security policy that defines the criteria by which the score is to be computed. The criteria may be based on one or more attributes of security. The attributes may be used to selected the indicators to consider for the score.

In some embodiments, a combined user risk score 1308 may be based on a combination of indicators using a weight value for each indicator. For example, a weight ("W") (collectively referred to herein as weights "$W_1, W_2, \ldots, W_n$," 1304) may be selected to be applied to one or more specific indicators for computing combined score 1308. A weight may be a value that is a whole integer 1 or a fraction of 1. Different weights may be selected for different indicators. In the example above, a first weight may be a first weight value for a first indicator and a second weight may be a second weight value for a second indicator. The weight values may be different.

A weight may be configured by a user through a graphical interface. In some embodiments, a weight may be selected based on a security policy that defined based on particular indicators being given a particular weight. A greater value for a weight may be considered when an indicator has more importance or suggestion about a security risk of a user. A lesser value for a weight may be considered when an indicator has less importance or suggestion about a security risk of a user. In some embodiments, a weight may be chosen for all indicators from a particular source. For example, a weight may be applied to all indicators from a source based on reliability or trust of that source. In some embodiments, security monitoring and control system 102 may store data about threat research analysis of users. Such data may be used to selectively choose a weight for each indicator.

A combined score may be computed based on consideration of indicators and weights for those indicators. In at least one embodiment, a combined score may be computed using an equation 1308 to provide a combined score=$(I_1(W_1)+I_2(W_2)+ \ldots I_n(W_n))/(W_1+W_2+ \ldots W_n)$. In this equation, a value is computed for each indicator ("I") 1304, by multiplying each indicator by a respective weight ("W") 1306. A first value is computed that is a summation of the value computed for each indicator $(I_1(W_1)+I_2(W_2)+ \ldots I_n(W_n))$. A second value is computed that is a summation of each weight value that is applied to obtain the first value. The combined score 1308 may be computed based on dividing the first value by the second value. In the example continued from above, a user risk score may be computed as $(I_1(W_1)+I_2(W_2)+I_3(W_3)+I_4(W_4)+I_5(W_5))/(W_1+W_2+W_3+W_4+W_5)$.

In some embodiments, security monitoring and control system 102 may obtain feedback 1310 from one or more users on the validity and accuracy of the combined score 1308. Feedback 1310 may be obtained through a network, facilitated through a graphical interface or manual feedback. Any of the sources, indicators, and/or weights may be adjusted based on feedback 1310. Based on feedback 1310, the combined score 1308 may be adjusted. A new combined score 1312 ("adjusted score") may be computed in the same manner as combined score 1308 was computed, except adjusted score 1312 may be computed based on indicators and/or weights selected based on feedback 1310. The sources, indicators, and/or weights may be added or removed from what was used to compute combined score 1308. The weight value for indicators can be revised periodically to improve the risk score based on our security analysts as well as customer feedback. The revision process for the indicator weight can be performed through automated machine learning algorithms such as decision tree and neural networks.

Regression analysis 1314 may be performed based on each indicator and/or a combined score with respect to a particular security threat. Regression analysis may include building and updating a linear regression model. A linear regression model may provide output such as $S=c_1(I_1)+c_2(I_2)+ \ldots +c_n(I_n)$. The coefficients $c_1$ computed by the regression model could be new or modified weights that would replace the initial weights for computing combined score 1308. The model will provide greater accuracy as more feedback and more data is collected.

In some embodiments, computing a user risk score may include scaling individual scores (or Z-scores) computed for each indicator. In one illustrative approach, negative z-scores are set to 0. The reason is that below average activity levels are considered to be within normal range. Z-scores above 6 may be scaled to 6 (z-score of 3 is considered an outlier and z score of 6 is considered an extreme outlier). A Z-score between 0 and 6 are scaled of between 0 and 100 as follows: Scaled z-score=z-score*(100/6).

Continuing with the example discussed above, indicator $I_1$ may be a sanctioned app risk score of 92 (scale of 0-100), so the score may not be scaled. Indicator $I_2$ may be computed as a raw z score: (100-20)/10=8, where the upload volume for today is 100 MB and the average for the last 30 days is 20 MB and the standard deviation is 10 MB. Since the score is 8, it may need to be scaled. The scaled score may be a100.000. Indicator $I_3$ may be computed as a raw z score: (50-20)/5=6, where average risk score of sites visited today is 30, average for the last 30 days is 20, and standard deviation is 5. The score for 13 may be scaled to 100.000. Indicator $I_4$ may be computed as a raw z score: (30-25)/10=0.5, wherein an average risk score of sites visited today is 30, an average of peer group for the last 30 days is 25, and standard deviation is 10. The score of 14 may be scaled to 8.3333. Indicator $I_5$ may be computed as a raw z score: (40-60)/30=-0.667, where upload volume for today is 40 MB, the average of peer group for the last 30 days is 60 MB, and standard deviation is 30 MB. The score for $I_5$ may be scaled to 0.

Continuing with the example, based on the data quality and a number of a data source, weights may be assigned for each indicator as follows: $W_1$=60%, $W_2$=30%, $W_3$=5%, $W_4$=2%, $W_5$=3%. A user risk score may be computed using the weights and indicators (which may be scaled). In this example, a user risk score (scaled Z-score) may be computed as (0.60*92)+(0.30*100.0)+(0.05*100.0)+(0.02*8.333)+(0.03*0)=90 (rounded). If an administrator can verify that there are no additional significant risks for the user, then the administrator can adjust the final score from 90 to 25. Scores may be applied to a linear regression analysis 1314 by a linear regression algorithm: features ($I_1, I_2, \ldots$): 92, 100.0, 100.0, 8.333, 0 with the target variable (adjusted combined score): 25. Using these as well as features and target variables for all user scores, the regression algorithm would calculate the new weights ($w_1, w_2, \ldots$) for each indicator for the customer and update risk scores for all users (in the customer tenant) accordingly.

XII. Interfaces for Discovery and Management of Security for Applications

FIGS. 15-26 illustrate interfaces, e.g., graphical interfaces, for discovery and management of security for applications in a computing environment in accordance with some embodiments. Each of the graphical interfaces, such as a graphical user interface (GUI), may be displayed at a client with access to services provided by security monitoring and control system 102 disclosed in the figures. The graphical interfaces may be displayed as part of an access portal, such as a web site, or in an application. Additional examples of graphical interfaces are displayed in priority application U.S. Provisional Application No. 62/460,716, filed Feb. 17, 2017, entitled "Systems and Methods for Discovering and Monitoring Unsanctioned Enterprise Assets."

In this disclosure, "an element" may be included in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface such as a heat map for which network data is displayed.

In FIG. 15, a GUI 1500 is shown in application that enables a user to discover and manage security of applications accessed on a network of an organization. GUI 1500 is shown as an interactive interface (e.g., a dashboard), that is interactive to view applications that have been discovered as being accessed on a network of an organization. The GUIs in FIGS. 15-26 may be presented as a part of or based on interaction with the dashboard in the application. The dashboard may include one or more interactive tabs for interactive interfaces, such as "Summary," "App Discovery," and "Key Security Indicators." The information and elements in the interfaces may be references in multiple GUIs of the figures to illustrate additional examples.

Now turning to the example of FIG. 15, GUI 1500 is shown with "App Discovery" selected. Information about applications may be displayed based on how the information was obtained. For example, information about application may be displayed under a tab for an interface "From registered apps" for applications that are known based on registration. In another example, information about application may be displayed under a tab for an interface "From logs" 1504 for applications that are discovered based on techniques disclosed here for identifying applications accessed by users. The functionality shown with regard to applications in either tab may be combined into a single tab or may be implemented in the other tab.

GUI 1500 may include an element 1506 that is interactive to selectively provide input to filter discovered applications. Filtering may be performed based on one or more attributes, such as time, date, application type, action, risks, or any other type of information displated for an application that is discovered.

As disclosed herein, applications may be discovered using many techniques, such as inspection of log files (e.g., syslog files) for network activity. GUI 1500 may include an element 1510 that is interactive to provide input to configure how log files are collected for analysis to discover applications. Interaction with element 1510 may cause an additional or modified GUI 2000 ("Syslog Setup") to be displayed along side or with GUI 1500. GUI 2000 may enable a user to configure how log files are collected. GUI 2000 may include one or more elements that can receive input to configure a token for accessing log files, a path or source for the log files, a location (e.g., an endpoint) where to place the collected log files, and one or more connection parameters (e.g., a port) for the of log files. The parameters for configuring log files may include one or more parameters for a secure location and/or connection for storing the log files.

GUI 1500 may be interactive to display a grid or table view of information about each application that is discovered. In the example shown, GUI 1500 is displayed with with a row for each application that has been discovered as being accessed. Each row displays information about a discovered application including a domain of a host system that provides the application, top risks, incident(s), and configurable remediation actions. Each entry or row in the view may be interactive including the fields in each entry. The top risks may display information about different categories of security risks for applications.

GUI 1500 may include an element 1508 that is interactive to export a data file of information for any of the entries of applications in the table. The data file may be used to manage, monitor, and follow up with action on security of an application.

Interaction with an element corresponding to "incident" in an entry of the table may cause GUI 1900 in FIG. 19. The element may be interactive to select one or more incidences previously opened. GUI 1900 may be displayed on top or along side GUI 1500. A GUI may be presented to display information about an incident that has been opened. GUI 1900 may include one or more interactive elements to provide input to configure an incident for an application. Interaction with an element for opening an incident may be specific to the application corresponding to element for the entry. GUI 1900 of FIG. 19, may include elements 1902 ("category"), 1904 ("Discovered App name"), 1906 ("Vendor domain"), 1908 ("Description"), 1910 ("Remediation Action"), 1912 ("Assigned to"), 1914 ("Priority"), 1916 ("Approval"), 1918 ("New Incident"), and 1920 ("Cancel").

Element 1902 may indicate one or more security risks for which the application is discovered. The risks may have been selected in the GUI 1500 before initiating a new incident. Element 1904 may indicate the name of an application. Element 1906 may indicate a domain of the host system providing the application. Element 1908 may be interactive to specify a description about the incident. The description may be pre-filled based on the security risks. The description may be used to provide a description about use of the application. Element 1910 may be interactive to specify one or more remediation actions. The remediation actions may be pre-selected in element 1910 based on the security risks. Element 1912 may be interactive to specify one or more users to be notified about the security of the application. Element 1914 may be interactive to specify a priority of the application. Element 1916 may be interactive to indicate approval to create an incident. Element 1918 may be interactive to submit a request to create an incident based on the input to GUI 1900. Element 1920 may be interactive to cancel creating an incident.

Interaction with an element corresponding to an entry in the table may cause GUI 1500 to be modified to display information about the discovered application corresponding to that entry. For example, in FIG. 16, GUI 1500 is shown with an expanded GUI 1600 (e.g., a graphical interface) of an entry for a discovered application. GUI 1600 may display organization information about an application. The organization information may include information about use related to the application, such as a number of users, network activity (e.g., data uploaded and data downloaded), a category of the application, and information about an organization that provides the application. The information about the organization may include a name, an address, a domain, a website, a description of the organization, and/or other information about registration of the organization for the application.

GUI 1600 may display information about each of security risks displayed in an entry in GUI 1500. Each security risk may be displayed with information describing the security risk and may be displayed with a visual appearance about the security risk. For example, the visual appearance may be with an image and color to indicate a severity of the risk. The security risk may be determined based on a security indicator in the security information determined for the discovered application. The information may be displayed specific to the statistics or underlying information about the security risk. In some embodiments, the security risk may be based on information provided by a third party source, a user, and/or curated by security monitoring and control system 102. In some embodiments, the security risk may be based on one or more indicators of security. The security risk may be based on application of one or more security policies. The security policies may be applied using the measure of security determined for one or more security risks.

Figure 16:
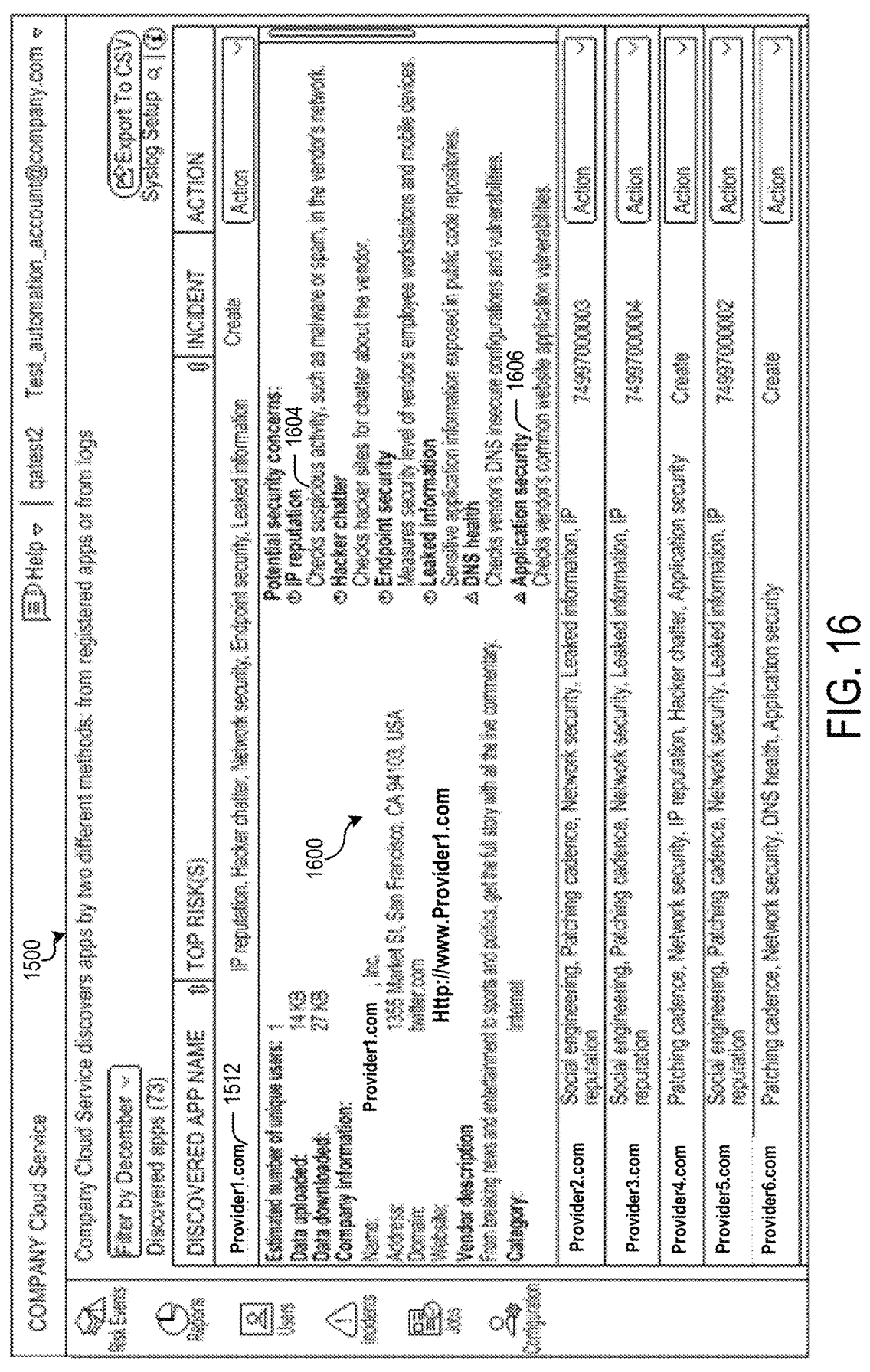

In the example shown in FIG. 16, GUI 1600 may include an element for each security risk. An element corresponding to a security risk may be interactive to cause a GUI to be displayed, either along side GUI 1500 or in addition to GUI 1500. In one example, GUI 1700 of FIG. 17 may be displayed based on interaction with element 1604 for a security risk ("IP Reputation"). In another example, GUI

Figure 18:
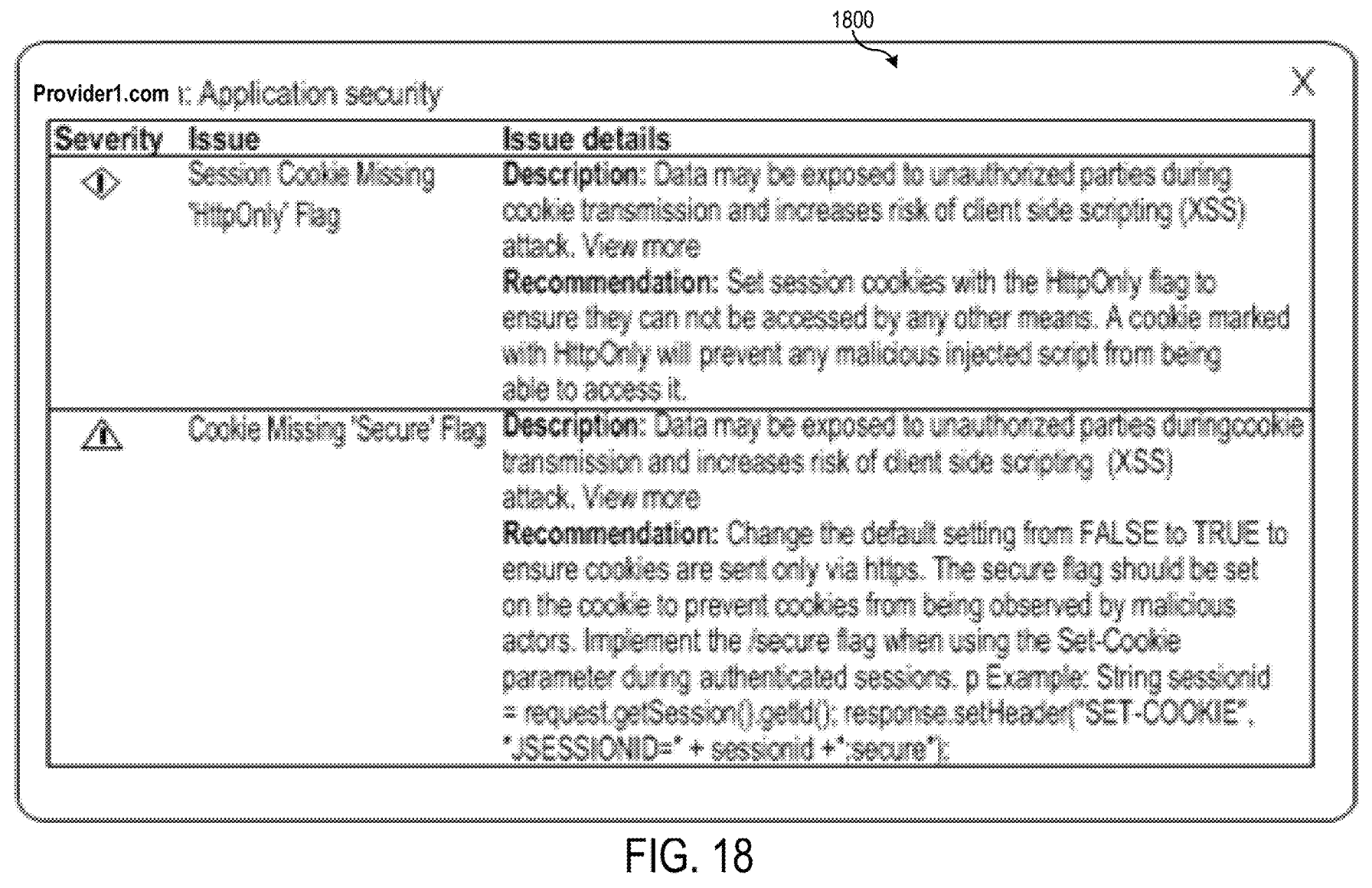

1800 of FIG. 18 may be displayed based on interaction with element 1606 for a security risk ("Application Security").

Each of GUIs 1700 and 1800 displays information about a specific security risk. The information may correspond to one or more events related to the security risk for accessing the application. The information may be displayed based on each event or category of events including information about the actual event. Each security risk may be displayed with information about the issue. One or more remediation actions may be provided. The information may be provided by a third party source, a user, and/or curated by security monitoring and control system 102. For example, the information may be provided by a provider of the application. Each security risk may be displayed with a visual appearance indicating a severity of the risk. In some embodiments, an element may be presented with each risk, such that the element may be interactive to cause another GUI to be displayed to automate and/or configure a remediation action.

New returning to FIG. 15, an element, such as 1512 may be presented in GUI 1500 for each entry corresponding to a unique discovered application. The element may be interactive to configure one or more remediation actions for the application. The element may provide one or more options, which may be specific to the security risks for the application. Interaction with the element may cause another GUI to be displayed along side or in addition to GUI 1500 to configure a remediation action. A security risk may be selected to enable a remediation option to be selected for the security risk. In some embodiments, one or more remediation actions may be presented based on the security risk and one or more security policies. Remediation actions that have been performed may also be displayed with an entry for a discovered application.

Interaction with element 1502 may cause GUI 1500 to be updated to display GUI 2100 of FIG. 21. Similar to GUI 1500, GUI 2100 may display information about application that are discovered. The information may include security risks. GUI 2100 may be interactive like GUI 1500. The applications identified in GUI 2100 may be applications that have been registered with an organization. Interaction with an entry 2102 in FIG. 21 may cause GUI 2200 to be displayed.

Similar to FIGS. 17 and 18, FIGS. 23-25 display GUIs with information about a security risk displayed in GUI 2200. GUI 2200 may include an element 2202 ("Endpoint Security") for an endpoint security risk, an element 2204 ("Network Security") for a network security risk, and an element 2206 ("IP Reputation") for an IP reputation security risk. Each of element 2202, element 2204, and element 2206 may cause GUI 2300 of FIG. 23, GUI 2400 of FIG. 24, and GUI 2500 of FIG. 25, respectively, to be displayed along side or in addition to GUI 2200.

Figure 26:
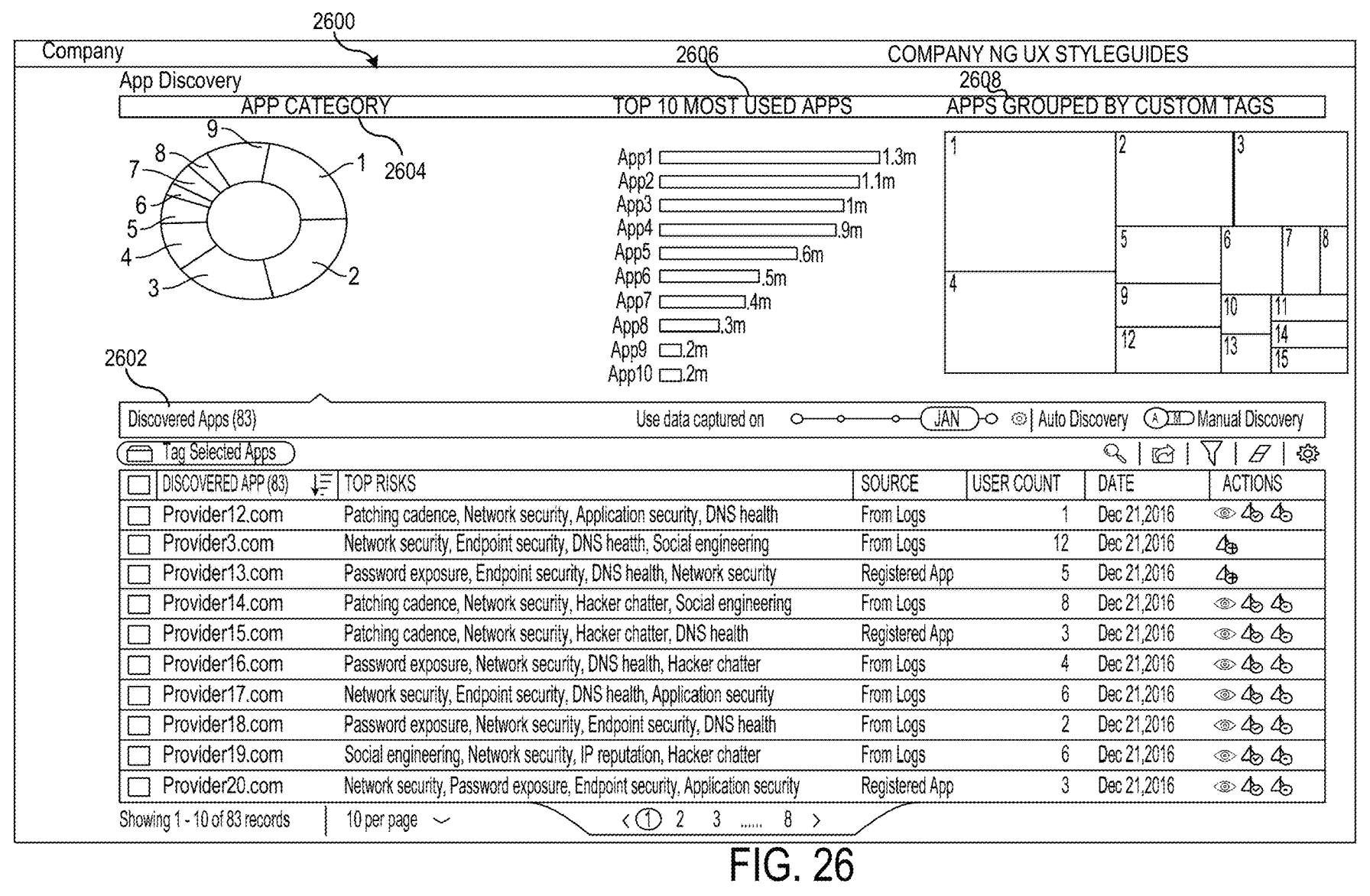

FIG. 26 illustrates a GUI 2600 of "App Discovery" showing details about applications that are discovered. GUI 2600 may include an interactive view 2602 that displays an entry in a table view for each unique application that is discovered. Similar to GUI 1500 of FIG. 15, each entry may include information about an application including an application name and a provider of the application. Like GUI 1500, each entry may be interactive to cause additional information to be displayed about the application corresponding to the entry. An entry may indicate one or more top risks associated with one or more indicators. Different from GUI 1500, GUI 2600 can show an entry for each unique application discovered, regardless of a source of the discovery (e.g., logs or registration).

In some embodiments, an entry may indicate other information about events related to the discovered application. An entry may indicate information about use of the application, such as the number of users that have accessed the application and a date when the application was accessed.

In some embodiments, the entries in the table view may correspond to applications discovered as a registered app and/or from logs. Each entry may include one or more elements to perform remediation actions. The view 2602 may include one or more elements (e.g., a toolbar) that is interactive to configure a time period when to identify applications that have been accessed and/or to automate discovery of applications. The toolbar may be interactive to configure notifications, settings, and searches of the applications that have been accessed.

GUI 2600 may include an area 2604 that displays a visualization of statistical information about a measure of app usage. The statistical information may be displayed based on one or more security risks. GUI 2600 may include an area 2606 that displays a visualization of app usage based on a measure of usage. GUI 2600 may include an area 2608 that displays a visualization of a grouping of apps based on information, such as category, domain, service provider, security risks, or other categories of information associated with an application.

Figure 27:
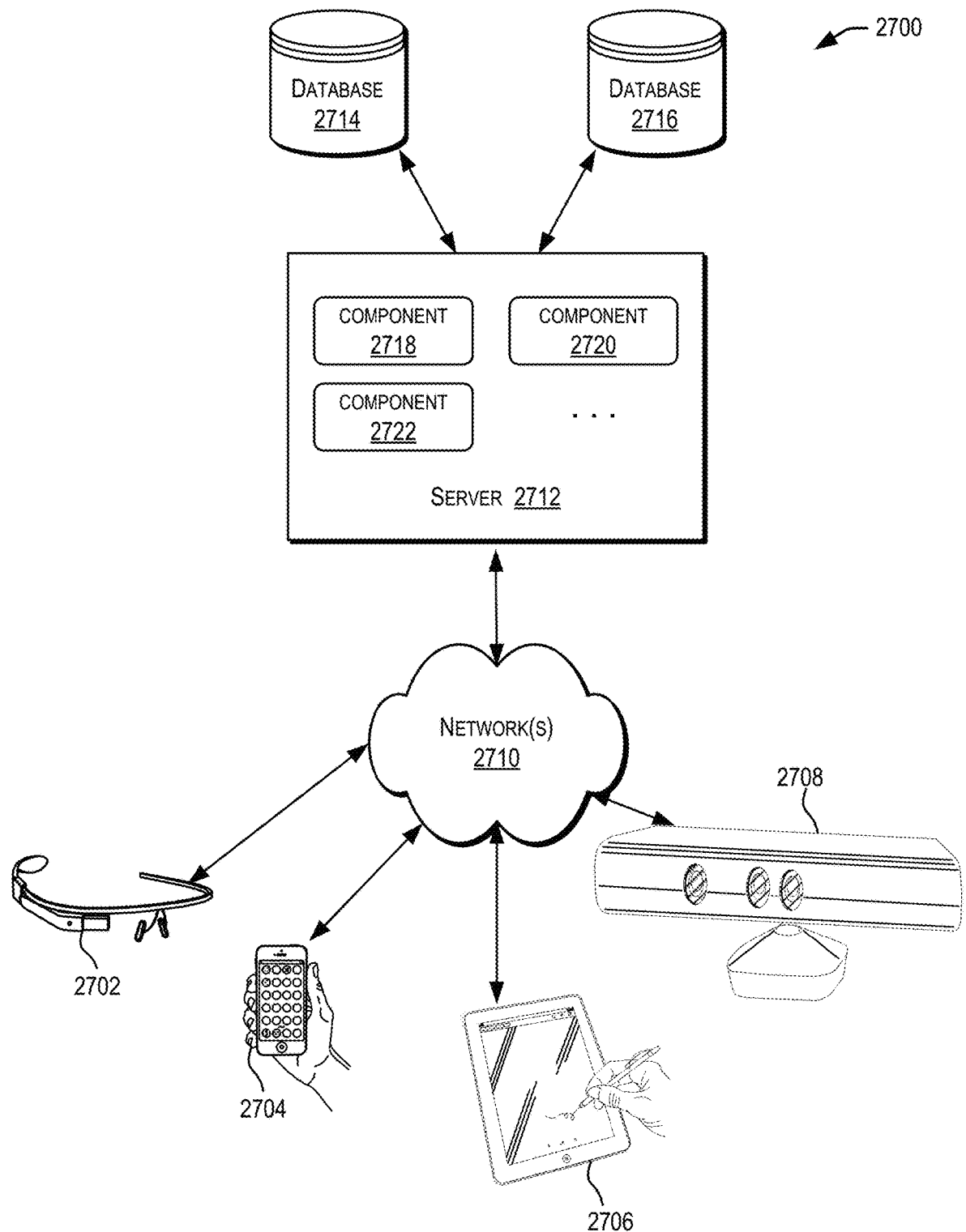
FIG. 27 depicts a simplified diagram of a distributed system for implementing an embodiment.

XIII. General Computer Systems for an Access Management System and Client Systems FIG. 27 depicts a simplified diagram of a distributed system 2700 for implementing an embodiment. In the illustrated embodiment, distributed system 2700 includes one or more client computing devices 2702, 2704, 2706, and 2708, which are configured to execute and operate a client application such as a web browser, proprietary client (e.g., Oracle Forms), or the like over one or more network(s) 2710. Server 2712 may be communicatively coupled with remote client computing devices 2702, 2704, 2706, and 2708 via network 2710.

In various embodiments, server 2712 may be adapted to run one or more services or software applications. In certain embodiments, server 2712 may also provide other services or software applications can include non-virtual and virtual environments. In some embodiments, these services may be offered as web-based or cloud services or under a Software as a Service (SaaS) model to the users of client computing devices 2702, 2704, 2706, and/or 2708. Users operating client computing devices 2702, 2704, 2706, and/or 2708 may in turn utilize one or more client applications to interact with server 2712 to utilize the services provided by these components.

In the configuration depicted in FIG. 27, software components 2718, 2720 and 2722 of system 2700 are shown as being implemented on server 2712. In other embodiments, one or more of the components of system 2700 and/or the services provided by these components may also be implemented by one or more of the client computing devices 2702, 2704, 2706, and/or 2708. Users operating the client computing devices may then utilize one or more client applications to use the services provided by these components. These components may be implemented in hardware, firmware, software, or combinations thereof. It should be appreciated that various different system configurations are possible, which may be different from distributed system 2700. The embodiment shown in FIG. 27 is thus one example of a distributed system for implementing an embodiment system and is not intended to be limiting.

Client computing devices 2702, 2704, 2706, and/or 2708 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2710.

Although distributed system 2700 in FIG. 27 is shown with four client computing devices, any number of client computing devices may be supported. Other devices, such as devices with sensors, etc., may interact with server 2712.

Network(s) 2710 in distributed system 2700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 2710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2712 can include one or more virtual machines running virtual operating systems, or other computing architectures involving virtualization. One or more flexible pools of logical storage devices can be virtualized to maintain virtual storage devices for the server. Virtual networks can be controlled by server 2712 using software defined networking. In various embodiments, server 2712 may be adapted to run one or more services or software applications described in the foregoing disclosure. For example, server 2712 may correspond to a server for performing processing as described above according to an embodiment of the present disclosure.

Server 2712 may run an operating system including any of those discussed above, as well as any commercially available server operating system. Server 2712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2712 may include one or more applications to analyze and consolidate data feeds and/or event updates received from users of client computing devices 2702, 2704, 2706, and 2708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2712 may also include one or more applications to display the data feeds and/or real-time events via one or more display devices of client computing devices 2702, 2704, 2706, and 2708.

Distributed system 2700 may also include one or more databases 2714 and 2716. These databases may provide a mechanism for storing information such as user interactions information, usage patterns information, adaptation rules information, and other information used by embodiments of the present disclosure. Databases 2714 and 2716 may reside in a variety of locations. By way of example, one or more of databases 2714 and 2716 may reside on a non-transitory storage medium local to (and/or resident in) server 2712. Alternatively, databases 2714 and 2716 may be remote from server 2712 and in communication with server 2712 via a network-based or dedicated connection. In one set of embodiments, databases 2714 and 2716 may reside in a storage-area network (SAN). Similarly, any necessary files for performing the functions attributed to server 2712 may be stored locally on server 2712 and/or remotely, as appropriate. In one set of embodiments, databases 2714 and 2716 may include relational databases, such as databases provided by Oracle that are adapted to store, update, and retrieve data in response to SQL-formatted commands.

Figure 28:
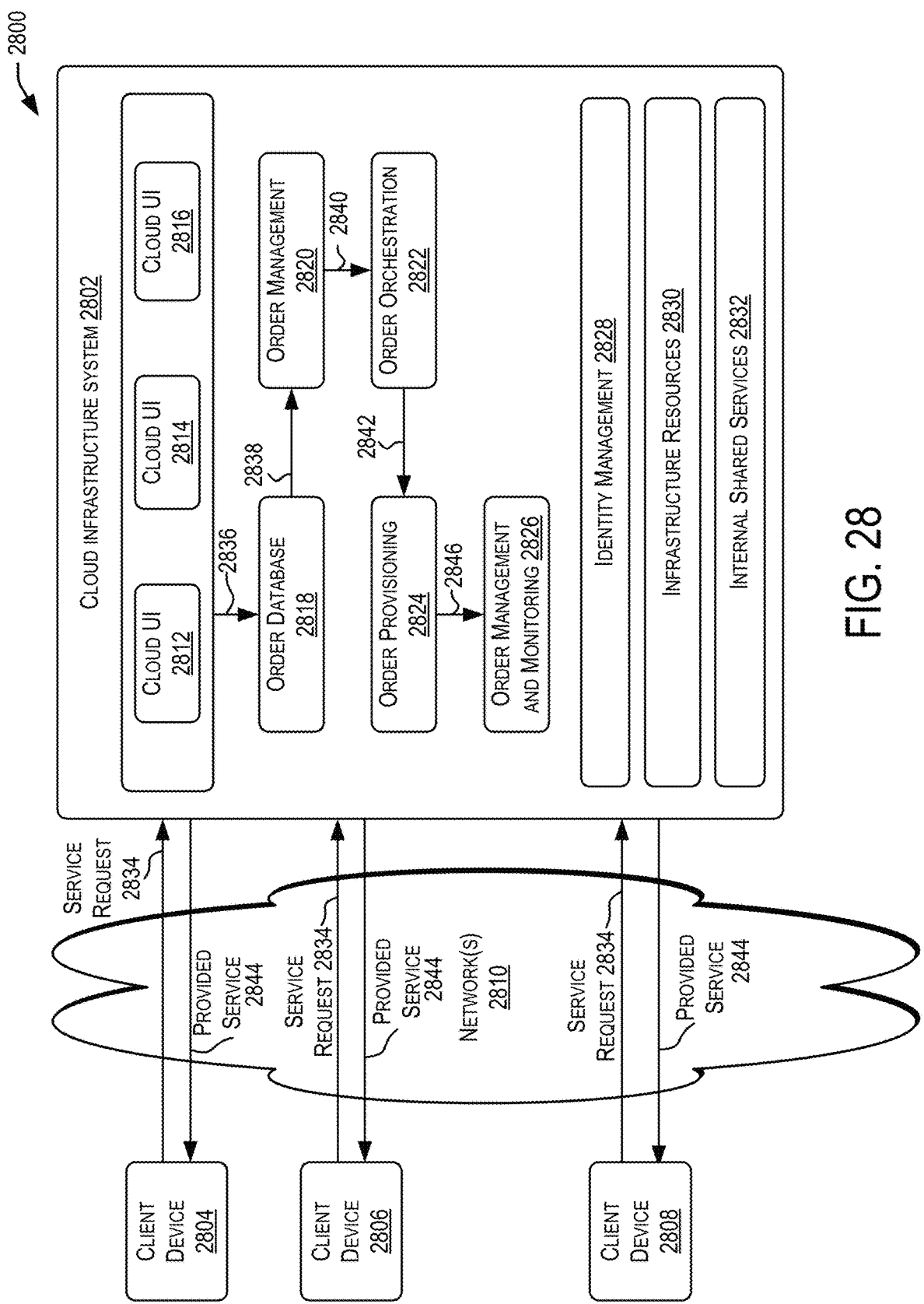
FIG. 28 illustrates a simplified block diagram of one or more components of a system environment in which services may be offered as cloud services, in accordance with an embodiment of the present disclosure.

In some embodiments, a cloud environment may provide one or more services. FIG. 28 is a simplified block diagram of one or more components of a system environment 2800 in which services may be offered as cloud services, in accordance with an embodiment of the present disclosure. In the illustrated embodiment in FIG. 28, system environment 2800 includes one or more client computing devices 2804, 2806, and 2808 that may be used by users to interact with a cloud infrastructure system 2802 that provides cloud services. Cloud infrastructure system 2802 may comprise one or more computers and/or servers that may include those described above for server 2712.

It should be appreciated that cloud infrastructure system 2802 depicted in FIG. 28 may have other components than those depicted. Further, the embodiment shown in FIG. 28 is only one example of a cloud infrastructure system that may incorporate an embodiment of the present disclosure. In some other embodiments, cloud infrastructure system 2802 may have more or fewer components than shown in the figure, may combine two or more components, or may have a different configuration or arrangement of components.

Client computing devices 2804, 2806, and 2808 may be devices similar to those described above for client computing devices 2702, 2704, 2706, and 2708. Client computing devices 2804, 2806, and 2808 may be configured to operate a client application such as a web browser, a proprietary client application (e.g., Oracle Forms), or some other application, which may be used by a user of the client computing device to interact with cloud infrastructure system 2802 to use services provided by cloud infrastructure system 2802. Although exemplary system environment 2800 is shown with three client computing devices, any number of client computing devices may be supported. Other devices such as devices with sensors, etc. may interact with cloud infrastructure system 2802.

Network(s) 2810 may facilitate communications and exchange of data between client computing devices 2804, 2806, and 2808 and cloud infrastructure system 2802. Each network may be any type of network familiar to those skilled in the art that can support data communications using any of a variety of commercially-available protocols, including those described above for network(s) 2710.

In certain embodiments, services provided by cloud infrastructure system 2802 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2802 may be adapted to automatically provision, manage and track a customer's subscription to services offered by cloud infrastructure system 2802. Cloud infrastructure system 2802 may provide the cloud services via different deployment models. For example, services may be provided under a public cloud model in which cloud infrastructure system 2802 is owned by an organization selling cloud services (e.g., owned by Oracle Corporation) and the services are made available to the general public or different industry enterprises. As another example, services may be provided under a private cloud model in which cloud infrastructure system 2802 is operated solely for a single organization and may provide services for one or more entities within the organization. The cloud services may also be provided under a community cloud model in which cloud infrastructure system 2802 and the services provided by cloud infrastructure system 2802 are shared by several organizations in a related community. The cloud services may also be provided under a hybrid cloud model, which is a combination of two or more different models.

In some embodiments, the services provided by cloud infrastructure system 2802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2802. Cloud infrastructure system 2802 then performs processing to provide the services in the customer's subscription order.

In some embodiments, the services provided by cloud infrastructure system 2802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2802 may also include infrastructure resources 2830 for providing the resources used to provide various services to customers of the cloud infrastructure system. In one embodiment, infrastructure resources 2830 may include pre-integrated and optimized combinations of hardware, such as servers, storage, and networking resources to execute the services provided by the PaaS platform and the SaaS platform, and other resources.

In some embodiments, resources in cloud infrastructure system 2802 may be shared by multiple users and dynamically re-allocated per demand. Additionally, resources may be allocated to users in different time zones. For example, cloud infrastructure system 2802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2832 may be provided that are shared by different components or modules of cloud infrastructure system 2802 to enable provision of services by cloud infrastructure system 2802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2802, and the like.

In one embodiment, as depicted in FIG. 28, cloud management functionality may be provided by one or more modules, such as an order management module 2820, an order orchestration module 2822, an order provisioning module 2824, an order management and monitoring module 2826, and an identity management module 2828. These modules may include or be provided using one or more computers and/or servers, which may be general purpose computers, specialized server computers, server farms, server clusters, or any other appropriate arrangement and/or combination.

In an exemplary operation, at step 2834, a customer using a client device, such as client computing devices 2804, 2806 or 2808, may interact with cloud infrastructure system 2802 by requesting one or more services provided by cloud infrastructure system 2802 and placing an order for a subscription for one or more services offered by cloud infrastructure system 2802. In certain embodiments, the customer may access a cloud User Interface (UI) such as cloud UI 2812, cloud UI 2814 and/or cloud UI 2816 and place a subscription order via these UIs. The order information received by cloud infrastructure system 2802 in response to the customer placing an order may include information identifying the customer and one or more services offered by the cloud infrastructure system 2802 that the customer intends to subscribe to.

At step 2836, the order information received from the customer may be stored in an order database 2818. If this is a new order, a new record may be created for the order. In one embodiment, order database 2818 can be one of several databases operated by cloud infrastructure system 2802 and operated in conjunction with other system elements.

At step 2838, the order information may be forwarded to an order management module 2820 that may be configured to perform billing and accounting functions related to the order, such as verifying the order, and upon verification, booking the order.

At step 2840, information regarding the order may be communicated to an order orchestration module 2822 that is configured to orchestrate the provisioning of services and resources for the order placed by the customer. In some instances, order orchestration module 2822 may use the services of order provisioning module 2824 for the provisioning. In certain embodiments, order orchestration module 2822 enables the management of business processes associated with each order and applies business logic to determine whether an order should proceed to provisioning.

As shown in the embodiment depicted in FIG. 28, at step 2842, upon receiving an order for a new subscription, order orchestration module 2822 sends a request to order provisioning module 2824 to allocate resources and configure resources needed to fulfill the subscription order. Order provisioning module 2824 enables the allocation of resources for the services ordered by the customer. Order provisioning module 2824 provides a level of abstraction between the cloud services provided by cloud infrastructure system 2802 and the physical implementation layer that is used to provision the resources for providing the requested services. This enables order orchestration module 2822 to be isolated from implementation details, such as whether or not services and resources are actually provisioned on the fly or pre-provisioned and only allocated/assigned upon request.

At step 2844, once the services and resources are provisioned, a notification may be sent to the subscribing customers indicating that the requested service is now ready for use. In some instance, information (e.g. a link) may be sent to the customer that enables the customer to start using the requested services.

At step 2846, a customer's subscription order may be managed and tracked by an order management and monitoring module 2826. In some instances, order management and monitoring module 2826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2800 may include an identity management module 2828 that is configured to provide identity services, such as access management and authorization services in cloud infrastructure system 2800. In some embodiments, identity management module 2828 may control information about customers who wish to utilize the services provided by cloud infrastructure system 2802. Such information can include information that authenticates the identities of such customers and information that describes which actions those customers are authorized to perform relative to various system resources (e.g., files, directories, applications, communication ports, memory segments, etc.) Identity management module 2828 may also include the management of descriptive information about each customer and about how and by whom that descriptive information can be accessed and modified.

Figure 29:
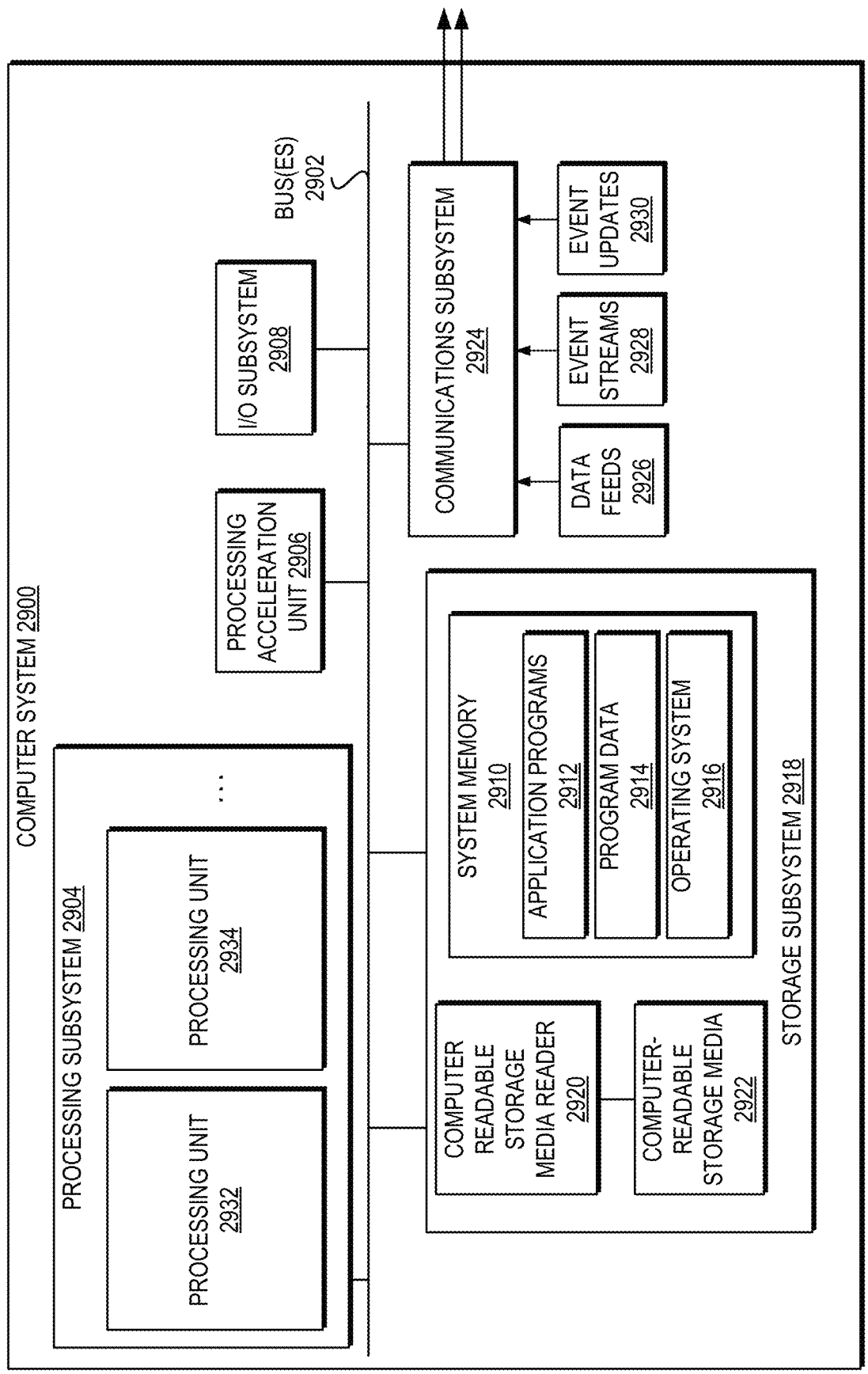
FIG. 29 illustrates an exemplary computer system that may be used to implement an embodiment of the present disclosure.

FIG. 29 illustrates an exemplary computer system 2900 that may be used to implement an embodiment of the present disclosure. In some embodiments, computer system 2900 may be used to implement any of the various servers and computer systems described above. As shown in FIG. 29, computer system 2900 includes various subsystems including a processing unit 2904 that communicates with a number of peripheral subsystems via a bus subsystem 2902. These peripheral subsystems may include a processing acceleration unit 2906, an I/O subsystem 2908, a storage subsystem 2918 and a communications subsystem 2924. Storage subsystem 2918 may include tangible computer-readable storage media 2922 and a system memory 2910.

Bus subsystem 2902 provides a mechanism for letting the various components and subsystems of computer system 2900 communicate with each other as intended. Although bus subsystem 2902 is shown schematically as a single bus, alternative embodiments of the bus subsystem may utilize multiple buses. Bus subsystem 2902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2904 controls the operation of computer system 2900 and may comprise one or more processing units 2932, 2934, etc. A processing unit may include be one or more processors, including single core or multicore processors, one or more cores of processors, or combinations thereof. In some embodiments, processing subsystem 2904 can include one or more special purpose co-processors such as graphics processors, digital signal processors (DSPs), or the like. In some embodiments, some or all of the processing units of processing subsystem 2904 can be implemented using customized circuits, such as application specific integrated circuits (ASICs), or field programmable gate arrays (FPGAs).

In some embodiments, the processing units in processing subsystem 2904 can execute instructions stored in system memory 2910 or on computer readable storage media 2922. In various embodiments, the processing units can execute a variety of programs or code instructions and can maintain multiple concurrently executing programs or processes. At any given time, some or all of the program code to be executed can be resident in system memory 2910 and/or on computer-readable storage media 2922 including potentially on one or more storage devices. Through suitable programming, processing subsystem 2904 can provide various functionalities.

In certain embodiments, a processing acceleration unit 2906 may be provided for performing customized processing or for off-loading some of the processing performed by processing subsystem 2904 so as to accelerate the overall processing performed by computer system 2900.

I/O subsystem 2908 may include devices and mechanisms for inputting information to computer system 2900 and/or for outputting information from or via computer system 2900. In general, use of the term "input device" is intended to include all possible types of devices and mechanisms for inputting information to computer system 2900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2918 provides a repository or data store for storing information that is used by computer system 2900. Storage subsystem 2918 provides a tangible non-transitory computer-readable storage medium for storing the basic programming and data constructs that provide the functionality of some embodiments. Software (programs, code modules, instructions) that when executed by processing subsystem 2904 provide the functionality described above may be stored in storage subsystem 2918. The software may be executed by one or more processing units of processing subsystem 2904. Storage subsystem 2918 may also provide a repository for storing data used in accordance with the present disclosure.

Storage subsystem 2918 may include one or more non-transitory memory devices, including volatile and non-volatile memory devices. As shown in FIG. 29, storage subsystem 2918 includes a system memory 2910 and a computer-readable storage media 2922. System memory 2910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2900, such as during start-up, may typically be stored in the ROM. The RAM typically contains data and/or program modules that are presently being operated and executed by processing subsystem 2904. In some implementations, system memory 2910 may include multiple different types of memory, such as static random access memory (SRAM) or dynamic random access memory (DRAM).

By way of example, and not limitation, as depicted in FIG. 29, system memory 2910 may store application programs 2912, which may include client applications, Web browsers, mid-tier applications, relational database management systems (RDBMS), etc., program data 2914, and an operating system 2916. By way of example, operating system 2916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2922 may store programming and data constructs that provide the functionality of some embodiments. Software (programs, code modules, instructions) that when executed by processing subsystem 2904 a processor provide the functionality described above may be stored in storage subsystem 2918. By way of example, computer-readable storage media 2922 may include non-volatile memory such as a hard disk drive, a magnetic disk drive, an optical disk drive such as a CD ROM, DVD, a Blu-Ray® disk, or other optical media. Computer-readable storage media 2922 may include, but is not limited to, Zip® drives, flash memory cards, universal serial bus (USB) flash drives, secure digital (SD) cards, DVD disks, digital video tape, and the like. Computer-readable storage media 2922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2922 may provide storage of computer-readable instructions, data structures, program modules, and other data for computer system 2900.

In certain embodiments, storage subsystem 2918 may also include a computer-readable storage media reader 2920 that can further be connected to computer-readable storage media 2922. Together and, optionally, in combination with system memory 2910, computer-readable storage media 2922 may comprehensively represent remote, local, fixed, and/or removable storage devices plus storage media for storing computer-readable information.

In certain embodiments, computer system 2900 may provide support for executing one or more virtual machines. Computer system 2900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2900. Accordingly, multiple operating systems may potentially be run concurrently by computer system 2900. Each virtual machine generally runs independently of the other virtual machines.

Communications subsystem 2924 provides an interface to other computer systems and networks. Communications subsystem 2924 serves as an interface for receiving data from and transmitting data to other systems from computer system 2900. For example, communications subsystem 2924 may enable computer system 2900 to establish a communication channel to one or more client computing devices via the Internet for receiving and sending information from and to the client computing devices.

Communication subsystem 2924 may support both wired and/or wireless communication protocols. For example, in certain embodiments, communications subsystem 2924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2924 can provide wired network connectivity (e.g., Ethernet) in addition to or instead of a wireless interface.

Communication subsystem 2924 can receive and transmit data in various forms. For example, in some embodiments, communications subsystem 2924 may receive input communication in the form of structured and/or unstructured data feeds 2926, event streams 2928, event updates 2930, and the like. For example, communications subsystem 2924 may be configured to receive (or send) data feeds 2926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2924 may be configured to receive data in the form of continuous data streams, which may include event streams 2928 of real-time events and/or event updates 2930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2924 may also be configured to output the structured and/or unstructured data feeds 2926, event streams 2928, event updates 2930, and the like to one or more databases that may be in communication with one or more streaming data source computers coupled to computer system 2900.

Computer system 2900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2900 depicted in FIG. 29 is intended only as a specific example. Many other configurations having more or fewer components than the system depicted in FIG. 29 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising, at a computer system of a security management system:
   obtaining a file including data about network activity associated with a client device on a network of an organization, wherein the network activity is generated when the client device is operating as part of the network of the organization;
   identifying, using the data about the network activity, an application that has been accessed by the client device while the client device is operating as part of the network of the organization, wherein the application is provided to the client device from a network of a service provider, wherein the network of the organization and the network of the service provider are different networks;
   determining, using the data about the network activity, access information associated with the application, wherein the access information includes network activity indicating an access of the application from the client device;
   determining, using the access information, domain information about the application, wherein the domain information identifies the service provider;
   determining, using the domain information, security information about the application, wherein the security information comprises a first value indicative of a first security threat associated with the application and a second value indicative of a second security threat associated with the application;
   computing a first weighted value that is based on multiplying the first value by a first weight value;
   computing a second weighted value that is based on multiplying the second value by a second weight value;
   computing a first sum that is based on a summation of the first weighted value and the second weighted value;
   computing a second sum that is based on a summation of the first weight value and the second weight value;
   computing a measure of security based on dividing the first sum by the second sum; and
   performing, by applying a security policy based on the measure of security, a remediation action for the application.

2. The computer-implemented method of claim 1, wherein the first value is obtained from a first data source, and wherein the second value is obtained from a second data source.

3. The computer-implemented method of claim 1, wherein the first weight value is different from the second weight value, and wherein the first value is different from the second value.

4. The computer-implemented method of claim 1, wherein obtaining the file that includes the data about the network activity includes obtaining one or more files from one or more network devices on the network of the organization, wherein the network of the organization is protected in a computing environment of the organization, the computing environment being secure from a public network.

5. The computer-implemented method of claim 1, further comprising:
   determining organization information for the application; and
   generating a graphical interface that displays information about the application, wherein the information about the application is displayed based on the organization information and the measure of security computed for the application, and wherein the graphical interface indicates the remediation action performed for the application.

6. The computer-implemented method of claim 1, wherein the data about the network activity is for communications on the network of the organization, wherein identifying the application includes processing the data to identify a communication corresponding to a request for the application, and wherein the communication indicates application information about the request for the application, the application information being used to identify the application as being accessed by the client device.

7. The computer-implemented method of claim 6, wherein the access information is determined using the communication, and wherein the access information indicates a timestamp of the network activity for the application, an IP address of a system that provides the application, a media access control (MAC) address of a device used to access the application, and user information about a user of the client device.

8. The computer-implemented method of claim 1, wherein the access information indicates an IP address of a system that provides the application, wherein determining the domain information includes performing a query, based on the IP address of the application, for the domain information corresponding to a domain that hosts the application.

9. The computer-implemented method of claim 1, wherein the access information indicates source information of the application, the source information indicating a location of the application provided by a host, and wherein determining the domain information includes sending, to the host, a request for a certificate of the application based on the source information of the application.

10. The computer-implemented method of claim 1, wherein applying the security policy includes determining whether the measure of security satisfies a risk threshold for the application, and wherein the remediation action is to configure the network of the organization to prevent the application from being accessed on the network of the organization.

11. The computer-implemented method of claim 1, wherein the data about the network activity includes network activity associated with a plurality of users, wherein the plurality of users are a tenant on the network of the organization, and wherein the remediation action is to prevent access to the application by the plurality of users.

12. The computer-implemented method of claim 1, wherein the remediation action for the application includes:
   generating a graphical interface; and
   causing the graphical interface to display a prompt requesting adjustment of a configuration operation of the application, wherein the adjustment is based on the security policy applied to the measure of security.

13. A security management system comprising:
   one or more processors; and
   a memory accessible to the one or more processors, wherein the memory stores one or more instructions which, upon execution by the one or more processors, causes the one or more processors to perform operations comprising:
   obtaining a file including data about network activity associated with a client device on a network of an organization, wherein the network activity is generated when the client device is operating as part of the network of the organization;
   identifying, using the data about the network activity, an application that has been accessed by the client device while the client device is operating as part of the network of the organization, wherein the application is provided to the client device from a network of a service provider, wherein the network of the organization and the network of the service provider are different networks;
   determining, using the data about the network activity, access information associated with the application, wherein the access information includes network activity indicating an access of the application from the client device;
   performing, using the access information, one or more queries for domain information associated with the application;
   determining security information about the application, the security information comprising a first value indicative of a first security threat associated with the application and a second value indicative of a second security threat associated with the application;
   computing a first weighted value that is based on multiplying the first value by a first weight value;
   computing a second weighted value that is based on multiplying the second value by a second weight value;
   computing a first sum that is based on a summation of the first weighted value and the second weighted value;
   computing a second sum that is based on a summation of the first weight value and the second weight value;
   computing a measure of security based on dividing the first sum by the second sum; and
   performing, by applying a security policy based on the measure of security, a remediation action for the application.

14. A computer-implemented method comprising, at a computer system of a security management system:
   obtaining, from a first service provider system, first data about a first application, wherein the first application is accessed from the first service provider system, and wherein access of the first application is associated with a user;
   obtaining, from a second service provider system, second data about a second application, wherein the second application is accessed from the second service provider system, and wherein access of the second application is associated with the user;

determining, using the first data and the second data, access information for a third application that has been accessed by the user;

searching, using the access information, for domain information about a provider system that provides the third application;

determining security information about the third application, the security information comprising a first value indicative of a first security threat associated with the third application and a second value indicative of a second security threat associated with the third application;

computing a first weighted value that is based on multiplying the first value by a first weight value;

computing a second weighted value that is based on multiplying the second value by a second weight value;

computing a first sum that is based on a summation of the first weighted value and the second weighted value;

computing a second sum that is based on a summation of the first weight value and the second weight value;

computing a measure of security based on dividing the first sum by the second sum; and performing, by applying a security policy based on the measure of security, a remediation action for the third application.

15. The computer-implemented method of claim 14, wherein first service provider system is different from second service provider system, wherein the first service provider system provides access to the first application as a first cloud service, and wherein the second service provider system provides access to the second application as a second cloud service.

16. The computer-implemented method of claim 14, further comprising:

determining organization information for the third application; and generating a graphical interface that displays information about the third application, wherein the information about the third application is displayed based on the organization information and the measure of security computed for the third application, and wherein the graphical interface indicates the remediation action performed for the third application.

17. The computer-implemented method of claim 14, wherein the first data indicates that the first application has been accessed by the user through the third application, wherein the second data indicates that the second application has been accessed by the user through the third application, and wherein determining the access information includes determining that the third application has been accessed to provide access to the first application and the second application.

18. The computer-implemented method of claim 14, wherein the first value is obtained from a first source, wherein the first value is different from the second value, and wherein the second value is obtained from a second source.

* * * * *

UNITED STATES PATENT AND TRADEMARK OFFICE
CERTIFICATE OF CORRECTION

PATENT NO. : 10,536,478 B2  
APPLICATION NO. : 15/441154  
DATED : January 14, 2020  
INVENTOR(S) : Kirti et al.

Page 1 of 1

It is certified that error appears in the above-identified patent and that said Letters Patent is hereby corrected as shown below:

In the Specification

In Column 26, Line 42, delete "accessed," and insert -- accessed. --, therefor.

In Column 29, Line 8, after "may" insert -- be --.

In Column 29, Line 62, delete "selected" and insert -- select --, therefor.

In Column 42, Line 20, after "may" insert -- be --.

In Column 43, Line 39, delete "the the" and insert -- the --, therefor.

In Column 44, Line 43, delete "selected" and insert -- select --, therefor.

In Column 46, Line 2, delete "a100.000." and insert -- a 100.000. --, therefor.

In Column 46, Line 5, delete "13" and insert -- $I_3$ --, therefor.

In Column 46, Line 9, delete "14" and insert -- $I_4$ --, therefor.

In Column 47, Line 24, delete "displated" and insert -- displayed --, therefor.

In Column 47, Line 39, after "the" delete "of".

In Column 47, Lines 44-45, delete "with with" and insert -- with --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*